US007130469B2

(12) United States Patent
Adachi

(10) Patent No.: US 7,130,469 B2
(45) Date of Patent: Oct. 31, 2006

(54) IMAGE PROCESSING APPARATUS, IMAGE PROCESSING METHOD, PROGRAM, RECORDING MEDIUM, AND IMAGE FORMING APPARATUS HAVING THE SAME

(75) Inventor: Yasushi Adachi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 740 days.

(21) Appl. No.: 10/424,167

(22) Filed: Apr. 25, 2003

(65) Prior Publication Data
US 2004/0001632 A1    Jan. 1, 2004

(30) Foreign Application Priority Data
Apr. 25, 2002    (JP)    ............... P2002-124812

(51) Int. Cl.
*G06K 9/62*    (2006.01)
(52) U.S. Cl. .............. 382/224; 382/173; 382/199; 348/438.1; 358/534
(58) Field of Classification Search ............... 382/173, 382/176, 171, 270, 272, 112, 199, 254, 260, 382/261, 224; 358/462, 1.9, 465, 475, 504, 358/515, 523, 534, 438.1; 345/501; 706/52
See application file for complete search history.

(56) References Cited

U.S. PATENT DOCUMENTS

| 4,722,008 | A | | 1/1988 | Ibaraki et al. ............... 358/283 |
| 5,463,701 | A | * | 10/1995 | Kantner et al. ............. 382/166 |
| 5,587,927 | A | * | 12/1996 | Nagao et al. ................ 702/167 |
| 5,751,862 | A | * | 5/1998 | Williams et al. ............ 382/260 |
| 5,835,630 | A | * | 11/1998 | Schweid et al. ............ 382/173 |
| 5,909,514 | A | * | 6/1999 | Murayama et al. ......... 382/254 |
| 5,966,183 | A | * | 10/1999 | Kondo et al. ............... 348/458 |
| 6,014,234 | A | * | 1/2000 | Yamamoto .................. 358/522 |
| 6,778,297 | B1 | * | 8/2004 | Fujiwara ..................... 358/1.9 |

FOREIGN PATENT DOCUMENTS

| JP | 61-194968 | 8/1986 |
| JP | 62-147860 | 7/1987 |
| JP | 6-178097 | 6/1994 |

OTHER PUBLICATIONS

Takahashi, et al., "Bi-level Quantizing Method of Images Containing Text, Screened Halftone and Continuous Tone," IIEE of Japan, pp. 19-25 (6 pgs), and Partial English Translation (3 pgs).

* cited by examiner

*Primary Examiner*—Sheela Chawan
(74) *Attorney, Agent, or Firm*—Edwards Angell Palmer Dodge LLP; David G. Conlin; George W. Hartnell

(57) ABSTRACT

An edge pixel is extracted from an input image by an edge determination section, an object image section is extracted by an object-image extraction section, and a first characteristic amount of the object image section in a first local pixel block containing a first target pixel is calculated by a first-characteristic-amount calculation section. A classification is made as to whether the first target pixel is a character edge pixel or a dot edge pixel by an edge-class determination section on the basis of the result of extraction for the edge pixel and the first characteristic amount. A second characteristic amount of a second local pixel block containing a second target pixel is calculated by a second-characteristic-amount calculation section on the basis of the edge classification result. The image of the second target pixel is classified by an image-class determination section on the basis of the second characteristic amount.

26 Claims, 32 Drawing Sheets

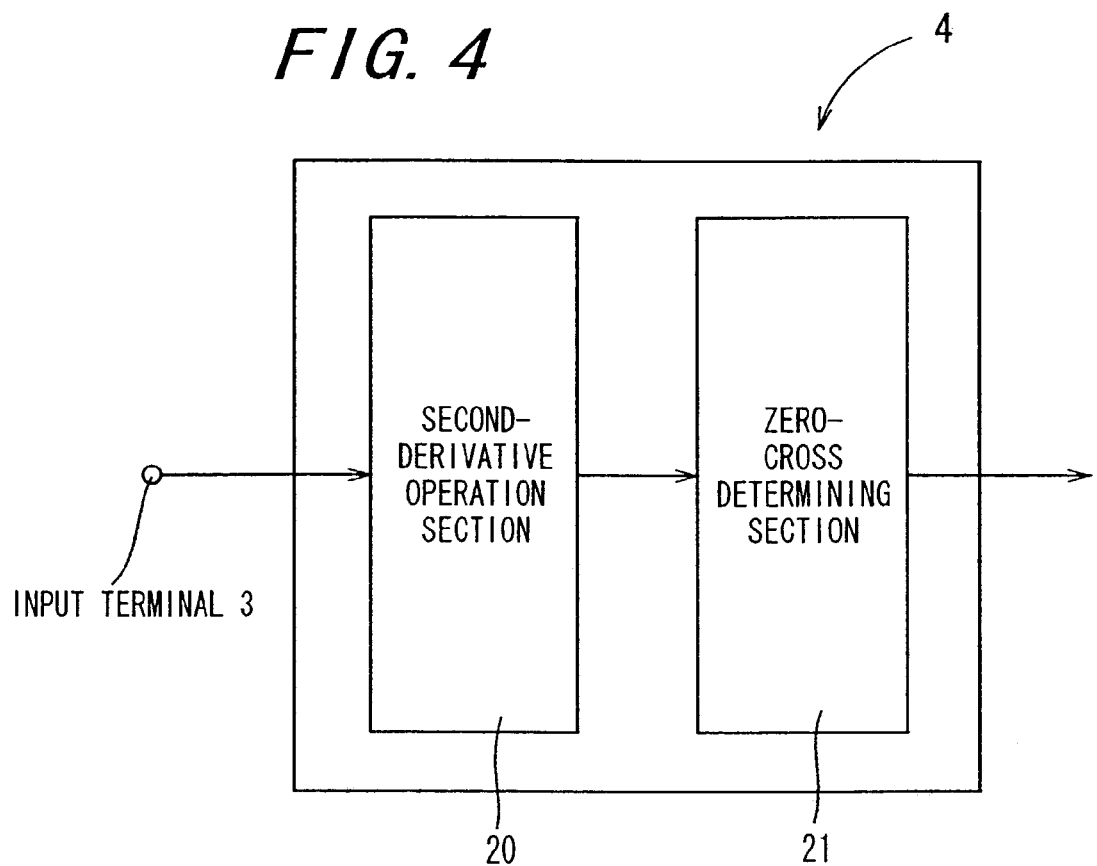

a ■ CONCENTRATION: 200–250   b ▨ CONCENTRATION: 150–200
c ☰ CONCENTRATION: 100–150   d ▨ CONCENTRATION: 50–100
e □ CONCENTRATION: 0–50 a ■ CONCENTRATION: 200–250   b ▩ CONCENTRATION: 150–200
c ▤ CONCENTRATION: 100–150   d ▨ CONCENTRATION: 50–100
e ☐ CONCENTRATION: 0–50

⟷ : RUN LENGTH 3

⟷ : RUN LENGTH 7

SECOND TARGET PIXEL 16 a ■ : DOT EDGE PIXEL
b ▦ : CHARACTER EDGE PIXEL
c ▥ : NON-EDGE PIXEL a →  : PERIMETER 8 b ▨ : AREA 7 a →  : PERIMETER 12 b ▨ : AREA 7 a ■ :DOT EDGE PIXEL b ▦ :CHARACTER EDGE PIXEL a ■ : DOT EDGE PIXEL
b ▦ : CHARACTER EDGE PIXEL
c ▥ : NON-EDGE PIXEL

- p0: SECOND-CHARACTERISTIC-AMOUNT CALCULATION PROCESS
- p1: CHARACTER-EDGE-PIXEL NUMBER AND DOT-EDGE-PIXEL NUMBER CALCULATION PROCESS USING EDGE CLASS SIGNAL
- p2: RETURN a ■ :DOT EDGE PIXEL
b ▨ :CHARACTER EDGE PIXEL

- e0: SECOND-CHARACTERISTIC-AMOUNT CALCULATION PROCESS
- e1: EDGE-PIXEL NUMBER CALCULATION PROCESS USING EDGE CLASS SIGNAL
- e2: RETURN a ■ :DOT EDGE PIXEL
b ▦ :CHARACTER EDGE PIXEL a ■ :DOT EDGE PIXEL a ■ :DOT EDGE PIXEL
b ▦ :CHARACTER EDGE PIXEL a ■ :DOT EDGE PIXEL a ▨ : CHARACTER EDGE PIXEL

IMAGE PROCESSING APPARATUS, IMAGE PROCESSING METHOD, PROGRAM, RECORDING MEDIUM, AND IMAGE FORMING APPARATUS HAVING THE SAME

BACKGROUND OF THE INVENTION

1. Field of the Invention

The invention relates to an image processing method for classifying which of a plurality of image areas each pixel belongs to, such as a character area, a dot area, and an on-dot character area, a program for executing the method, a recording medium in which the program is recorded, an image processing apparatus, and an image forming apparatus having the same.

2. Description of the Related Art

Related-art image forming apparatus read the overall image of an original with an image sensor that uses a charge coupled device (abbreviated as a CCD) and performs various processing to improve the reproducibility of the original during the formation of the image. For improving the reproducibility of the original, it is determined which of a plurality of image areas an image area containing a plurality of pixels in the whole image belongs to, on the basis of an image signal representing the entire image of the original; thus, various image areas such as a character area, a dot area, and a photograph area are extracted on the basis of the result of determination.

As a method for classifying a plurality of image areas, there are image classification methods by pattern matching and by using a character parameter. In the method of pattern matching, the entire image is divided into local pixel blocks containing a plurality of pixels, which are compared with a predetermined plurality of patterns, and thus the individual local pixel block is classified.

Specific examples with the character parameter are image classification methods disclosed in Japanese Unexamined Patent Publication JP-A 62-147860 (1987), Japanese Examined Patent Publication JP-B2 6-66884 (1994), and Japanese Unexamined Patent Publication JP-A 6-178097 (1994).

The image classification method disclosed in JP-A 62-147860 employs a halftone facsimile system. In the halftone facsimile system, a plurality of local pixel blocks contained in the entire image is subjected to an image-area classification processing. For a plurality of pixels in each local pixel block, the maximum pixel value and the minimum pixel value are obtained and the difference between the maximum pixel value and the minimum pixel value is calculated. The value of the difference calculated in each local pixel block is compared with a preset value, respectively. When the difference value is lower than the preset value, the local pixel block is classified as an image area containing a photograph section in which the value of the pixel varies gradually as it moves in a predetermined scanning direction. When the difference value is higher than the preset value, the local pixel block is classified as an image area containing a character section, the outline of a photograph section, or a dot photograph section in which the value of the pixel changes drastically as it moves in a predetermined scanning direction. Furthermore, for each local pixel block, the respective numbers of changes in the values of adjacent two pixels as it moves in a predetermined scanning direction and a sub scanning direction. The numbers of changes and a preset value are compared, wherein when the numbers of changes are larger than the preset value, the local pixel block is determined as a dot area containing a dot section, and when the numbers of changes are smaller than the preset value, the local pixel block is determined as being not a dot area. The pixels in the local pixel blocks are subjected to various processing on the basis of the result of classification.

The image classification method disclosed in JP-B2 6-66884 employs a dot-photograph-area classification method. In the dot-photograph-area classification method, the image-area classification is given to each of a plurality of local pixel blocks contained in the entire image. For the set of adjacent two pixels in one local pixel block, the numbers of changes of the value of adjacent two pixels are obtained individually in the case where the values of the two pixels continue in the main scanning direction and in the case where the values of the two pixels continue in the sub scanning direction, and the sum total of the numbers of changes is obtained. The sum total of the numbers of changes obtained for each local pixel block is compared with the preset value, and thus, the image area is classified on the basis of the result of comparison.

In the dot extracting apparatus disclosed in JP-A 6-178097, the number of pixels between two horizontal poles in the main scanning direction and the number of pixels between two vertical poles in the sub scanning direction are counted, respectively, and the counts are used as characteristic parameters, and thus, dot pixels contained in a dot area are extracted. For the main scanning direction, while setting either one of the maximum point at which the concentration rises to a maximum and the minimum point at which the concentration is reduced to a minimum as a horizontal pole, with digital multilevel data as input, the number of pixels between the two horizontal poles is counted. Also for the sub scanning direction, while setting either one of the maximum point at which the concentration becomes maximum and the minimum point at which the concentration becomes minimum as a vertical pole, two vertical poles are determined and the number of pixels between the two vertical poles is counted. When the number of the pixels between the horizontal poles is within a predetermined range, only pixels in which the number of pixels between the vertical poles is within a predetermined range among the pixels between the horizontal poles are extracted as dot pixels.

The image classification method by pattern matching requires a lot of patterns, thus posing a problem in that the capacity of a memory for storing a plurality of patterns must be increased and the general versatility is low.

In the image classification method using the characteristic parameter, the values of the characteristic parameters are not conforming, that is, the values of the characteristic parameters do not represent the respective characteristics of the image areas; therefore, the respective image areas cannot be accurately classified, so that pixels that belong to a desired image area cannot be extracted. For the dot area, a dot section having a small number of lines has a characteristic similar to the character section. Accordingly, it is difficult to discriminate the dot section from the character section, so that the dot section cannot be accurately extracted. An on-dot character area, in which the substrate in the character area is formed of a plurality of dot pixels, is not classified as a character area but is classified as a dot area, so that it is subjected to an optimum process for the dot area, for example, smoothing filter processing for reducing moire. Accordingly, the reproducibility of the character area is significantly damaged, so that the reproducibility of the on-dot character area is also reduced to form a low-quality image. For the dot photograph area in which a photographic image is formed of a plurality of dot pixels, an inter-area edge that is the boundary between a figure and the back in a dot photograph having a large of lines and dot pixels having a small number of lines are determined erroneously as a character area. Therefore, the reproducibility of the dot photograph area is damaged significantly, thus producing a problem of generating the degradation of image quality during the formation of an image.

SUMMARY OF THE INVENTION

It is an object of the invention to provide an image processing method for accurately classifying which of a plurality of image areas each pixel contained in an input image belongs to, with information on edge pixels and an object image section, a program for executing the method, a recording medium in which the program is recorded, an image processing apparatus, and an image forming apparatus having the same.

The invention provides an image processing apparatus comprising: edge determination means for determining whether or not each pixel of an input image is an edge pixel; object-image extraction means for extracting an object image section having pixels of a predetermined pixel value or more from the input image; first-characteristic-amount calculation means for calculating a first characteristic amount that represents a characteristic of the object image section contained in a first local pixel block containing a prescribed first target pixel on the basis of the result of extraction by the object-image extraction means; edge-class determination means for determining which of a plurality of edge classes the first target pixel belongs to, on the basis of the result of determination by the edge determination means and the first characteristic amount calculated by the first-characteristic-amount calculation means; second-characteristic-amount calculation means for calculating a second characteristic amount that represents a characteristic of an image of a second local pixel block containing a prescribed second target pixel on the basis of the result of classification by the edge-class determination means; and image-class determination means for determining which of a plurality of image classes the second target pixel belongs to, on the basis of the second characteristic amount calculated by the second-characteristic-amount calculation means.

According to the invention, it is determined by the edge determination means whether or not each pixel of the input image is an edge pixel, and a plurality of edge pixels is extracted from the input image. An object image section containing a pixel of a prescribed pixel values or more is extracted from the input image. For the object image section contained in the first local pixel block that contains a prescribed first target pixel, a first characteristic amount that represents the characteristic of the object image section is calculated by the first-characteristic-amount calculation means.

The use of the characteristic of the object image section in the first local pixel block facilitates accurate representation of the characteristic of each pixel which is estimated to be an edge pixel. It is determined by the edge-class determination means as to which of the plurality of edge classes the first target pixel belongs to, on the basis of the result of determination by the edge determination means and the first characteristic amount calculated by the first-characteristic-amount calculation means.

The use of not only the determination by the edge determination means but also the first characteristic amount of the object image section in the first local pixel block allows the characteristic of each edge pixel in the first local pixel block to be known. The use of the first characteristic amount in the first local pixel block facilitates accurate determination by the edge-class determination means as to which of the plurality of edge classes the first target pixel belongs to, thereby allowing the determination as to which of the character edge pixel and the dot edge pixel the first target pixel belongs to.

The second characteristic amount that represents the characteristic of the image in the second local pixel block containing a prescribed second target pixel is calculated by the second-characteristic-amount calculation means on the basis of the result of classification of the edge pixel by the edge-class determination means. The calculation of the second characteristic amount using the classification of the edge pixel allows the respective characteristic amounts of the plurality of image areas contained in the input image to be obtained. The use of the second characteristic amount allows the image-class determination means to determine which of the plurality of image classes such as the character area and the dot area the second target pixel belongs to.

The determination for each pixel of the input image is performed by using not only the characteristic amount for each edge pixel but also the characteristic amount for the image area containing a plurality of pixels. Accordingly, the accuracy of the determination for each pixel of the input image is improved without erroneous determination as to which of the image areas the each pixel belongs to.

In the invention, it is preferable that the edge determination means includes a second-derivative operation section for performing a second derivative operation for each pixel and a zero-cross determination section for determining a zero-crossing pixel as an edge pixel on the basis of the result of the second derivative operation by the second-derivative operation section.

According to the invention, each pixel is subjected to the second derivative operation by the second-derivative operation section, and a zero-crossing pixel is determined as an edge pixel by the zero-cross determination section on the basis of the result of the second derivative operation. The each pixel is subjected to the second derivative operation, so that the second derivative of the pixel values can be obtained for a plurality of adjacent pixels arranged in a prescribed scanning direction.

When an image area containing an edge pixel is subjected to a second derivative operation, the second derivative of the values of the pixels upstream in the prescribed scanning direction becomes either one of a positive value and a negative value, and the second derivative of the value of the edge pixel (a pixel with a maximum gradient) becomes 0. On the other hand, the second derivative of the values of the pixels downstream in the prescribed scanning direction becomes either one of a positive value and a negative value opposite to the above. Thus, the second derivatives cross the value 0. The detection of a zero-crossing pixel on the basis of the result of the second derivative operation for each pixel facilitates accurate extraction of the edge pixel.

In the invention, it is preferable that the edge determination means includes a smoothing section for performing smoothing filter processing for each pixel, a difference-value calculating section for obtaining the difference between the result of smoothing by the smoothing section and each pixel value, and a zero-cross determination section for determining a zero-crossing pixel as an edge pixel on the basis of the difference value calculated by the difference-value calculating section.

According to the invention, the smoothing section of the edge determination means performs smoothing filter processing for each pixel, thereby removing a noise component contained in the value of each pixel of the input image. The difference-value calculating section obtains the difference value between the result of smoothing by the smoothing section and each pixel value. On the basis of the result of calculation of the difference value, a zero-crossing pixel is extracted, so that an edge pixel of the input image is extracted. The edge pixel is extracted with a noise component contained in the each pixel value being removed, so that the edge pixel can be extracted easily and accurately without erroneously determining that a pixel containing a noise component is an edge pixel.

In the invention, it is preferable that the object-image extraction means includes a threshold setting section for setting an object-image extracting threshold, and an extracting section for comparing the value of each pixel in the first local pixel block containing the prescribed first target pixel with the object-image extracting threshold to divide them into two image sections and extracting either one of the image sections as an object image section.

According to the invention, the object-image extracting threshold is set by the threshold setting section, and the value of each pixel in the first local pixel block containing the prescribed first target pixel is compared with the object-image extracting threshold to be divided into two image sections, that is, a binary image is obtained, and either one of the image sections is extracted as an object image section by the extracting section. Setting the threshold for extracting the object image section freely allows accurate extraction of dotted and linear object image sections, which are difficult to extract by, for example, a method in which the mean value of the local pixel block and the predetermined fixed value as a threshold are used as thresholds.

In the invention, it is preferable that the threshold setting section includes a block-characteristic-amount calculating section for calculating an in-block characteristic amount that represents the characteristic of the first local pixel block, and a threshold setting section for setting the object-image extracting threshold on the basis of the in-block characteristic amount calculated by the block-characteristic-amount calculating section.

According to the invention, the in-block characteristic amount that represents the characteristic of the first local pixel block is calculated by the block-characteristic-amount calculating section and the object-image extracting threshold is set by the threshold setting selection on the basis of the in-block characteristic amount calculated by the block-characteristic-amount calculating section. Setting the threshold for extracting the object image section in consideration of the characteristic in the first local pixel block allows a desired object image section to be extracted for each local pixel block.

In the invention, it is preferable that the threshold setting section of the object-image extraction means sets a plurality of object-image extracting thresholds on the basis of the first local pixel block, and that the extracting section of the object-image extraction means includes a candidate extracting section for comparing the value of each pixel in the first local pixel block with the object-image extracting threshold to divide them into two image sections and extracting either one of the image sections as an candidate for the object image section, and a selecting section for selecting an object image section in which the number of pixels is closest to a predetermined number of pixels from the candidates for the object image section extracted by the candidate extracting section.

According to the invention, a plurality of object-image extracting thresholds is set by the threshold setting section on the basis of the first local pixel block. For each object-image extracting threshold set by the threshold setting section, the value of each pixel in the first local pixel block is compared with the object-image extracting threshold to be divided into two image sections, and either one of the image sections is extracted as an candidate for the object image section by the candidate extracting section. An object image section in which the number of pixels is closest to the predetermined number of pixels is selected by the selecting section from the candidates for the object image section extracted by the candidate extracting section. Preparing a plurality of candidates for the object image section in advance and selecting a desired object image section therefrom facilitate quick extraction of the object image section.

In the invention, it is preferable that the object-image extraction means includes a histogram calculating section for calculating a cumulative-pixel-value histogram for the pixels in the first local pixel block, a threshold setting section for setting an object-image extracting threshold on the basis of the cumulative-pixel-value histogram calculated by the histogram calculating section, and an extracting section for comparing the value of each pixel in the first local pixel block with the object-image extracting threshold to divide them into two image sections and extracting either one of the image sections as the object image section.

According to the invention, a cumulative-pixel-value histogram for the pixels in the first local pixel block is calculated by the histogram calculating section, and an object-image extracting threshold is set by the threshold setting section on the basis of the cumulative-pixel-value histogram. The value of each pixel in the first local pixel block is compared with the object-image extracting threshold to be divided into two image sections, and either one of the image sections is extracted as the object image section by the extracting section. The use of the cumulative-pixel-value histogram provides at least information on the pixels in the first local pixel block either in ascending order or in descending order, thereby facilitating the setting of the object-image extracting threshold. Setting the object-image extracting threshold on the basis of the cumulative-pixel-value histogram facilitates the extraction of pixels having a predetermined pixel value or more as the object image section.

In the invention, it is preferable that the first-characteristic-amount calculation means is run-length calculation means for calculating a run length of the object image section extracted by the object-image extraction means.

According to the invention, the run length of the object image section extracted by the object-image extraction means is calculated by the run-length calculation means serving as the first-characteristic-amount calculation means. The run length is the number of continuous pixels, for example, 1 or 0 in the binary image, arranged in a prescribed direction. A dot section has a plurality of pixels arranged in dot pattern, so that the run length in the dot section is smaller than that of a character section in which a plurality of adjacent pixels is arranged linearly in a prescribed scanning direction. The calculation of the run length of the object image section as the characteristic amount of the object image section allows the respective characteristics of the character section and the dot section to be represented accurately, thus facilitating the edge classification for the first target pixel.

In the invention, it is preferable that the first-characteristic-amount calculation means is circularity calculation means for calculating the circularity of the object image section extracted by the object-image extraction means.

According to the invention, the circularity of the object image section extracted by the object-image extraction means is calculated by the circularity calculation means serving as the first-characteristic-amount calculation means. The circularity is a characteristic amount that represents the degree of circularity of the set of pixels. Since the dot section has pixels arranged in dot pattern, thus having a nearly circular shape and having high circularity. The character section has continuous pixels arranged linearly, thus having no nearly circular shape and having lower circularity than the dot section. Obtaining the circularity as the characteristic amount of the object image section allows the respective characteristics of the character section and the dot section to be represented accurately, thus facilitating the edge classification for the first target pixel.

In the invention, it is preferable that the second-characteristic-amount calculation means calculates a run length of the edge pixels as a second characteristic amount.

According to the invention, the run length of the edge pixels classified by the edge-class determination means is calculated as a second characteristic amount that represents the characteristic of a second local pixel block containing a second target block by the second-characteristic-amount calculation means. The use of the run length of the edge pixels allows the characteristic of the character area to be represented. The use of the run length of the classified edge pixels allows the characteristic of the image in the second local pixel block to be represented accurately, thereby improving the accuracy of the determination for the second target pixel and thus accurately determining which of the image areas the pixel belongs to.

In the invention, it is preferable that the second-characteristic-amount calculation means calculates a run length of non-edge pixels in addition to the run length of the edge pixels as a second characteristic amount.

According to the invention, in addition to the run length of the edge pixels classified by the edge-class determination means, the run length of non-edge pixels is calculated as a second characteristic amount by the second-characteristic-amount calculation means. For the character area, characteristics are shown not only that the edge pixels in the character area are arranged continuously in a prescribed scanning direction but also that the non-edge pixels in an area sandwiched by the character edge pixels are arranged continuously in a prescribed scanning direction. The use of not only the run length of the edge pixels but also the run length of the non-edge pixels as the second characteristic amount improves the accuracy of the determination for the second target pixel, thereby allowing accurate determination as to which of the image areas the pixel belongs to.

In the invention, it is preferable that the second-characteristic-amount calculation means calculates the second characteristic amount on the basis of the number of the edge pixels of each edge class.

According to the invention, the second characteristic amount is calculated by the second-characteristic-amount calculation means on the basis of the number of the edge pixels of each edge class. The use of the number of the edge pixels of each edge class as the second characteristic amount allows the determination as to which of the edge pixels of the edge classes is contained more in the local pixel block that contains a plurality of pixels, thus allowing the characteristic of the local pixel block to be represented accurately. Calculating the second characteristic amount by using not only the number of the edge pixels of each edge class but also the run length of the edge pixels allows the characteristic of the local pixel block to be represented accurately. The use of the second characteristic amount improves the accuracy of the determination for the second target pixel, thereby allowing accurate determination as to which of the image areas the pixel belongs to.

The invention provides an image forming apparatus including any one of the image processing apparatuses described above.

More specifically, the invention provides an image forming apparatus comprising: an image processing apparatus including: edge determination means for determining whether or not each pixel of an input image is an edge pixel; object-image extraction means for extracting an object image section having pixels of a predetermined pixel value or more from the input image; first-characteristic-amount calculation means for calculating a first characteristic amount that represents a characteristic of the object image section contained in a first local pixel block containing a prescribed first target pixel on the basis of the result of extraction by the object-image extraction means; edge-class determination means for determining which of a plurality of edge classes the first target pixel belongs to, on the basis of the result of determination by the edge determination means and the first characteristic amount calculated by the first-characteristic-amount calculation means; second-characteristic-amount calculation means for calculating a second characteristic amount that represents a characteristic of an image of a second local pixel block containing a prescribed second target pixel on the basis of the result of classification by the edge-class determination means; and image-class determination means for determining which of a plurality of image classes the second target pixel belongs to, on the basis of the second characteristic amount calculated by the second-characteristic-amount calculation means.

According to the invention, the image processing is performed for an original image read from the original, so that it can be determined as to which of the image areas each pixel belongs to. Accordingly, various suitable processing can be selected depending on the determination, thus forming an image having improved reproducibility of the original image on the recording material.

The invention provides an image processing method comprising: an edge determination process for determining whether or not each pixel of an input image is an edge pixel; an object-image extraction process for extracting an object image section composed of pixels having a predetermined pixel values or more from the input image; a first-characteristic-amount calculation process for calculating a first characteristic amount that represents a characteristic of an object image section contained in a first local pixel block containing a predetermined first target pixel on the basis of the result of extraction by the object-image extraction process; an edge-class determination process for determining which of a plurality of edge classes the first target pixel belongs to, on the basis of the result of determination by the edge determination process and the first characteristic amount calculated in the first-characteristic-amount calculation process; a second-characteristic-amount calculation process for calculating a second characteristic amount that represents a characteristic of an image in the second local pixel block containing a predetermined second target pixel on the basis of the result of classification by the edge-class determination process; and an image-class determination process for determining which of a plurality of image classes the second target pixel belongs to, on the basis of the second characteristic amount calculated in the second-characteristic-amount calculation process.

According to the invention, in the edge determination process, it is determined whether or not each pixel of the input image is an edge pixel, and a plurality of edge pixels is extracted from the input image. In the object-image extraction process, an object image section composed of pixels having a predetermined pixel values or more is extracted from the input image. In the first-characteristic-amount calculation process, a first characteristic amount that represents the characteristic of the object image section contained in the first local pixel block containing a predetermined first target pixel is calculated on the basis of the result of extraction in the object-image extraction process.

The use of the characteristic of the object image section in the first local pixel block facilitates accurate representation of the characteristic of each pixel which is estimated as an edge pixel. In the edge-class determination process, it is determined which of the plurality of edge classes the first target pixel belongs to, on the basis of the result of determination in the edge determination process and the first characteristic amount calculated in the first-characteristic-amount calculation process.

The use of not only the determination in the edge determination process but also the first characteristic amount of the object image section in the first local pixel block allows the representation of the characteristic of each edge pixel in the first local pixel block. In the edge-class determination process, it can be determined accurately and easily which of the plurality of edge classes the first target pixel belongs to by using the first characteristic amount in the first local pixel block, and more specifically, it can be determined which of the character edge pixel and the dot edge pixel the first target pixel belongs to.

In the second-characteristic-amount calculation process, a second characteristic amount that represents the characteristic of the image in the second local pixel block containing a predetermined second target pixel is calculated on the basis of the result of classification of the edge pixel in the edge-class determination process. The respective characteristic amounts of the image areas contained in the input image can be obtained by calculating the second characteristic amount using the classification of the edge pixels. In the image-class determination process, it is determined which of the image classes, such as the character area and the dot area, the second target pixel belongs to by using the second characteristic amount.

The determination is performed for each pixel of the input image by using not only the characteristic amount for each edge pixel but also the characteristic amount of the image area containing a plurality of pixels. Accordingly, the accuracy of the determination for each pixel of the input image is improved, so that it can accurately be determined which of the image areas the pixel belongs to.

In the invention, it is preferable that the edge determination process includes a second derivative operation process for performing a second derivative operation for each pixel and a zero-cross determination process for determining a zero-crossing pixel as an edge pixel on the basis of the result of the second derivative operation in the second derivative operation process.

According to the invention, in the second derivative operation process, each pixel is subjected to the second derivative operation and a zero-crossing pixel is determined as an edge pixel on the basis of the result of the second derivative operation. Performing the second derivative operation for each pixel allows the second derivatives of the values of the adjacent pixels arranged in a predetermined scanning direction to be obtained. When an image area that contains an edge pixel is given the second derivative operation, the second derivative of the value of a pixel upstream in the prescribed scanning direction becomes either one of a positive value and a negative value, and the second derivative of the value of the edge pixel (a pixel with a maximum gradient) becomes zero. On the other hand, the second derivative of the value of the pixel downstream in the prescribed scanning direction becomes either one of a positive value and a negative value opposite to the above. Thus, the second derivatives cross at the value 0. The detection of a zero-crossing pixel on the basis of the result of the second derivative operation for each pixel facilitates accurate extraction of the edge pixel.

In the invention, it is preferable that the edge determination process includes a smoothing process for performing smoothing filter processing for each pixel, a difference-value calculation process for obtaining the difference between the result of smoothing in the smoothing process and each pixel value, and a zero-cross determination process for determining a zero-crossing pixel as an edge pixel.

According to the invention, in the smoothing process, a noise component contained in the value of each pixel of the input image can be removed by the smoothing filter process for each pixel. In the difference-value calculation process, the difference value between the result of smoothing in the smoothing process and each pixel value is obtained, and a zero-crossing pixel is in turn detected on the basis of the result of calculation of the difference value, and thus, the edge pixel of the input image is extracted. Since the edge pixel is extracted with a noise component contained in each pixel value being removed, the edge pixel can be extracted easily and accurately without erroneous determination that a pixel containing a noise component is an edge pixel.

In the invention, it is preferable that the object-image extraction process includes a threshold setting process for setting an object-image extracting threshold and an extraction process for comparing the value of each pixel in the first local pixel block that contains a predetermined first target pixel with the object-image extracting threshold to divide them into two image sections and extracting either one of the image sections as an object image section.

According to the invention, the value of each pixel in the first local pixel block that contains the predetermined first target pixel is compared with the object-image extracting threshold set in the threshold setting process to be divided into two image sections, and either one of the image sections is extracted as an object image section in the extraction process. Setting the threshold for extracting the object image section freely allows accurate extraction of a dotted and a linear object image section which are difficult to extract by the method in which the mean value and a predetermined fixed value of the local pixel block are used as thresholds.

In the invention, it is preferable that the threshold setting process includes a block-characteristic-amount calculation process for calculating an in-block characteristic amount that represents the characteristic of the first local pixel block and an order-threshold setting process for setting an object-image extracting threshold on the basis of the in-block characteristic amount calculated in the block-characteristic-amount calculation process.

According to the invention, the in-block characteristic amount that represents the characteristic of the first local pixel block is calculated in the block-characteristic-amount calculation process, and the object-image extracting threshold is set by the order-threshold setting process on the basis of the in-block characteristic amount calculated in the block-characteristic-amount calculation process. Setting the threshold for extracting the object image section in consideration of the characteristic in the local pixel block allows a desired object image section to be extracted for each local pixel block.

In the invention, it is preferable that in the threshold setting process of the object-image extraction process, a plurality of object-image extracting thresholds is set on the basis of the first local pixel block, and that the extraction process in the object-image extraction process includes a candidate extraction process for comparing the value of each pixel in the first local pixel block with the object-image extracting threshold for each object-image extraction threshold, dividing them into two image sections, and thereby extracting either one of the image sections as a candidate for the object image section, and a selection process for selecting an object image section having a pixel value closest to a prescribed pixel value from the candidates for the object image section which are extracted in the candidate extraction process.

According to the invention, a plurality of object-image extracting thresholds is set on the basis of the first local pixel block in the threshold setting process. For each object-image extraction threshold set in the threshold setting process, the value of each pixel in the first local pixel block is compared with the object-image extracting threshold to be divided into two image sections, and either one of the image sections is extracted as a candidate for the object image section in the candidate extraction process. A candidate for the object image section having a pixel value closest to a prescribed pixel value is selected as the object image section from the candidates for the object image section which are extracted in the candidate extraction process. A plurality of candidates for the object image section is prepared in advance, from which a desired object image section is selected, so that the object image section can be extracted easily and quickly.

In the invention, it is preferable that the object-image extraction process includes a histogram calculation process of calculating the cumulative-pixel-value histogram for the pixels in the first local pixel block; a threshold setting process for setting an object-image extracting threshold on the basis of the cumulative-pixel-value histogram calculated in the histogram calculation process; and an extraction process for comparing the value of each pixel in the first local pixel block with the object-image extracting threshold to divide them into two image sections, and extracting either one of the image sections as an object image section.

According to the invention, the cumulative-pixel-value histogram for the pixels in the first local pixel block is calculated in the histogram calculation process, and an object-image extracting threshold is set in the threshold setting process on the basis of the cumulative-pixel-value histogram. The value of each pixel in the first local pixel block is compared with the object-image extracting threshold to be divide into two image sections, and either one of the image sections is extracted as an object image section in the extraction process. The use of the cumulative-pixel-value histogram provides at least the information on the values of the pixels in the first local pixel block either in ascending order or in descending order, thus allowing the setting of the object-image-section extracting threshold. Setting the object-image-section extracting threshold on the basis of the cumulative histogram facilitates the extraction of a pixel having either of a desired value or more and a desired value or less as an object image section.

In the invention, it is preferable that the first-characteristic-amount calculation process is a run-length calculation process for calculating a run length of the object image section extracted in the object-image extraction process.

According to the invention, the run length of the object image section extracted in the object-image extraction process is calculated in the run-length calculation process serving as the first-characteristic-amount calculation process. The run length is the number of continuous pixels, for example, 1 or 0 in the binary image, arranged in a prescribed direction. A dot section has a plurality of pixels arranged in dot pattern, so that the run length in the dot section is smaller than that of a character section in which a plurality of adjacent pixels is arranged linearly in a prescribed scanning direction. The calculation of the run length of the object image section as the characteristic amount of the object image section allows the respective characteristics of the character section and the dot section to be represented accurately, thus facilitating the edge classification for the first target pixel.

In the invention, it is preferable that the first-characteristic-amount calculation process is a circularity calculation process for calculating the circularity of the object image section extracted in the object-image extraction section.

According to the invention, the circularity of the object image section extracted in the object-image extraction process is calculated in the circularity calculation process serving as the first-characteristic-amount calculation process. The circularity is a characteristic amount that represents the degree of circularity of the set of pixels. Since the dot section has a plurality of pixels arranged in dot pattern, thus having a nearly circular shape and having high circularity. The character section has continuous pixels arranged linearly, thus having no nearly circular shape and having lower circularity than the dot section. Obtaining the circularity as the characteristic amount of the object image section allows the respective characteristics of the character section and the dot section to be represented accurately, thus facilitating the edge classification for the first target pixel.

In the invention, it is preferable that, in the second-characteristic-amount calculation process, a run length of the edge pixels is calculated as a second characteristic amount.

According to the invention, in the second-characteristic-amount calculation process, the run length of the edge pixels classified by the edge-class determination process is calculated as a second characteristic amount that represents the characteristic of a second local pixel block containing a second target pixel. The use of the run length of the edge pixels as the second characteristic amount allows the characteristic of the character area to be represented. The use of the run length of the classified edge pixels allows the characteristic of the image in the second local pixel block to be represented accurately, thereby improving the accuracy of the determination for the second target pixel and thus accurately determining which of the image areas the pixel belongs to.

In the invention, it is preferable that, in the second-characteristic-amount calculation process, in addition to the run length of the edge pixels, a run length of non-edge pixels is calculated as a second characteristic amount.

According to the invention, in addition to the run length of the edge pixels classified by the edge-class determination process, the run length of non-edge pixels is calculated as a second characteristic amount in the second-characteristic-amount calculation process. For the character area, characteristics are shown not only that the edge pixels in the character area are arranged continuously in a prescribed scanning direction but also that the non-edge pixels in an area sandwiched by the character edge pixels are arranged continuously in a prescribed scanning direction. The use of not only the run length of the edge pixels but also the run length of the non-edge pixels as the second characteristic amount improves the accuracy of the determination for the second target pixel, thereby allowing accurate determination as to which of the image areas the pixel belongs to.

In the invention, it is preferable that, in the second-characteristic-amount calculation process, the second characteristic amount is calculated on the basis of the number of the edge pixels of each edge class.

According to the invention, in the second-characteristic-amount calculation process, the second characteristic amount is calculated on the basis of the number of the edge pixels of each edge class. The use of the number of the edge pixels of each edge class as the second characteristic amount allows the determination as to which of the edge pixels of the edge classes are contained more in the local pixel block containing a plurality of pixels, thus allowing the characteristic of the local pixel block to be represented accurately. Calculating the second characteristic amount by using not only the number of the edge pixels of each edge class but also the run length of the edge pixels allows the characteristic of the local pixel block to be represented accurately. The use of the second characteristic amount improves the accuracy of the determination for the second target pixel, thereby allowing accurate determination as to which of the image areas the pixel belongs to.

In addition, the invention provides a program for a computer to execute the image processing method of any one of the above.

More specifically, the invention provides a program for causing a computer to execute an image processing method comprising: an edge determination process for determining whether or not each pixel of an input image is an edge pixel; an object-image extraction process for extracting an object image section composed of pixels having a predetermined pixel values or more from the input image; a first-characteristic-amount calculation process for calculating a first characteristic amount that represents a characteristic of an object image section contained in a first local pixel block containing a predetermined first target pixel on the basis of the result of extraction by the object-image extraction process; an edge-class determination process for determining which of a plurality of edge classes the first target pixel belongs to, on the basis of the result of determination by the edge determination process and the first characteristic amount calculated in the first-characteristic-amount calculation process; a second-characteristic-amount calculation process for calculating a second characteristic amount that represents a characteristic of an image in the second local pixel block containing a predetermined second target pixel on the basis of the result of classification by the edge-class determination process; and an image-class determination process for determining which of a plurality of image classes the second target pixel belongs to, on the basis of the second characteristic amount calculated in the second-characteristic-amount calculation process.

According to the invention, a program for a computer to execute the image processing method is provided. The execution of the image processing by the computer allows the computer to execute automatic image processing, thereby determining an image area containing each pixel of the input image accurately.

Further, the invention provides a computer-readable recording medium in which the program is recorded.

More specifically, the invention provides a computer-readable recording medium which records a program for causing a computer to execute image processing method comprising: an edge determination process for determining whether or not each pixel of an input image is an edge pixel; an object-image extraction process for extracting an object image section composed of pixels having a predetermined pixel values or more from the input image; a first-characteristic-amount calculation process for calculating a first characteristic amount that represents a characteristic of an object image section contained in a first local pixel block containing a predetermined first target pixel on the basis of the result of extraction by the object-image extraction process; an edge-class determination process for determining which of a plurality of edge classes the first target pixel belongs to, on the basis of the result of determination by the edge determination process and the first characteristic amount calculated in the first-characteristic-amount calculation process; a second-characteristic-amount calculation process for calculating a second characteristic amount that represents a characteristic of an image in the second local pixel block containing a predetermined second target pixel on the basis of the result of classification by the edge-class determination process; and an image-class determination process for determining which of a plurality of image classes the second target pixel belongs to, on the basis of the second characteristic amount calculated in the second-characteristic-amount calculation process.

According to the invention, the program for a computer to execute the image processing method is recorded in a computer-readable recording medium. The program is read from the recording medium by the computer and is executed by the computer, so that an image area that contains each pixel of the input image can be determined accurately.

According to the invention, the determination for each pixel of the input image by using not only the characteristic amount for each edge pixel but also the characteristic amount for the image area containing a plurality of pixels improves the accuracy of the determination for each pixel of the input image, thus allowing accurate determination without false determination of the image areas to which the pixel belongs.

According to the invention, the zero-crossing pixel is detected on the basis of the result of the second derivative operation by the second-derivative operation section, so that the edge pixel can be extracted easily and accurately. Accordingly, the texture representing the characteristic amount of the entire image, such as the complicatedness of the image, can be presented accurately during the output of the image.

According to the invention, an edge pixel is extracted with a noise component contained in the value of each pixel of the input image being removed. Therefore, the edge pixel can be extracted easily and accurately without erroneous determination that a pixel containing the noise component is an edge pixel.

According to the invention, setting the threshold for extracting the object image section freely allows accurate extraction of a dotted and a linear object image section which are difficult to extract by the method in which the mean value and a predetermined fixed value of the local pixel block containing a plurality of pixels are used as thresholds.

According to the invention, setting the threshold for extracting the object image section in consideration of the characteristic in the local pixel block containing a plurality of pixels allows the extraction of a desired object image section for each local pixel block.

According to the invention, preparing a plurality of candidates for the object image section on the basis of a plurality of object-image extracting thresholds and selecting a desired object image section therefrom facilitates quick extraction of a desired object image section.

According to the invention, the use of the cumulative-pixel-value histogram provides at least the information on the pixel values in the first local pixel block either in ascending order or descending order, thus facilitating the setting of the object-image extracting threshold. Setting the object-image extracting threshold on the basis of the cumulative histogram facilitates the extraction of a pixel having a predetermined pixel value or more as an object image section.

According to the invention, the calculation of the run length of the object image section as the characteristic amount of the object image section allows the characteristic of the character section and the dot section to be represented accurately, thus facilitating the edge classification for the first target pixel.

According to the invention, obtaining the circularity as the characteristic amount of the object image section allows accurate representation of the respective characteristics of the character section and the dot section, thus facilitating the edge classification for the first target pixel.

According to the invention, the use of the run length of the classified edge pixels allows accurate representation of the characteristic of the image in the second local pixel block, improving the accuracy of the determination for the second target pixel and thereby accurately determining which of the image areas the pixel belongs to.

According to the invention, the use of not only the run length of the edge pixels but also the run length of the non-edge pixels as the second characteristic amount improves the accuracy of the determination for the second target pixel, thereby allowing accurate determination as to which image areas the pixel belongs to.

According to the invention, the use of the second characteristic amount calculated on the basis of the number of the classified edge pixels allows accurate representation of the characteristic of the local pixel block containing a plurality of pixels. Thus, the accuracy of the determination for the second target pixel can be improved, and so it can accurately be determined which of the image areas the pixel belongs to.

According to the invention, the image processing is performed for an original image read from the original, so that it can be determined which of the image areas each pixel belongs to. Accordingly, various suitable processing can be selected depending on the determination, thereby forming an image having improved reproducibility of the original image on the recording material. For example, accurate classification is possible for various dot areas from with a large number of lines to a small number of lines, reducing moire which generates when a dotted printed matter is copied and thus forming an image having improved reproducibility of the original image on a recording material.

According to the invention, there is provided a program for a computer to execute the image processing method. The execution of the image processing by the computer on the basis of the program allows the computer to execute automatic image processing, thereby allowing accurate determination as to which of the image areas each pixel of the input image belongs to.

According to the invention, the program for a computer to execute the image processing method is recorded in a computer-readable recording medium. The program is read from the recording medium by the computer and is executed by the computer, so that it can be determined accurately as to which of the image areas each pixel of the input image belongs to.

BRIEF DESCRIPTION OF THE DRAWINGS

Other and further objects, features, and advantages of the invention will be more explicit from the following detailed description taken with reference to the drawings wherein:

FIG. 3 is a flowchart showing the procedure of an image processing method for classifying which of a plurality of image areas each pixel of an input image belongs to;

FIG. 4 is a block diagram showing the arrangement of edge determination section;

FIG. 5 is a diagram showing a second derivative filter for second derivative operation;

DETAILED DESCRIPTION OF THE PREFERRED EMBODIMENTS

Figure 1:
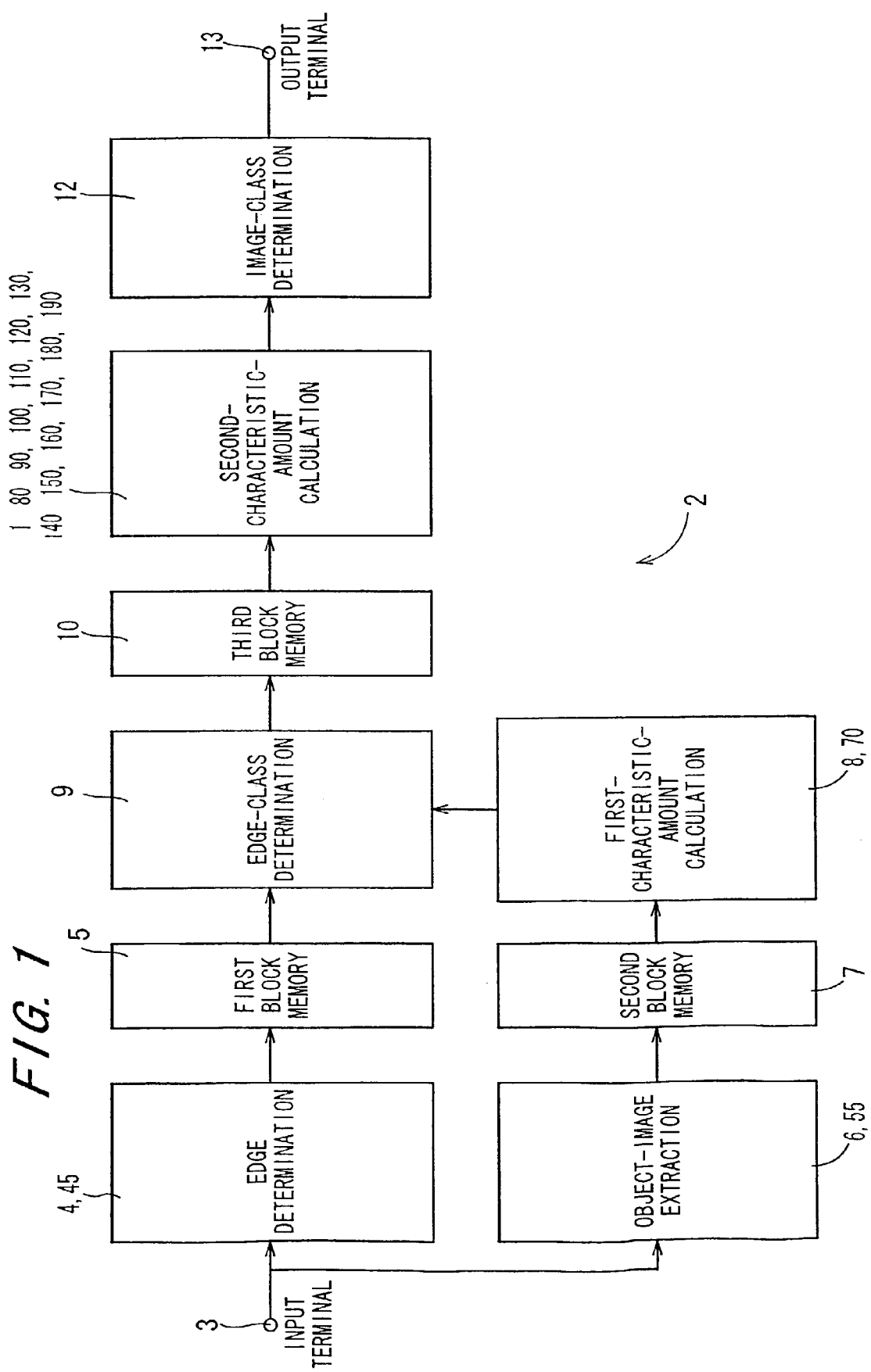
FIG. 1 is a block diagram showing the arrangement of an area separating section included in an image processing apparatus according to a first embodiment of the invention.

Now referring to the drawings, preferred embodiments of the invention are described below.

Figure 2:
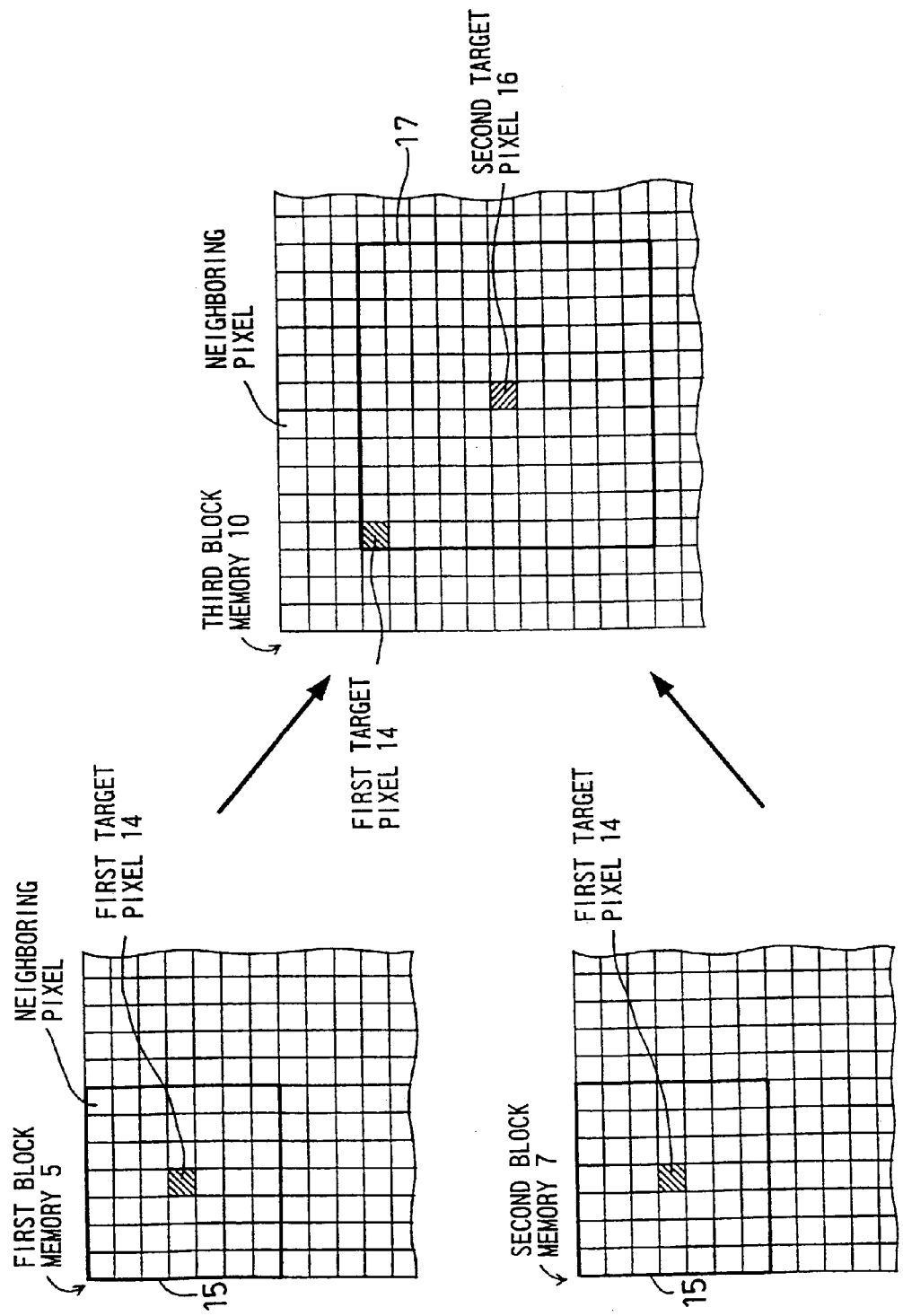
FIG. 2 is a diagram showing a first block memory, a second block memory, and a third block memory.

FIG. 1 is a block diagram showing the arrangement of an area separating section 2 included in an image processing apparatus 31 according to a first embodiment of the invention. FIG. 2 is a diagram showing a first block memory 5, a second block memory 7, and a third block memory 10. The area separating section 2 determines which of a plurality of image areas each pixel contained in an input original image belongs to, on the basis of a red signal R, a green signal G, and a blue signal B which are applied from an input-gray-level correcting section 35, as will be shown in FIG. 18, to an input terminal 3. The image areas include a character area, a dot area, an on-dot character area, and a photograph area. The area separating section 2 includes an edge determination section 4 served as edge determination means, a first block memory 5, an object-image extraction section 6 served as object-image extraction means, a second block memory 7, a first-characteristic-amount calculation section 8 served as first-characteristic-amount calculation means, an edge-class determination section 9 served as edge-class determination means, a third block memory 10, a second-characteristic-amount calculation section 11 served as second-characteristic-amount calculation means, an image-class determination section 12 served as image-class determination means, and an output terminal 13.

The red signal R, the green signal G. and the blue signal B which indicate the respective pixel values are applied from the input-gray-level correcting section 35 to the input terminal 3. The signals are applied to the edge determination means 4 through the input terminal 3.

The edge determination section 4 determines whether or not each pixel of the input image is an edge pixel on the basis of the red signal R, the green signal G, and the blue signal B from the input terminal 3. In the embodiment, the edge pixel denotes a pixel whose value shows a drastic change as compared with the value of the adjacent pixel.

The edge determination section 4 determines whether or not a prescribed first target pixel 14 is the edge pixel by comparing the absolute value of the difference between the value of the first target pixel 14 and the value of a pixel adjacent to the first target pixel 14 with a predetermined value on the basis of image data, such as the pixel value, of a first local pixel block 15 containing the first target pixel 14, and the edge determination signal that indicates the determination for the first target pixel 14 is stored in the first block memory 5.

In the embodiment, the first target pixel 14 is an arbitrary pixel contained in the original image, and the first local pixel block 15 is set as an image area containing a plurality of pixels around the first target pixel 14. In the embodiment, the pixel value includes, for example, the concentration of a red component, the concentration of a green component, and the concentration of a blue component.

The edge determination section 4 determines that the first target pixel 14 is an edge pixel when the absolute value of the difference is higher than the predetermined value, and determines that the first target pixel 14 is not an edge pixel when the absolute value of the difference is lower than the predetermined value.

The edge determination section 4 sets one of pixels of the input image as the first target pixel 14, and performs a determination for the first local pixel block 15 with center at the first target pixel 14. When the determination for the set first target pixel 14 has been finished, the edge determination means 4 sets another pixel as a new first target pixel 14, and performs a determination for the first local pixel block 15 with center at the new first target pixel 14. Such determinations are performed for all pixels contained in the input image.

The order in which each pixel in the input image is set as the first target pixel 14 is as follows: for example, a pixel upstream in the main scanning direction and upstream in the sub scanning direction of the input image is set as an initial first target pixel 14, and from the second or later, a pixel that is displaced by one in the main scanning direction or the sub scanning direction is set as the first target pixel 14. In this manner, all the pixels contained in the input image are set as the first target pixel 14 in a predetermined order, and a determination is made for the first local pixel block 15.

The edge determination section 4 performs the edge determination process for the first target pixel 14 and applies an edge determination signal indicating the determination about the first target pixel 14 to the first block memory 5.

The first block memory 5 includes a storage area in which a plurality of storage sections is arranged in the main scanning direction and the sub scanning direction, that is, a storage area including M1×N1 storage sections. The first block memory 5 stores information in the edge determination signal about each pixel at least in the first local pixel block 15, as shown in FIG. 2. The numbers M1 and N1 are natural numbers, which may be the same as or different from each other.

The object-image extraction section 6 determines whether or not each pixel of the input image is an object image section on the basis of the red signal R, the green signal G, and the blue signal B from the input terminal 3, and extracts a predetermined object image section from the input image. The object image section is composed of pixels having a predetermined pixel value or more, having a relatively higher pixel values than the back and the substrate and containing a plurality of edge pixels.

For the first local pixel block 15 with center at the first target pixel 14, the object-image extraction section 6 determines that each pixel is an object image section when the value of the each pixel, for example, the concentration is higher than a predetermined value, and determines that the pixel is not an object image section when the concentration is lower than the predetermined value. Thus, a set of pixels containing the edge pixel is extracted.

The object-image extraction section 6 performs extraction for each of a plurality of the first local pixel blocks 15 contained in the input image, thus performing extraction for all pixels in the input image. The object-image extraction means 6 applies an object image signal indicating the result of extraction for the first target pixels 14 in the first local pixel block 15 to the second block memory 7.

The second block memory 7 includes a storage area in which a plurality of storage sections is arranged in the main scanning direction and the sub scanning direction, that is, a storage area including M2×N2 storage sections. The second block memory 7 stores information in the object image signal for each first target pixel, as shown in FIG. 2. The numbers M2 and N2 are natural numbers, which may be the same as or different from each other.

The first-characteristic-amount calculation section 8 calculates a first characteristic amount that represents the characteristic of the object image section in the first local pixel block 15 containing a predetermined first target pixel 14, on the basis of the object image signal from the second block memory 7, that is, the result of extraction by the object-image extraction section 6. The characteristic of the object image section in the first local pixel block 15 is represented as the first characteristic amount, so that the characteristic of each edge pixel in the first local pixel block 15 can be represented. The first-characteristic-amount calculation section 8 applies a signal indicating the first characteristic amount of the first local pixel block 15 to the edge-class determination section 9.

The edge-class determination section 9 determines which of a plurality of edge classes the first target pixel 14 belongs to, on the basis of the edge determination signal from the first block memory 5 and a signal indicating the first characteristic amount from the first-characteristic-amount calculation section 8, that is, the determination by the edge determination section 4 and the first characteristic amount calculated by the first-characteristic-amount calculation section 8.

In the embodiment, the edge classification is performed for each edge pixel in the first local pixel block 15 containing the first target pixel 14 that has been determined as an edge pixel, containing a character edge pixel that belongs to a character area and a dot edge pixel that belongs to a dot area. The edge-class determination section 9 determines which of the edge classes of the character edge pixel and the dot edge pixel each edge pixel in the first local pixel block 15 containing the first target pixel 14 that has been determined as an edge pixel belongs to. The edge-class determination section 9 applies an edge class signal indicating the determination for each edge pixel in the first local pixel block 15 to the third block memory 10.

The third block memory 10 includes a storage area in which a plurality of storage sections is arranged in the main scanning direction and the sub scanning direction, that is, a storage area including M3×N3 storage sections. The third block memory 10 stores the result of determination for the first target pixel 14 by the edge-class determination section 9. The numbers M3 and N3 are natural numbers, which may be the same as or different from each other.

The second-characteristic-amount calculation section 11 calculates a second characteristic amount representing the characteristic of an image in a second local pixel block 17 containing a predetermined second target pixel 16, on the basis of each edge class signal from the third block memory 10, that is, the determination by the edge-class determination section 9. In the embodiment, the second target pixel 16 is an arbitrary pixel contained in the original image, and the second local pixel block 17 is set as an image area containing a plurality of pixels with center at the second target pixel 16. The characteristic of the image in the second local pixel block 17 is represented as the second character amount, so that any characteristic of the plurality of image areas can be represented. The second-characteristic-amount calculation section 11 applies a signal indicating the second characteristic amount for the second local pixel block 17 to the image-class determination section 12.

The image-class determination section 12 determines which of a plurality of image classes the second target pixel 16 belongs to, on the basis of the second characteristic amount by the second-characteristic-amount calculation section 11. In the embodiment, the image class is an image area including a character area, a dot area, and an on-dot character area. The image-class determination section 12 applies an image class signal indicating the determination for the second target pixel 16 to an output terminal 13.

An image class signal for the second target pixel 16, and a red signal R, a green signal G, and a blue signal B which indicate the, value of the second target pixel 16 are outputted from the output terminal 13.

Figure 3:
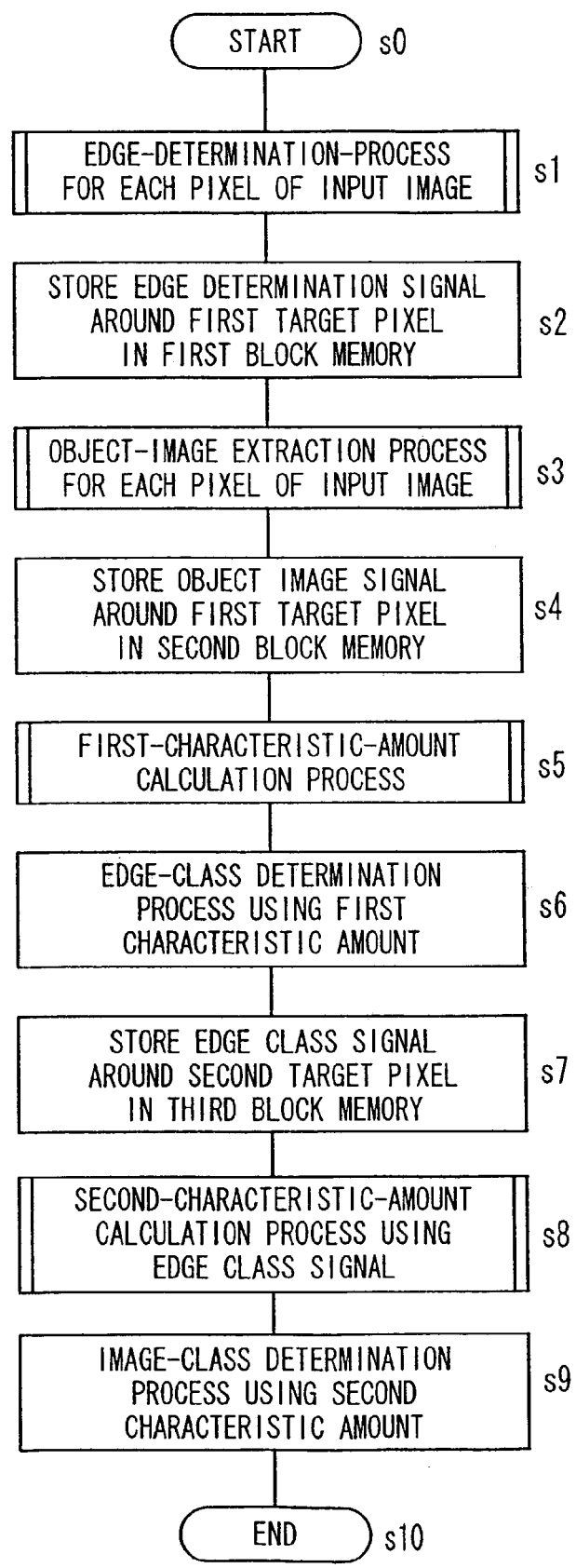

FIG. 3 is a flowchart showing the procedure of an image processing method for classifying which of a plurality of image areas each pixel of an input image belongs to. The image processing method for classifying which of a plurality of image areas each pixel of the input image belongs to includes an edge determination process, an object-image extraction process, a first-characteristic-amount calculation process, an edge-class determination process, a second-characteristic-amount calculation process, and an image-class determination process.

In the edge determination process, it is determined whether or not each pixel of the input image is an edge pixel. In the object-image extraction process, an object image section composed of pixels having a predetermined pixel values or more is extracted from the input image.

In the first-characteristic-amount calculation process, a first characteristic amount for the first local pixel block 15 containing a predetermined first target pixel 14 is calculated on the basis of the result of extraction in the object-image extraction process. The first characteristic amount represents the characteristic of the object image section contained in the first local pixel block 15.

In the edge-class determination process, it is determined which of a plurality of edge classes the first target pixel 14 belongs to, on the basis of the result of determination in the edge determination process and the first characteristic amount calculated in the first-characteristic-amount calculation process.

In the second-characteristic-amount calculation process, a second characteristic amount representing the characteristic of the second local pixel block 17 that contains a predetermined second target pixel 16 is calculated on the basis of the result of determination in the edge-class determination process.

In the image-class determination process, it is determined which of a plurality of images classes the second target pixel 16 belongs to, on the basis of the second characteristic amount calculated in the second-characteristic-amount calculation process.

Figure 18:
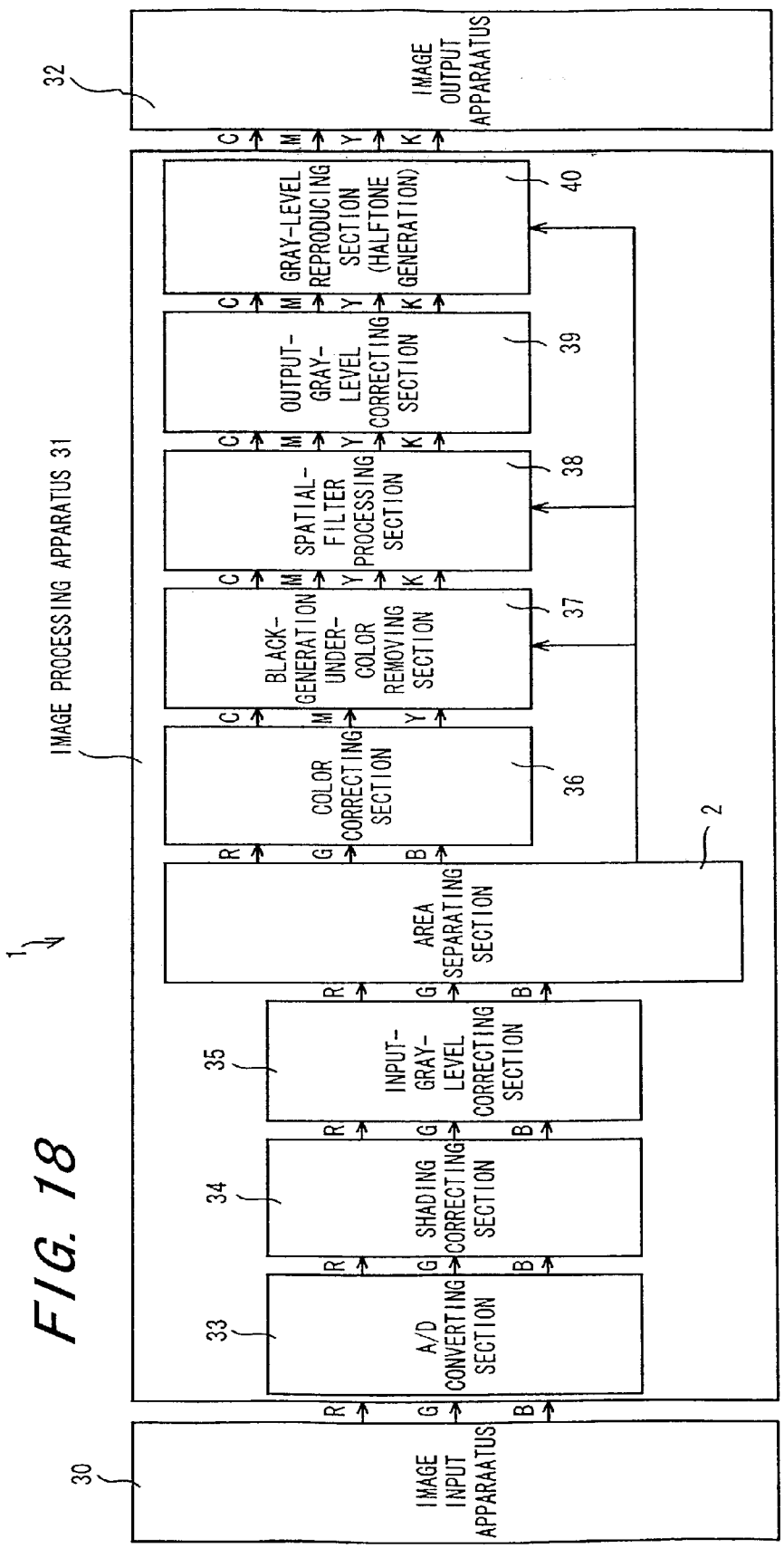
FIG. 18 is a block diagram showing the arrangement of an image forming apparatus.

In step s0, the red signal R, the green signal G, and the blue signal B which indicate the respective values of each pixel of the input image are applied to the area separating section 2 from the input-gray-level correcting section 35 that will be shown in FIG. 18, and the process proceeds to the edge determination process in step s1.

In the edge determination process in step s1, it is determined whether or not the each pixel of the input image is an edge pixel by the edge determination section 4, and an edge determination signal indicating the result of determination is applied to the first block memory 5 for each first target pixel 14, and the process proceeds to step s2.

In step s2, information in the edge determination signal from the edge determination section 4 is stored in the first block memory 5, and the process proceeds to the object-image extraction process in step s3.

In the object-image extraction process in step s3, a predetermined object image section is extracted from the input image by the object-image extraction section 6, and an image extraction signal indicating the result of extraction is applied to the second block memory 7 for each first target pixel 14, and the process proceeds to step s4.

In step s4, information in the object image signal from the object-image extraction section 6 is stored in the second block memory 7, and the process proceeds to the first-characteristic-amount calculation process in step s5.

In the first-characteristic-amount calculation process in step s5, a first characteristic amount representing the characteristic of the object image section contained in the first local pixel block 15 that contains the first target pixel 14 is calculated by the first-characteristic-amount calculation section 8 on the basis of the object image signal from the second block memory 7, that is, the result of extraction by the object-image extraction section 6. The first characteristic amount calculated by the first-characteristic-amount calculation section 8 is applied to the edge-class determination section 9, and the process proceeds to the edge-class determination process in step s6.

In the edge-class determination process in step s6, it is determined by the edge-class determination section 9 which of the plurality of edge classes the first target pixel 14 belongs to, on the basis of the edge determination signal from the first block memory 5, that is, the determination by the edge determination section 4 and the first characteristic amount calculated by the first-characteristic-amount calculation section 8. The edge-class determination section 9 applies an edge class signal indicating the determination for each edge pixel in the first local pixel block 15, which is the first target pixel 14, to the third block memory 10, and the process proceeds to step s7.

In step s7, information in the edge class signal from the edge-class determination section 9 is stored in the third block memory 10, and the process proceeds to the second-characteristic-amount calculation process in step s8.

In the second-characteristic-amount calculation process in step s8, a second characteristic amount representing the characteristic of an image in the second local pixel block 17 is calculated by the second-characteristic-amount calculation section 11 on the basis of the edge class signal from the third block memory 10, that is, the determination by the edge-class determination section 9. The second-characteristic-amount calculation section 11 applies a signal indicating the second characteristic amount to the image-class determination section 12, and the process proceeds to the image-class determination process in step s9.

In the image-class determination process in step s9, it is determined by the image-class determination section 12 which of the plurality of image classes the second target pixel 16 belongs to, on the basis of the second characteristic amount calculated by the second-characteristic-amount calculation section 11. An image class signal indicating the determination for the second target pixel 16 by the image-class determination section 12 is applied to the output terminal 13, and the process proceeds to step s10 wherein the process of determining which of the plurality of image classes the pixel belongs to is finished.

Figure 6A:
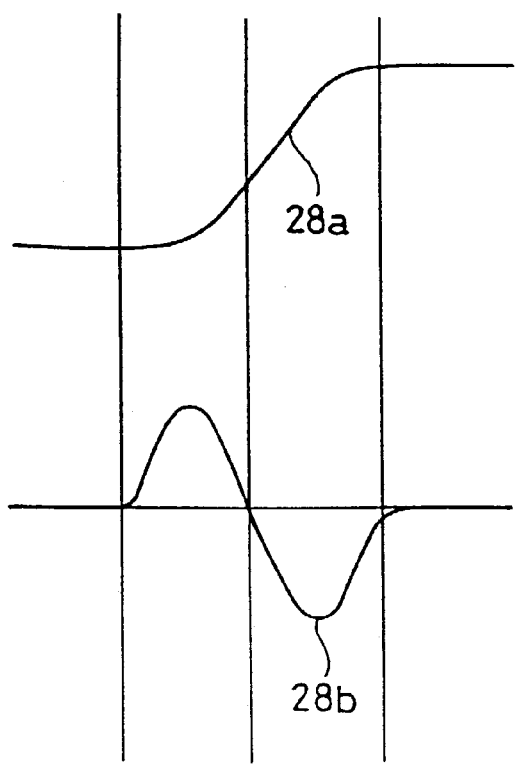
FIGS. 6A and 6B are graphs of the values of pixels before second derivative operation and after the second derivative operation, respectively, FIG. 6A showing a graph of the values of pixels arranged in a predetermined scanning direction before the second derivative operation and FIG. 6B showing a graph of the second derivatives of the values of pixels after the second derivative operation.
Figure 6B:
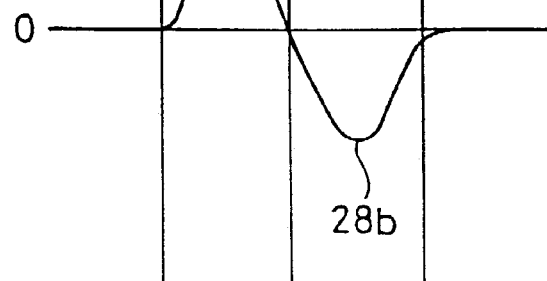

FIG. 4 is a block diagram showing the arrangement of the edge determination section 4. FIG. 5 is a diagram showing a second derivative filter 22 for second derivative operation. FIGS. 6A and 6B are graphs of the values of pixels before and after second derivative operation, respectively, FIG. 6A showing a graph of the values of pixels arranged in a predetermined scanning direction before the second derivative operation and FIG. 6B showing a graph of the second derivatives of the pixels after the second derivative operation. The edge determination section 4 includes a second-derivative operation section 20 for second derivative operation for each pixel and a zero-cross determining section 21 for determining a zero-crossing pixel as an edge pixel on the basis of the result of the second derivative operation by the second-derivative operation section 20.

The red signal R, the green signal G, and the blue signal B from the input terminal 3 are applied to the second-derivative operation section 20 of the edge determination section 4. Based on the red signal R, the green signal G, and the blue signal B from the input terminal 3, the second-derivative operation section 20 performs convolution operation for a pixel block containing 3×3 pixels centering on the first target pixel 14 in the first local pixel block 15 to obtain the gradient of the value of the first target pixel 14 using the second derivative filter 22 having a coefficient shown in FIG. 5.

The convolution operation is a process for obtaining an integrated value by integrating the value of one pixel in a pixel block containing 3×3 pixels centering on the first target pixel 14 with the coefficient of the second derivative filter 22 having the same row number and column number as the pixel, and then obtaining the sum total of the integrated value and respective integrated values for other pixels. For example, an integrated value for a pixel in the first row of the first column is obtained by integrating the value of the pixel with the coefficient in the first row of the first column of the second derivative filter 22, that is, a coefficient 0 in FIG. 5. Then, the sum total of the integrated value obtained for the pixel in the first row of the first column and the respective integrated values obtained for the remaining pixels in the pixel block is obtained. The sum total indicates the second derivative of the value of the first target pixel 14. The convolution operation is performed for all pixels of the input image by setting the each pixel of the input image as the first target pixel 14 in a predetermined order.

For the input image, when the values of the continuous pixels arranged in a prescribed scanning direction are expressed by a solid line 28a shown in FIG. 6A, the result of the second derivative operation by the second-derivative operation section 20 is expressed by a solid line 28b shown in FIG. 6B. When the continuous pixels arranged in the prescribed scanning direction contain an edge pixel, the second derivative of the value of the pixel adjacent to the edge pixel and upstream in the prescribed scanning direction becomes either one of a positive value and a negative value, and the second derivative of the value of the edge pixel (a pixel with a maximum gradient) becomes 0. On the other hand, the second derivative of the value of the pixel adjacent to the edge pixel and downstream in the prescribed scanning direction becomes either one of a positive value and a negative value opposite to the above.

The zero-cross determining section 21 detects a zero-crossing pixel through the second derivative operation by the second-derivative operation section 20. In other words, the zero-cross determining section 21 detects a second derivative that changes from either one of a positive value and a negative value to either one of the opposite positive value and negative value and detects also a pixel in which the second derivative amounts to 0. The zero-cross determining section 21 determines a zero-crossing first target pixel 14 as an edge pixel and applies an edge determination signal that indicates the determination to the first block memory 5. The detection of the zero-crossing pixel by the zero-cross determining section 21 allows the extraction of the edge pixel from the input image.

Figure 7:
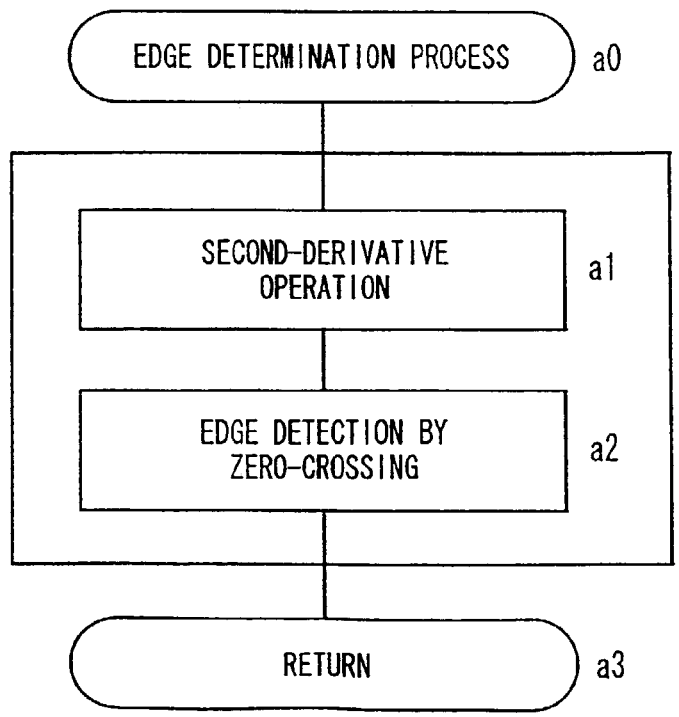
FIG. 7 is a flowchart showing the procedure of an edge determination process in step s1.

FIG. 7 is a flowchart showing the procedure of the edge determination process in step s1. The edge determination process in step s1 includes a second derivative operation of step a1 and a zero-cross determination process of step a2. In step a0, the edge determination process is started, and the process proceeds to the second derivative operation of step a1.

In the second derivative operation of step a1, the second-derivative operation section 20 performs the second derivative operation for each pixel of the input image to obtain the second derivative of the value of the each pixel, and the process proceeds to the zero-cross determination process of step a2.

In the zero-cross determination process of step a2, the zero-cross determining section 21 determines a zero-crossing pixel as an edge pixel on the basis of the result of the second derivative operation by the second-derivative operation section 20, and the process proceeds to step a3 wherein all the procedures of the edge determination process are finished, and the process returns to step s2 shown in FIG. 3.

Figure 8:
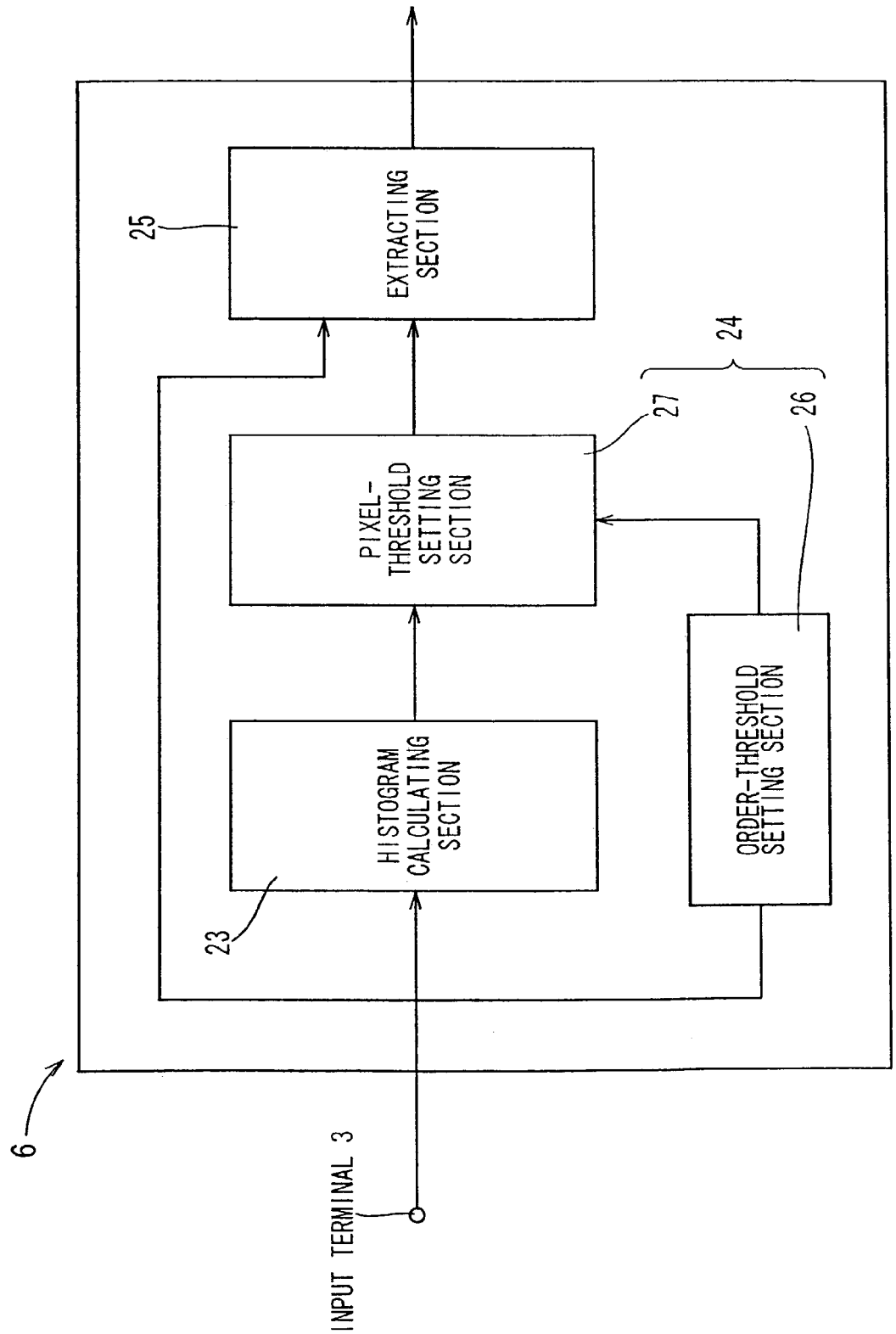
FIG. 8 is a block diagram showing the arrangement of object-image extraction section.
Figure 9A:
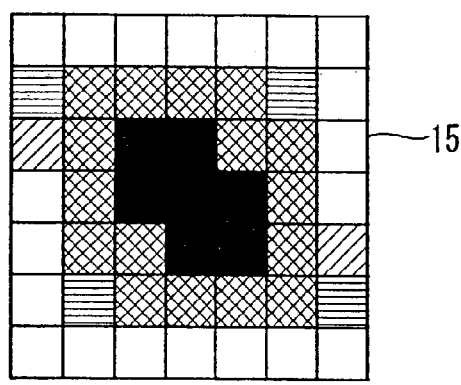
FIGS. 9A to 9C show examples of an object image section in a first local pixel block, FIG. 9A showing the distribution of the concentration of pixels in the first local pixel block, FIG. 9B showing an object image section extracted by a related-art method, and FIG. 9C showing an object image section extracted by using a threshold set by a pixel-threshold setting section.
Figure 9B:
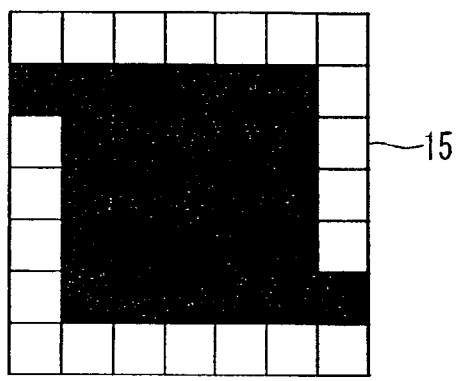
Figure 9C:
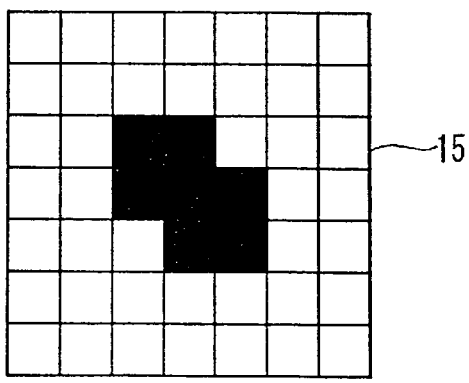
Figure 10A:
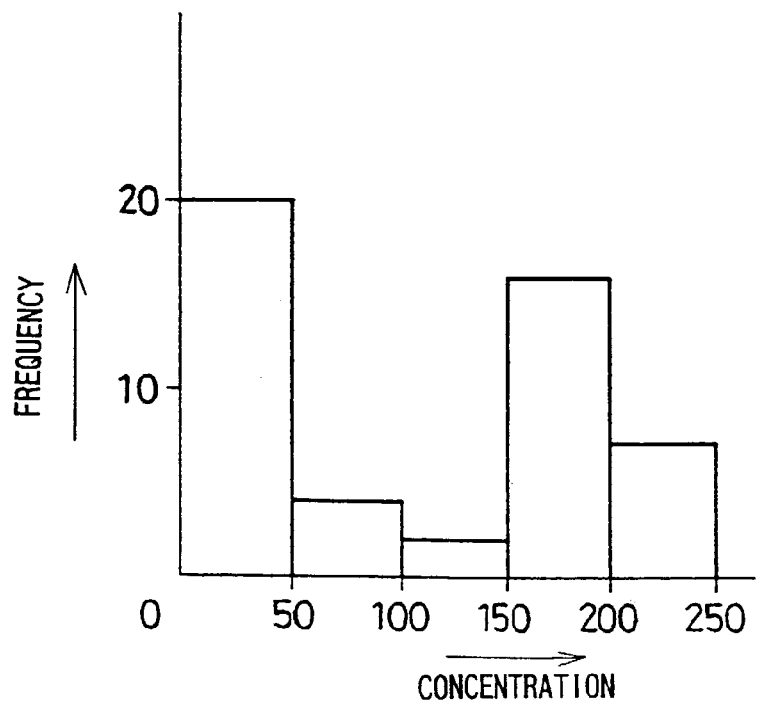
FIGS. 10A and 10B are graphs showing examples of the relationship between the values of the pixels in the first local pixel block, shown in FIG. 9A, and the frequency, FIG. 10A showing the histogram of pixel values and FIG. 10B showing the histogram of cumulative pixel values.
Figure 10B:
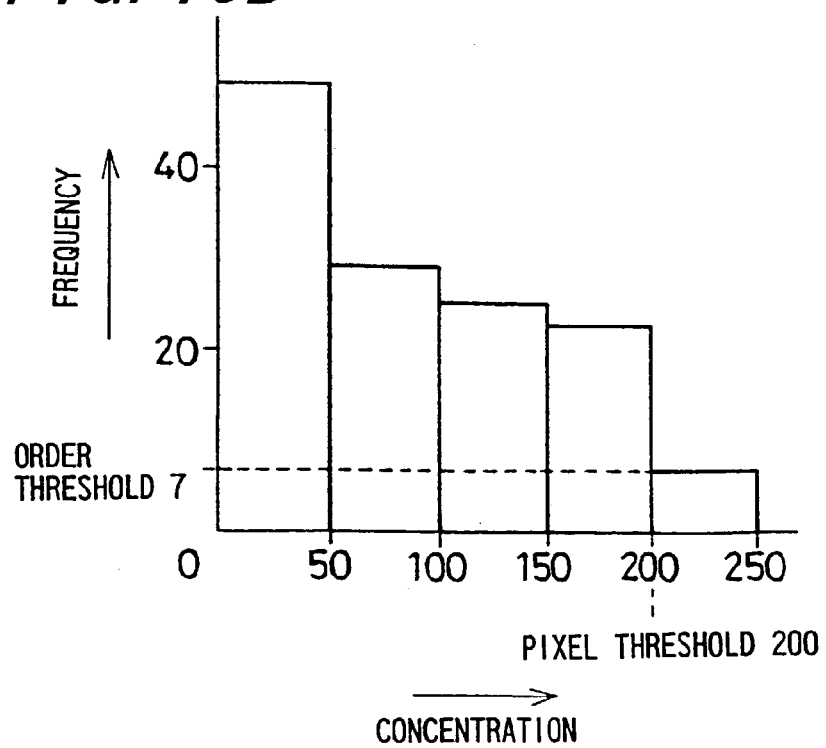

FIG. 8 is a block diagram showing the arrangement of the object-image extraction section 6. FIGS. 9A to 9C show examples of an object image section in the first local pixel block 15, FIG. 9A showing the distribution of the concentration of pixels in the first local pixel block 15, FIG. 9B showing an object image section extracted by a related-art method, and FIG. 9C showing an object image section extracted by using a threshold set by a pixel-threshold setting section 27. FIGS. 10A and 10B are graphs showing examples of the relationship between the values of the pixels in the first local pixel block 15, shown in FIG. 9A, and the frequency, FIG. 10A showing the histogram of pixel values and FIG. 10B showing the histogram of cumulative pixel values. The object-image extraction section 6 includes a histogram calculating section 23, a threshold setting section 24, and a extracting section 25.

The histogram calculating section 23 calculates cumulative histogram for the pixels in the first local pixel block 15 containing the first target pixel 14. The threshold setting section 24 includes an order-threshold setting section 26 and the pixel-threshold setting section 27, setting a pixel threshold on the basis of the cumulative-pixel-value histogram calculated by the histogram calculating section 23. The order-threshold setting section 26 sets an order threshold N for the pixels in the first local pixel block 15 on the basis of information on the values of the pixels either in ascending order or in descending order in the first local pixel block 15. The pixel-threshold setting section 27 sets a pixel threshold on the basis of the order threshold N set by the order-threshold setting section 26. In the embodiment, the object-image extracting threshold is a threshold for extracting an object image section and includes an order threshold and a pixel threshold.

The extracting section 25 compares the value of each pixel in the first local pixel block 15 with the pixel threshold contained in the object-image extracting threshold to divide them into two image sections, or obtain a binary image, and extracts either one of the image sections as an object image section.

The red signal R, the green signal G, and the blue signal B indicating the value of each pixel from the input terminal 3 are applied to the histogram calculating section 23, the order-threshold setting section 26, and the extracting section 25 of the object-image extraction section 6. The histogram calculating section 23 calculates a pixel value histogram showing the distribution of the pixel values, shown in FIG. 10A, for the pixels in the first local pixel block 15 containing the first target pixel 14 shown in FIG. 9A on the basis of the red signal R, the green signal G and the blue signal B from the input terminal 3. The horizontal axis of the pixel value histogram indicates the pixel values, that is, the concentration of the pixels and the vertical axis indicates the frequency. The histogram calculating section 23 calculates a cumulative-pixel-value histogram on the basis of the pixel value histogram.

The sorting of the concentration for obtaining the frequency is set arbitrarily for the pixel value histogram and the cumulative-pixel-value histogram. In this embodiment, the concentration is sorted by 50. In this embodiment, the cumulative-pixel-value histogram shown in FIG. 10B is a graph when the frequencies for the concentration of the pixels are cumulated in ascending order, that is, from the minimum value to the maximum value of the concentration.

The order-threshold setting section 26 sets the order threshold for the pixels in the first local pixel block 15 on the basis of information on the concentration in either ascending or descending order. The order-threshold setting section 26 selects, for the pixels in the first local pixel block 15, either a case of selecting N pixels from a pixel having maximum concentration to a pixel having an N-th high pixel value or a case of selecting N pixels from a pixel having minimum concentration to a pixel having an N-th low pixel value, and sets the order threshold to N. In this embodiment, a predetermined value is used for the order threshold N wherein, for example, when seven pixels from a pixel having the maximum concentration to a pixel having a seventh high pixel value are selected, the order threshold N is set to 7.

The pixel-threshold setting section 27 sets a pixel threshold on the basis of the cumulative-pixel-value histogram calculated by the histogram calculating section 23 and the order threshold N set by the order-threshold setting section 26. For the cumulative-pixel-value histogram, the pixel-threshold setting section 27 sets concentration having a frequency closest to the order threshold as a pixel threshold, and provides information on the pixel threshold to the extracting section 25. In the embodiment, while the concentration having a frequency closest to the order threshold is set to the minimum concentration in each concentration division, it may be a representative value such as a mean value in each concentration division. For the cumulative-pixel-value histogram shown in FIG. 10B, since the order threshold is 7, the pixel threshold is set to 200.

The extracting section 25 extracts an object image section from the input image on the basis of the signal indicating the value of each pixel from the input terminal 3 and the pixel threshold set by the pixel-threshold setting section 27. The extracting section 25 compares the value of the each pixel, or the concentration in the first local pixel block 15, with the pixel threshold to divide them into two image sections, and extracts either one of the image sections as an object image section.

In the embodiment, when the value of the pixel in the first local pixel block 15 is higher than the pixel threshold, the extracting section 25 determines that the pixel is contained in the object image section, and applies a signal indicating 1 to the second block memory 7. When the value of the pixel in the first local pixel block 15 is lower than the pixel threshold, the extracting section 25 determines that the pixel is not contained in the object image section, and applies a signal indicating 0 to the second block memory 7. The extracting section 25 applies a signal indicating the result of the determination for each pixel in the first local pixel block 15 to the second block memory 7 for each first local pixel block 15.

As in the related-art method, in an object image section extracted with the mean value in the first local pixel block 15, a pixel with low concentration, that is, a substrate other than the object image section is also extracted, as shown in FIG. 9B. In the embodiment, an object image section extracted with the pixel threshold set to 200 is illustrated in black, as shown in FIG. 9C. In the embodiment, since a set containing an edge pixel and a pixel having relatively high concentration is extracted as an object image section, the object image section can be accurately extracted, as compared with the object image section according to the related-art method shown in FIG. 9B.

Figure 11A:
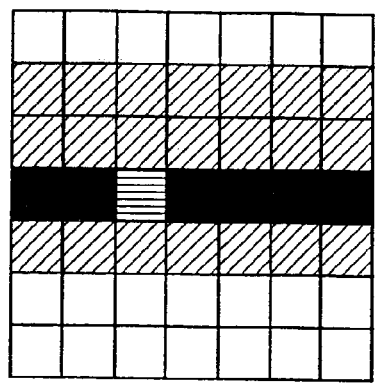
FIGS. 11A to 11C show examples of an object image section in the first local pixel block, FIG. 11A showing the concentration of the pixels in the first local pixel block, FIG. 11B showing an object image section extracted by a related-art method, and FIG. 1C showing an object image section extracted by using a pixel threshold set by the pixel-threshold setting section.
Figure 11B:
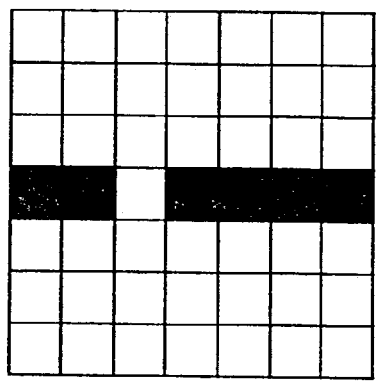
Figure 11C:
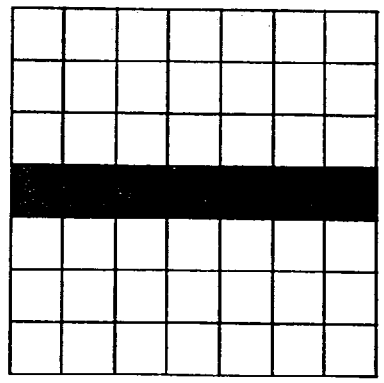
Figure 12A:
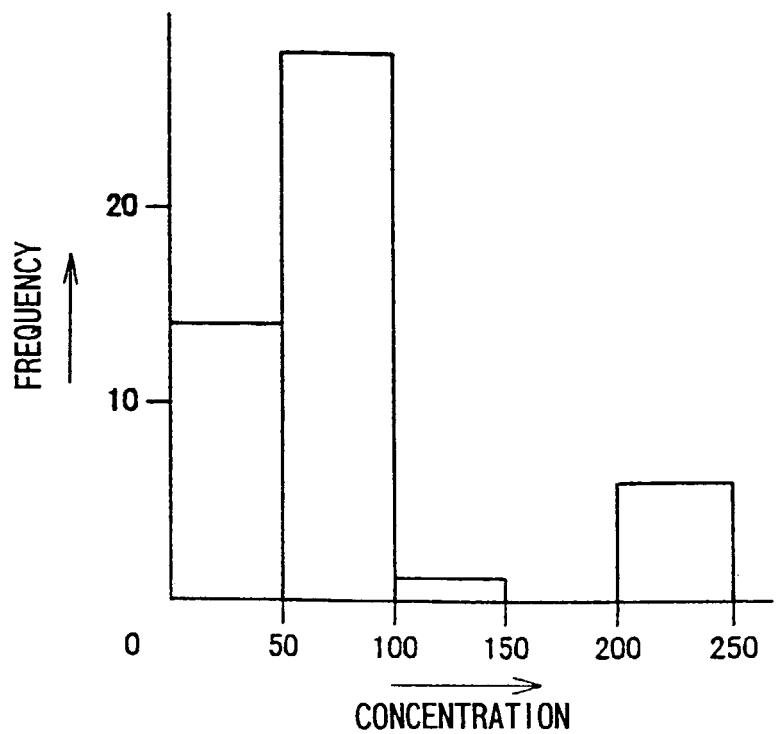
FIGS. 12A and 12B are graphs showing examples of the relationship between the values of the pixels in the first local pixel block, shown in FIG. 11A, and the frequency, FIG. 12A showing the histogram of pixel values and FIG. 12B showing the histogram of cumulative pixel values.
Figure 12B:
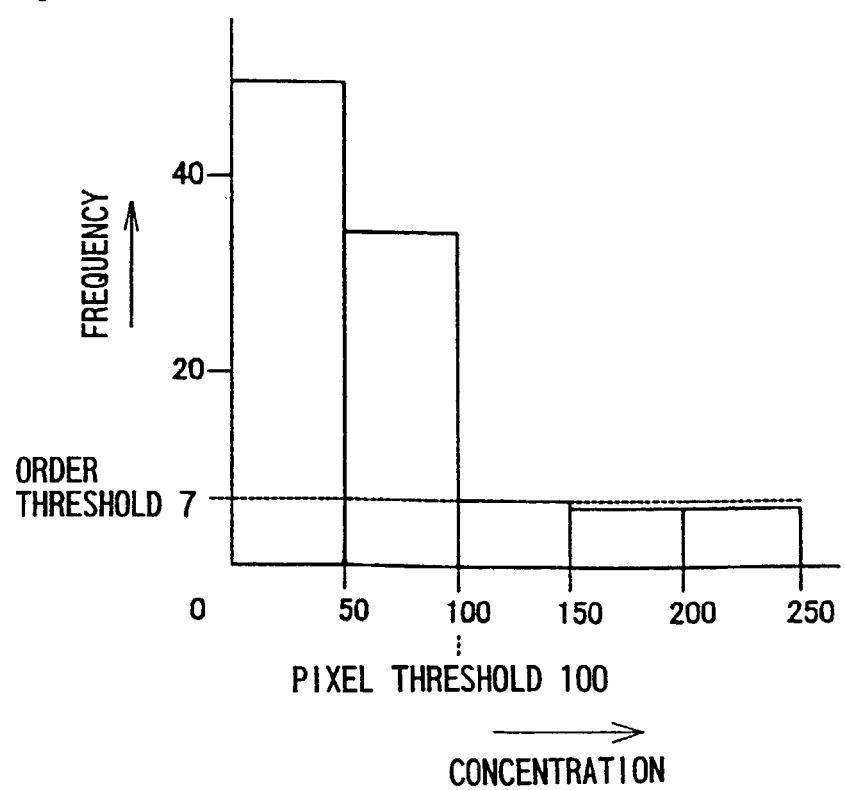

FIGS. 11A to 11C show examples of the object image section in the first local pixel block 15, FIG. 11A showing the concentration of the pixels in the first local pixel block 15, FIG. 11B showing an object image section extracted by the related-art method, and FIG. 11C showing an object image section extracted using a pixel threshold set by the pixel-threshold setting section 27. FIGS. 12A and 12B are graphs showing examples of the relationship between the values of the pixels in the first local pixel block 15, shown in FIG. 11A, and the frequency, FIG. 12A showing the histogram of pixel values and FIG. 12B showing the histogram of cumulative pixel values. A cumulative-pixel-value histogram for the pixels in the first local pixel block 15 shown in FIG. 11 is also calculated by the histogram calculating section 23, as described above.

The histogram calculating section 23 calculates the pixel value histogram shown in FIG. 12A, presenting the distribution of the pixel values in the first local pixel block 15 shown in FIG. 11A on the basis of the red signal R, the green signal G, and the blue signal B from the input terminal 3. The cumulative-pixel-value histogram shown in FIG. 12B is a graph in the case where the frequencies for the concentration of the pixels are cumulated in ascending order, that is, from the minimum concentration toward the maximum concentration.

The order-threshold setting section 26 sets an order threshold of the pixels in the first local pixel block 15 on the basis of the information on the concentration either in ascending order or descending order. In the first local pixel block 15 shown in FIG. 11A, when seven pixels from a pixel having the maximum concentration to a pixel having the seventh high pixel value are selected as in the first local pixel block 15 shown in FIG. 9A, the order threshold is set to 7.

In the first local pixel block 15 shown in FIG. 11A, the division of the concentration having a frequency closest to the order threshold 7, as shown in FIG. 12B is a division from 100 to 150, wherein the minimum concentration 100 in the concentration division is set as the image threshold by the pixel-threshold setting section 27.

The object image section extracted using the mean value in the first local pixel block 15, as in the related-art method, is shown in FIG. 11B. In this case, the pixel shown in FIG. 9A is extracted as the object image section shown in FIG. 9B; thus, in order to extract the section shown in FIG. 9C, it is necessary to use a pixel threshold having a mean value shifted to high concentration. When such a pixel threshold having the mean value shifted to high concentration is applied to the pixel of FIG. 11A, however, the object image section becomes a section shown in FIG. 11B, with the line being broken off, so that a desired object image section cannot be extracted for the line in the character area. More specifically, when the mean value in the first local pixel block 15 or the value shifted from the mean value is used as the pixel threshold for the pixel that belongs to the dot area shown in FIG. 9A and the pixel that belongs to the character area shown in FIG. 11A, an appropriate object image section cannot be extracted for each pixel. Employing this method, however, allows the extraction of a desired object image section shown in FIG. 9C for the pixels shown in FIG. 9A, and that shown in FIG. 11C for FIG. 11A, as described above.

Figure 13:
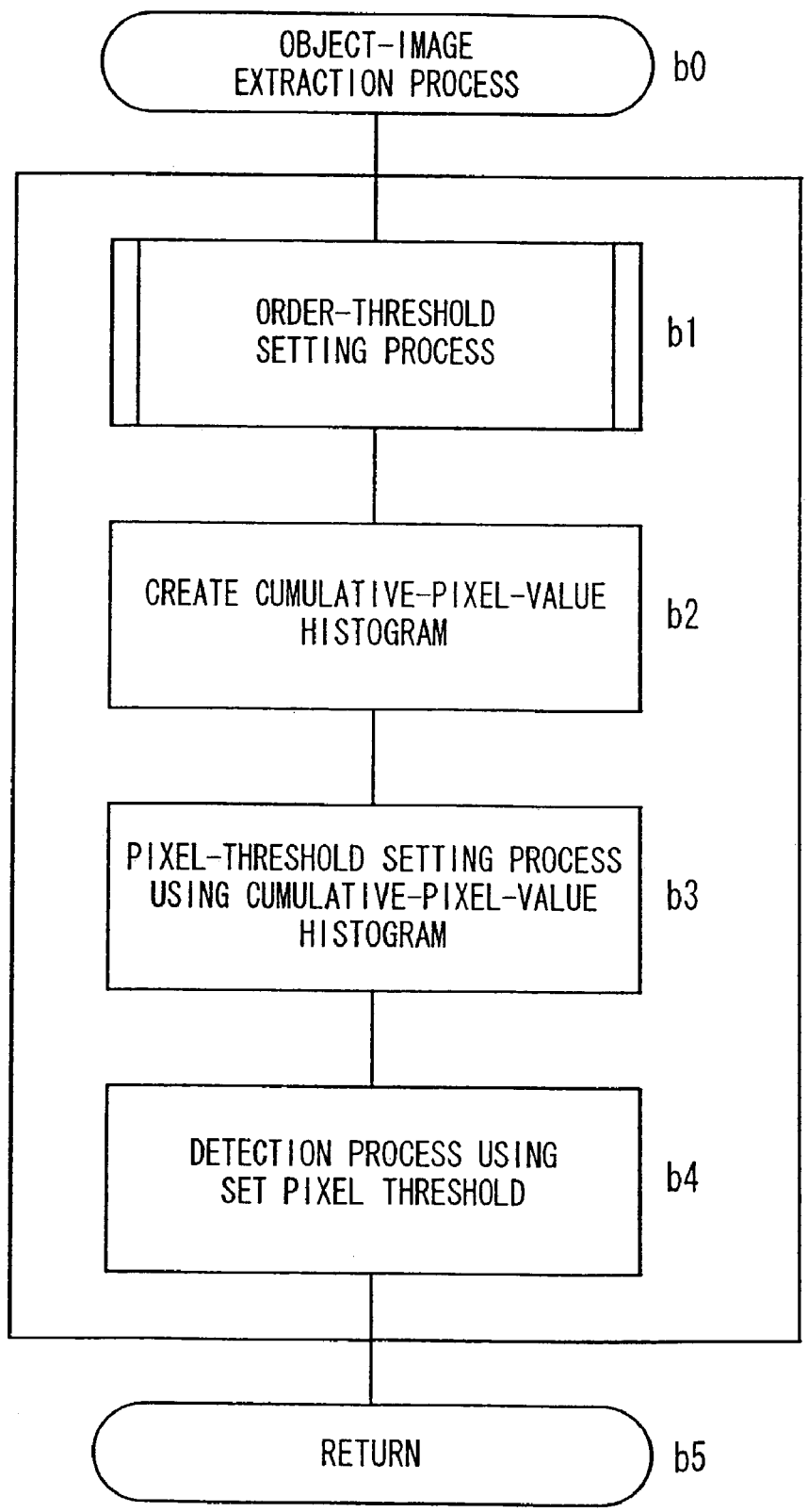
FIG. 13 is a flowchart showing the procedure of an object-image extraction process in step s3.

FIG. 13 is a flowchart showing the procedure of the object-image extraction process in step s3. The object-image extraction process includes a histogram calculation process for calculating a cumulative-pixel-value histogram for the pixels in the first local pixel block 15, a threshold setting process for setting a pixel threshold on the basis of the cumulative-pixel-value histogram in the histogram calculation process, and an extraction process for comparing the values of the pixels in the first local pixel block 15 with the pixel threshold to divide them into two image sections and extracting either one of the image sections as an object image section. The threshold setting process includes an order-threshold setting process for setting an order threshold and a pixel-threshold setting process for setting a pixel threshold.

In step b0, the object-image extraction process is started, and the process proceeds to the order-threshold setting process in step b1. In the order-threshold setting process of step b1, an order threshold N is set by the order-threshold setting section 26, and the process proceeds to the histogram calculation process of step b2.

In the histogram calculation process of step b2, a cumulative-pixel-value histogram for the pixels in the first local pixel block 15 is calculated by the histogram calculating section 23, and the process proceeds to the pixel-threshold setting process of step b3.

In the pixel-threshold setting process of step b3, a pixel threshold is set by the pixel-threshold setting section 27 on the basis of the result of calculation by the histogram calculating section 23 and the order threshold set by the order-threshold setting section 26, and the process proceeds to the extraction process of step b4.

In the extraction process of step b4, the extracting section 25 extracts an object image section on the basis of a signal indicating the value of each pixel of the input image from the input terminal 3 and the pixel threshold set by the pixel-threshold setting section 27. The extracting section 25 compares the value of each pixel in the first local pixel block 15 with the pixel threshold to extract an object image section. The extracting section 25 also applies an object image signal indicating the result of extraction for each pixel in the first local pixel block 15 to the second block memory 7 for each first local pixel block 15. When the extraction process of step b4 is finished, the process proceeds to step b5 wherein all the procedures in the object-image extraction process are finished, and the process returns to step s4 shown in FIG. 3.

Figure 14A:
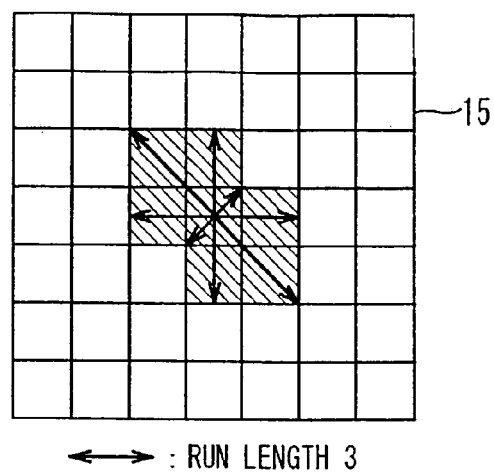
FIGS. 14A and 14B show examples of an object image section in the first local pixel block, FIG. 14A showing an object image section containing a plurality of dot edge pixels, and FIG. 14B showing an object image section containing a plurality of character edge pixels.
Figure 14B:
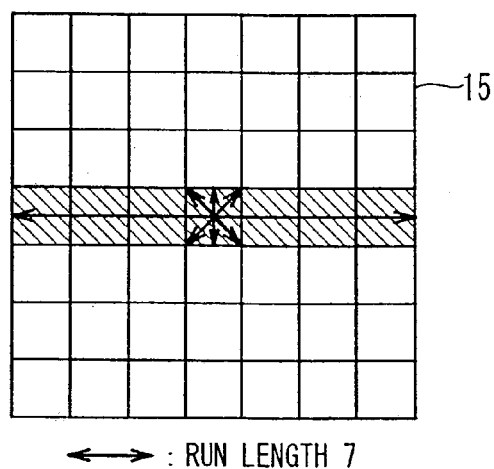

FIGS. 14A and 14B show examples of the object image section in the first local pixel block 15, FIG. 14A showing an object image section containing a plurality of dot edge pixels, and FIG. 14B showing an object image section containing a plurality of character edge pixels. The first-characteristic-amount calculation section 8 serves as run-length calculation means for calculating the run length of the object image signal from the second block memory 7, that is, the object image section extracted by the object-image extraction section 6.

The first-characteristic-amount calculation section 8 obtains the maximum value of the run length that is the number of the continuous pixels contained in the object image section in the main scanning direction and the sub scanning direction, which are prescribed scanning directions in the object image section, and in the 45-degree angle directions parallel to the diagonal directions in the first local pixel block 15.

When the maximum value of the run length which is the first characteristic amount is lower than a predetermined value, the edge-class determination section 9 determines that each edge pixel in the first local pixel block 15 containing a first target pixel 14 that is determined as an edge pixel is a dot edge pixel in the dot area. When the maximum value of the run length is higher than a predetermined value, the edge-class determination means 9 determines that each edge pixel in the first local pixel block 15 is a character edge pixel in the character area.

In the embodiment, the value for comparison with the maximum value of the run length is obtained on the basis of a lot of image samples, being set to a value to obtain highest accuracy of edge classification.

When the object image section is a dot section containing a plurality of dot edge pixels, as shown in FIG. 14A, the run length of the object image section in the main scanning direction and in the sub scanning direction amounts to 3, and the run lengths at 45-degree angle amount to 1 and 3; thus, the maximum value of the run length in the object image section amounts to 3. When the object image section is a character section containing a plurality of character edge pixels, as shown in FIG. 14B, the maximum run length of the object image section amounts to 7 by the similar calculation. The character section contains a character edge pixel and a pixel in the character section, that is, a pixel between the character edge pixels.

The maximum value of the run length in the dotted object image section as in the dot section is lower than that in the linear object image section as in the character section, as described above. Accordingly, the characteristics of a plurality of object image sections can be represented easily and accurately.

Figure 15:
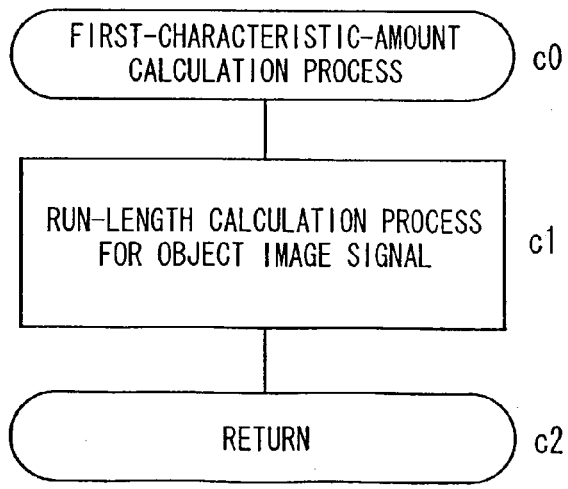
FIG. 15 is a flowchart showing the procedure of a first-characteristic-amount calculation process in step s5.

FIG. 15 is a flowchart showing the procedure of the first-characteristic-amount calculation process of step s5. The first-characteristic-amount calculation process serves as run-length calculation process of calculating the run length of the object image section extracted by the object-image extraction process.

In step c0, the first-characteristic-amount calculation process is started and the process proceeds to step c1. In step c1, the maximum run length is calculated for the object image section in the first local pixel block 15 on the basis of the object image signal from the second block memory 7, and the process proceeds to step c2 where all the procedures of the first-characteristic-amount calculation process are finished, and the process returns to step s6 shown in FIG. 3.

Figure 16A:
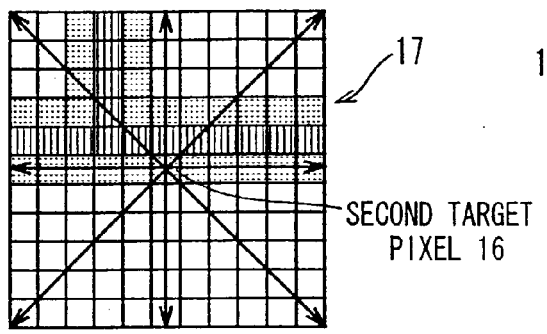
FIGS. 16A to 16D are diagrams showing examples of a second local pixel block after edge classification, FIG. 16A showing a character area, FIG. 16B showing a dot area expressed by a medium number of lines, and FIG. 16C showing a dot area expressed by a small number of lines, and FIG. 16D showing a dot area expressed by a large number of lines.
Figure 16B:
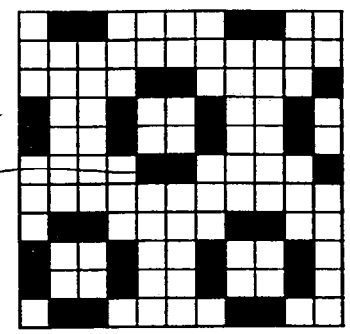
Figure 16C:
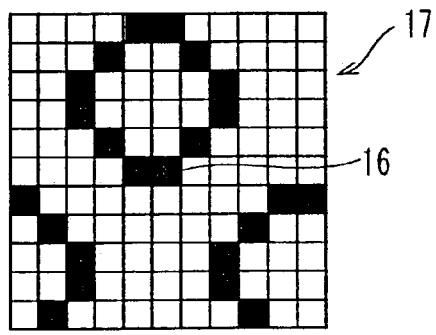
Figure 16D:
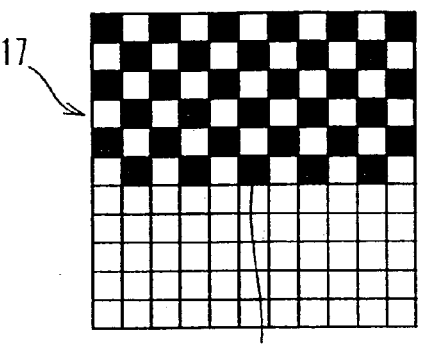

FIGS. 16A to 16D are diagrams of examples of the second local pixel block 17 after edge classification, FIG. 16A showing a character area, FIG. 16B showing a dot area expressed by a medium number of lines, FIG. 16C showing a dot area expressed by a small number of lines, and FIG. 16D showing a dot area expressed by a large number of lines. When a pixel that belongs to the character area is classified from the pixels in the input image, the second-characteristic-amount calculation section 11 calculates the run length of the character edge pixels among various edge pixels in the second local pixel block 17 as the second characteristic amount on the basis of the edge class signal from the third block memory 10, that is, the determination by the edge-class determination section 9. The run length of the character edge pixels is calculated by the second-characteristic-amount calculation section 11, so that the characteristic of the character area can be obtained.

For a plurality of adjacent pixels arranged in the main scanning direction, in the sub scanning direction, and in the 45-degree angle direction in the second local pixel block 17, the maximum run length of the character edge pixels is calculated. For the character area shown in FIG. 16A, the run length of character edge pixels in the main scanning direction amounts to 11, the run length of character edge pixels in the sub scanning direction amounts to 4, and the run length of character edge pixels at 45-degree angle amounts to 1. Accordingly, the maximum run length of the character edge pixels in the second local pixel block 17 shown in FIG. 16A amounts to 11, and so the maximum value 11 is calculated as a second characteristic amount.

Similarly, the maximum value of the run length of the character edge pixels in the dot area expressed by a middle number of lines from about 120 to 150, shown in FIG. 16B amounts to 0, in other words, there is no character edge pixels. The number of lines indicates the ratio of the number of lines of white and black dots per one inch. The maximum run length of the character edge pixels amounts to 0 in a dot area expressed by a small number of lines of about 65 to 100, shown in FIG. 16C. The maximum run length of the character edge pixels amounts to 0 in a dot area expressed by a large number of lines of 175 or more, shown in FIG. 16D. The maximum run length 0 of the character edge pixels is calculated as the second characteristic amount in the second local pixel block 17 shown in FIGS. 16B to 16D.

As described above, the run length of the character edge pixels in the second local pixel block 17, which corresponds to the character area, is larger than the run length of the dot edge pixels in the second local pixel block 17 which corresponds to the dot area. Providing the conditions such that the run length of the character edge pixels in the second local pixel block 17 is larger than the threshold 6 allows the discrimination between the character area and the dot area. The use of the run length of the character edge pixels as the second characteristic amount allows the determination as to whether the second target pixel 16 belongs to the character area or the dot area.

Figure 17:
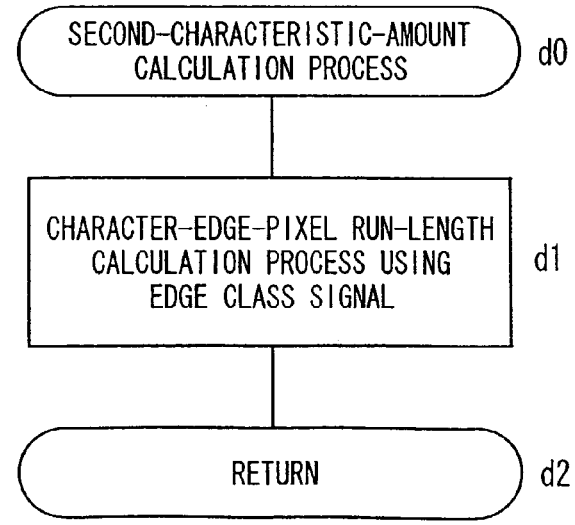
FIG. 17 is a flowchart showing the procedure of a second-characteristic-amount calculation process in step s8.

FIG. 17 is a flowchart showing the procedure of the second-characteristic-amount calculation process in step s8. In step d0, the second-characteristic-amount calculation process is started, and the process proceeds to step d1. In step d1, the run length of the character edge pixels in the second local pixel block 17 is calculated on the basis of the edge class signal from the third block memory 10, that is, the determination by the edge-class determination section 9, and the process proceeds to step d2 wherein all the procedures of the second-characteristic-amount calculation process are finished, and the process returns to step s9 shown in FIG. 3.

FIG. 18 is a block diagram showing the arrangement of an image forming apparatus 1. The image forming apparatus 1 is an apparatus for forming an image on a recording material including a recording sheet made of paper and a material other than paper, including an image input apparatus 30, an image processing apparatus 31, and an image output apparatus 32.

The image input apparatus 30 reads an image formed on the original, including a scanner equipped with a line sensor that uses a solid-state image sensing device such as a charge coupled device (abbreviated as a CCD). The image input apparatus 30 applies white light to the original with a light source, senses the color of the reflected light from the original, that is, the wavelength and the intensity in an split condition into a plurality of pixels arranged in a predetermined main scanning direction and the sub scanning direction by the CCD line sensor to read the image of the original, and provides original image data which represents the image of the original by the color and intensity of the pixels by an electrical signal for the image processing apparatus 31.

The original image data is represented by values corresponding to the concentration of three color components, red, green, and blue, and applied to the image processing apparatus 31 as a red signal R, a green signal G, and a blue signal B by the image input apparatus 30. The red signal R is an electrical signal that represents the reflectance of red light from the original in analog form for each pixel. The green signal G is an electrical signal that represents the reflectance of green light from the original in analog form for each pixel. The blue signal B is an analog electrical signal that represents the reflectance of blue light from the original in analog form for each pixel.

The image processing apparatus 31 extracts a plurality of image areas from the entire image on the basis of the provided original image data and performs image processing for the image areas such that the reproducibility of the original image can be improved during the output of the image. The image processing includes an area division process for extracting a plurality of image areas from the entire image and a color correction process for correcting the color components of the pixels contained in the entire image. The image processing apparatus 31 includes an analog/digital converting section (hereinafter, referred to as an A/D converting section) 33, a shading correcting section 34, the input-gray-level correcting section 35, an area separating section 2, a color correcting section 36, a black-generation under-color removing section 37, a spatial filtering section 38, an output-gray-level correcting section 39, and a gray-level reproducing section 40.

The A/D converting section 33 converts an applied analog signal to a digital signal. Specifically, the A/D converting section 33 converts the analog red signal R, green signal G, and blue signal B applied by the image input apparatus 30 to digital signals which represent the reflectance of the red light, the green light, and the blue light for each pixel, respectively. The A/D converting section 33 applies the red signal R, the green signal G, and the blue signal B converted to the digital signals to the shading correcting section 34.

The shading correcting section 34 removes a distortion component contained in the data represented by the red signal R, the green signal G, and the blue signal B from the A/D converting section 33. More specifically, the shading correcting section 34 removes various distortion components of the red signal R, the green signal G, and the blue signal B from the A/D converting section 33, which are generated in an illumination system, an image-forming optical system, and an imaging system (image receiving system) of the image input apparatus 30, and applies the processed red signal R, green signal G, and blue signal B to the input-gray-level correcting section 35.

The input-gray-level correcting section 35 balances the colors of data represented by the applied signals, and converts them to signals of data which can easily be processed in image processing. The input-gray-level correcting section 35 corrects the respective reflection coefficients of the red signal R, the green signal G, and the blue signal B from the shading correcting section 34 so as to balance the colors, and converts the light reflection coefficients of the color components to signals representing the respective concentrations of the red light, green light, and blue light. Thereafter, the input-gray-level correcting section 35 applies the red signal R, the green signal G, and the blue signal B represented by the red, green, and blue concentrations of the pixels, respectively, to the area separating section 2.

The area separating section 2 determines which of a plurality of image areas: the character area, the dot area, the dot character area, and the photograph (printed picture) area, each pixel of the input image belongs to, on the basis of the red signal R, the green signal G, and the blue signal B from the input-gray-level correcting section 35. The area separating section 2 applies an image class signal indicating the determination to the black-generation under-color removing section 37, the spatial filtering section 38, and the gray-level reproducing section 40 and applies the red signal R, the green signal G, and the blue signal B from the input-gray-level correcting section 35 to the color correcting section 36 in the next stage. The area separating section 2 separates the pixels of the original image represented by the original image data, as the components of the plurality of image areas, on the basis of the red signal R, the green signal G, and the blue signal B from the input-gray-level correcting section 35. In the embodiment, the image area includes the character area that represents a character, a dot area that represents an image by dots, and an on-dot character area that represents the substrate by dots.

The color correcting section 36 performs a correction for removing color muddiness of an unnecessary absorbing components in the cyan, magenta, and yellow used as color materials, on the basis of the spectrum properties thereof so as to improve the reproducibility of the color of the original image during the output of the image. The color correcting section 36 applies a cyan signal C, a magenta signal M, and a yellow signal Y indicating the respective concentrations of the corrected cyan, magenta, and yellow of the pixels of the input image to the black-generation under-color removing section 37.

The black-generation under-color removing section 37, the spatial filtering section 38, and the gray-level reproducing section 40 perform appropriate processing for the various areas containing the pixels of the input image which are accurately classified by the area separating section 2. The black-generation under-color removing section 37 performs black generation processing for generating black on the basis of the applied respective concentrations of the cyan, magenta, and yellow and under-color removal (abbreviated as a UCR) processing of subtracting the black concentration obtained by the black generation processing to obtain the respective new concentration values of cyan, magenta, and yellow.

An example of the black generation processing is a skeleton black method, wherein a function y that designates the input/output characteristics of the skeleton curve is expressed by y=f(x), and the black generation processing and the under-color removal processing are expressed by the equations:

$$K=f\{\min(C,M,Y)\}$$

$$C1=C-\alpha K$$

$$M1=M-\alpha K$$

$$Y1=Y-\alpha K$$

where C is the concentration of cyan, M is the concentration of magenta, and Y is the concentration of yellow, which are given by the color correcting section 36, and C1 is the concentration of cyan, M1 is the concentration of magenta, Y1 is the concentration of yellow, and K is the concentration of black, which are newly generated, and $\alpha$ ($0 < \alpha < 1$) is the under-color removal rate.

In the black-generation under-color removing section 37, the black generation amount and the under-color removal amount are switched depending on the kind of area on the basis of the image class signal from the area separating section 2. The three color signals: the cyan signal C, the magenta signal M, and the yellow signal Y applied to the black-generation under-color removing section 37 by the color correcting section 36 are converted to the four color signals: the cyan signal C, the magenta signal M, the yellow signal Y, and the black signal K by the process in the black-generation under-color removing section 37. The black-generation under-color removing section 37 gives the cyan signal C, the magenta signal M, the yellow signal Y, and the black signal K after the black-generation processing and the under-color removal processing to the spatial filtering section 38.

The spatial filtering section 38 applies filtering to the image data on the basis of the image class signal in order to prevent blurring and degradation of graininess of the image during the output of the image to correct the spatial frequency response of each image area. For example, the spatial filtering section 38 performs edge enhancement processing for enhancing the edge and smoothing for removing a noise. The spatial filtering section 38 applies the cyan signal C, the magenta signal M, the yellow signal Y, and the black signal K after the filtering to the output-gray-level correcting section 39.

In the spatial filtering section 38, the smoothing is performed on the dot area to suppress the generation of moire and the edge enhancement processing is applied to the character area to improve the reproducibility of the character section.

The gray-level reproducing section 40 performs gray-level-reproduction processing for outputting an image on the basis of the cyan signal C, the magenta signal M, the yellow signal Y, and the black signal K from the spatial filtering section 38 and the image class signal from the area separating section 2. The gray-level reproducing section 40 applies the cyan signal C, the magenta signal M, the yellow signal Y, and the black signal K after the gray-level-reproduction processing to the image output apparatus 32.

For an image area containing a pixel which is determined to belong to a character area by the area separating section 2, the spatial filtering section 38 performs sharpness enhancement processing to increase the enhancement at high frequency in order to particularly increase the reproducibility of a black character and a chromatic color character. Thereafter, in the gray-level reproducing section 40, either binarization processing or multilevel processing is performed with a high-resolution screen suitable for reproduction of high frequency.

For an image area containing a pixel that is determined to belong to a dot area by the area separating section 2, the spatial filtering section 38 performs low-pass filtering to remove an input dot component. Thereafter, the output-gray-level correcting section 39 converts signals indicating the concentration of each pixel to a dot area index that is the characteristic of the image output apparatus 32 by output-gray-level correcting process. In the gray-level reproducing section 40, finally, the image is processed so that it is separated into a plurality of pixels and the individual gray level is reproduced. For an image area that is determined to be a photograph area by the area separating section 2, the gray-level reproducing section 40 performs either binarization processing or multilevel processing with a high-resolution screen suitable for gray-level reproduction.

The image data that is subjected to various image processing by the image processing apparatus 31 is temporarily stored in storage means (not shown), is read out in a prescribed timing, and is sent to the image output apparatus 32.

The image output apparatus 32 is a apparatus for forming an image on a recording material on the basis of the image data that is subjected to various image processing by the image processing apparatus 31. Examples of the image output apparatus 32 are an electrophotographic color-image output apparatus and an inkjet color-image output apparatus; however, it is not limited to those. The image output apparatus may be an image display such as a liquid crystal display. For the image forming apparatus 1, various processing to the image data is controlled by a central processing unit (abbreviated as a CPU, not shown).

While the above-described embodiment is merely an example of the invention, it is to be understood that modifications are possible within the scope of the invention. For example, the object-image extraction section 6 may include only the threshold setting section 24 and the extracting section 25. The threshold setting section 24 with such an arrangement sets a pixel threshold by the setting of a preset value as an order threshold N, and the extracting section 25 extracts an object image section using the pixel threshold.

According to the embodiment, the first target pixel 14 and the second target pixel 16 are subjected to determination processing by using not only the characteristic amount for each edge pixel but also the characteristic amount for an image area containing a plurality of pixels, so that the accuracy of the determination for the target pixels 14 and 16 can be increased, thus allowing accurate determination as to which of a plurality of image areas each pixel belongs to without error.

Since an edge pixel can be extracted easily and accurately by detecting a zero-crossing pixel on the basis of the result of the second derivative operation by the second-derivative operation section 20, the texture representing the characteristic amount of the entire image, such as the complicatedness of the image, can be presented accurately during the output of the image.

In the method of using a mean value for a local pixel block containing a plurality of pixels and a preset value as thresholds by setting an object-image extracting threshold in accordance with the value of each pixel in the first local pixel block 15, a dot-like and a linear object image section which are difficult to extract can be extracted accurately.

The use of a cumulative-pixel-value histogram allows a frequency distribution for the values of pixels in the first local pixel block 15 to be obtained, thus facilitating setting of an order threshold and a pixel threshold contained in the object-image extracting threshold. Setting the object-image threshold on the basis of the cumulative histogram facilitates the extraction of pixels having a pixel value higher than a predetermined pixel value as an object image section.

Calculating the run length of the object image section as a first characteristic amount of the object image section allows the respective characteristics of the plurality of image sections including the character section and the dot section to be represented accurately, thus facilitating edge classification for the edge pixel.

The use of the run length of edge pixels that are classified as character edge pixels improves the accuracy of the determination for the second target pixel 16, allowing the extraction of a character edge pixel with high determination accuracy for the second target pixel 16 to accurately classify a pixel that belongs to the character area.

Figures 19, 20:
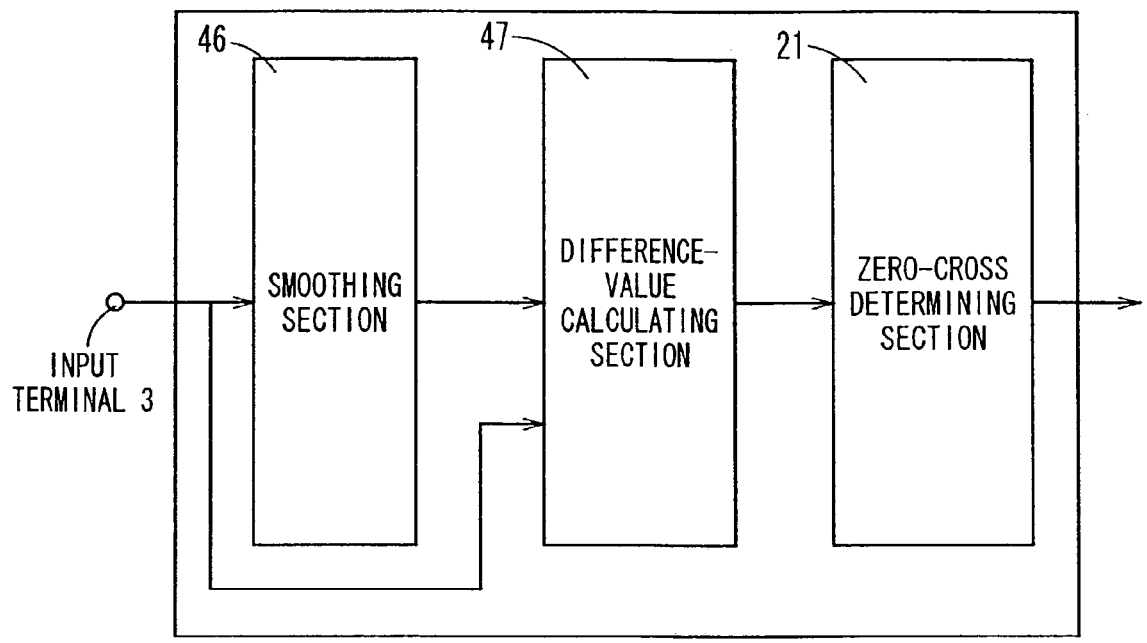
FIG. 19 is a block diagram showing the arrangement of edge determination section in a second embodiment of the invention.
FIG. 20 is a diagram showing a smoothing filter.
Figure 21A:
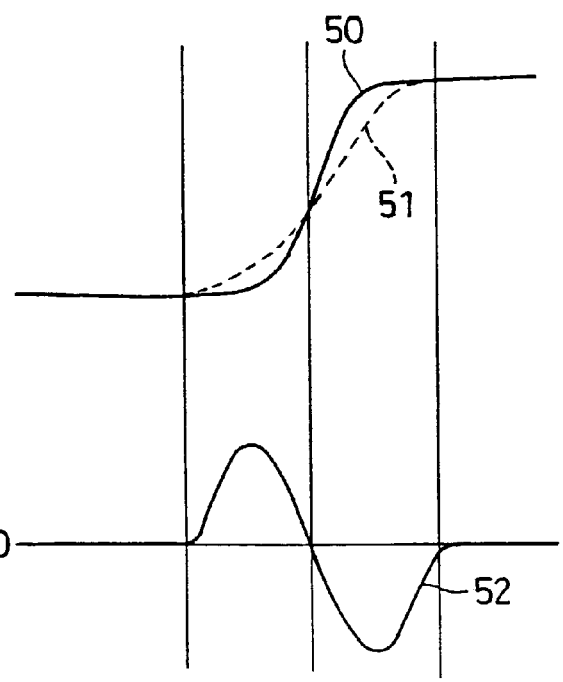
FIGS. 21A and 21B are graphs showing the concentration of the pixels before the edge determination process and after the edge determination process, respectively, FIG. 21A showing the concentration of pixels before smoothing, and the concentration of pixels after smoothing, and FIG. 21B showing the difference value for the pixels.
Figure 21B:
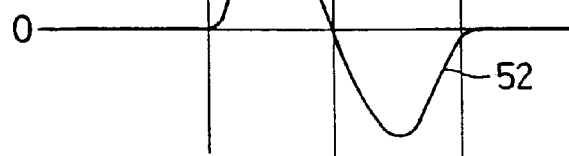

FIG. 19 is a block diagram showing the arrangement of an edge determination section 45 in a second embodiment of the invention. FIG. 20 is a diagram showing a smoothing filter 49. FIGS. 21A and 21B are graphs showing the concentrations of the pixels before and after the edge determination process, respectively, FIG. 21A showing the concentration of pixels before smoothing and the concentration of pixels after smoothing, FIG. 21B showing the difference value for the respective pixels. In the first embodiment of the invention, the edge determination section 4 determines a zero-crossing pixel as an edge pixel on the basis of the result of a second derivative operation for the pixels. On the other hand, according to this embodiment, each pixel is subjected to smoothing filter process and a zero-crossing pixel is determined as an edge pixel on the basis of the difference between the result of smoothing and each pixel value.

The arrangement of the embodiment is similar to that of the area separating section 2 except for the arrangement of part of the edge determination section 4 in the first embodiment of the invention. Accordingly, a description of the same arrangement will be omitted and the same components are given the same reference numerals.

The edge determination section 45 that is the edge determination means of this embodiment includes a smoothing section 46, a difference-value calculating section 47, and the zero-cross determining section 21. The smoothing section 46 performs smoothing filtering process for each pixel. The difference-value calculating section 47 obtains the difference value between the result of the smoothing by the smoothing section 46 and the value of each pixel.

The red signal R, the green signal G, and the blue signal B from the input terminal 3 are applied to the smoothing section 46 and the difference-value calculating section 47 of the edge determination section 45. The smoothing section 46 performs a convolution operation for removing a noise component contained in the value of the first target pixel 14 using the smoothing filter 49 having coefficients shown in FIG. 20 for a pixel block containing 3×3 pixels with center at the first target pixel 14 in the first local pixel block 15, on the basis of the red signal R, the green signal G, and the blue signal B from the input terminal 3.

The smoothing section 46 obtains integration value by integrating the value of each pixel in the pixel block containing the 3×3 pixels with center at the first target pixel 14 in the first local pixel block 15, with each coefficient of the smoothing filter 49 having the same row number and the same column number as those of the each pixel, and obtaining a value obtained by dividing the sum total of the integration values by the sum of the filter coefficients. In this embodiment, the value of the each pixel indicates concentration.

For example, for the pixel in the first row of the first column in the pixel block, the integration value is obtained by integrating the value of the pixel with the coefficient in the first row of the first column of the smoothing filter 49, that is, coefficient 1 in FIG. 20. The sum total of the integration value obtained for the pixel in the first row of the first column and the integration values obtained for the remaining pixels in the pixel block is obtained. A value obtained by dividing the sum total of the integration values by the sum of the filter coefficients indicates the pixel value of the first target pixel 14 after the removal of a noise component.

The difference-value calculating section 47 calculates the difference value between the value obtained by dividing the sum total of the integration values which is the result of smoothing by the smoothing section 46 by the sum of the filter coefficients and the value of the first target pixel 14. The processing by the smoothing section 46 and the difference-value calculating section 47 is subjected to all the pixels of the input image by setting each pixel of the input image to the first target pixel 14 in a fixed order.

For the input image, when the values of the continuous pixels arranged in a prescribed scanning direction are expressed by the solid line 50 shown in FIG. 21A, the result of smoothing by the smoothing section 46 is expressed by the broken line 51 shown in FIG. 21A. The difference value is a value obtained by subtracting the value of each pixel from the result of smoothing by the smoothing section 46, which is expressed by the solid line 52 shown in FIG. 21B. When the continuous pixels arranged in the predetermined scanning direction contain an edge pixel, the difference value of a pixel adjacent to the edge pixel and upstream in the predetermined scanning direction amounts to either a positive value or a negative value, the difference value of the edge pixel amounts to 0, and the difference value of a pixel adjacent to the edge pixel and downstream in the predetermined scanning direction amounts to either a positive value or a negative value opposite to the above.

The zero-cross determining section 21 determines the zero-crossing first target pixel 14 as an edge pixel on the basis of the result of calculation by the difference-value calculating section 47 and applies an edge determination signal indicating the determination to the first block memory 5. The zero-crossing pixel is detected by the zero-cross determining section 21, so that an edge pixel is extracted from the input image.

Figure 22:
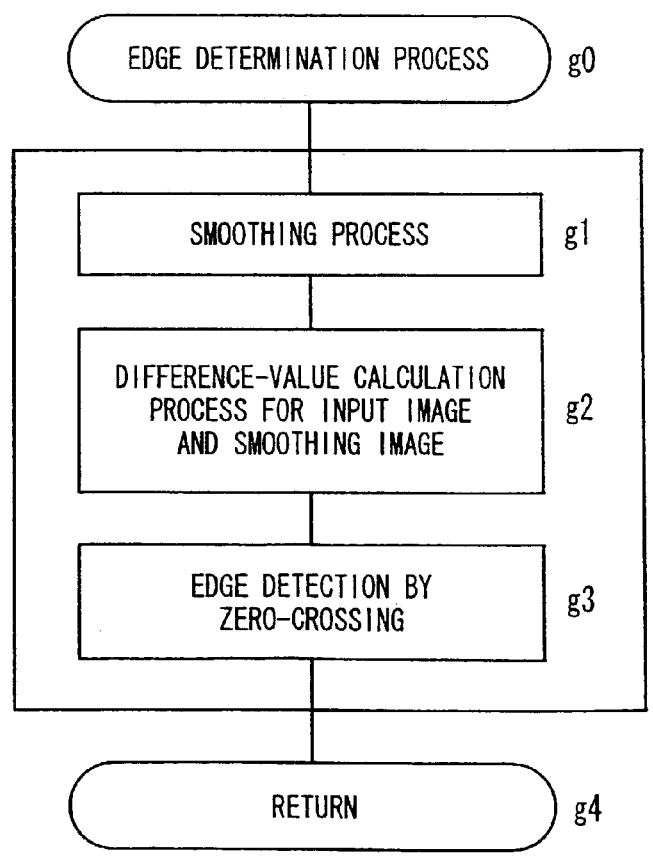
FIG. 22 is a flowchart showing the procedure of an edge determination process in the second embodiment of the invention.

FIG. 22 is a flowchart showing the procedure of an edge determination process in the second embodiment of the invention. The edge determination process of the embodiment includes a smoothing process for performing smoothing filter processing for each pixel, a difference-value calculation process for obtaining the difference between the result of smoothing in the smoothing process and each pixel value, and a zero-cross determination process for determining a zero-crossing pixel as an edge pixel on the basis of the difference value calculated by the difference-value calculation process.

In the embodiment, the processes except for the edge determination process of step s1 shown in FIG. 3 are the same as those of the first embodiment of the invention. Accordingly, a description thereof will be omitted here.

In step g0, the edge determination process is started, and the process proceeds to the smoothing process of step g1. In the smoothing process of step g1, a convolution operation is performed for a pixel block containing 3×3 pixels with center at the first target pixel 14 using the smoothing filter 49, thereby removing a noise component from the value of the first target pixel 14, and the process proceeds to the difference-value calculation process of step g2.

In the difference-value calculation process of step g2, each pixel value before the processing is subtracted from the result of smoothing by the smoothing section 46 to obtain the difference value, and the process proceeds to the zero-cross determination process of step g3. In the zero-cross determination process of step g3, a zero-crossing first target pixel 14 is determined as an edge pixel on the basis of the difference value calculated by the difference-value calculating section 47. When the determination process by the zero-cross determination process is finished, the process proceeds to step g4 wherein all the procedures in the edge determination process are finished and the process returns to step s2 shown in FIG. 3.

According to the embodiment, the removal of a noise contained in the value of each pixel of the input image by smoothing filter processing facilitates accurate extraction of an edge pixel without erroneously determining that a pixel containing a noise component is an edge pixel.

Figure 23:
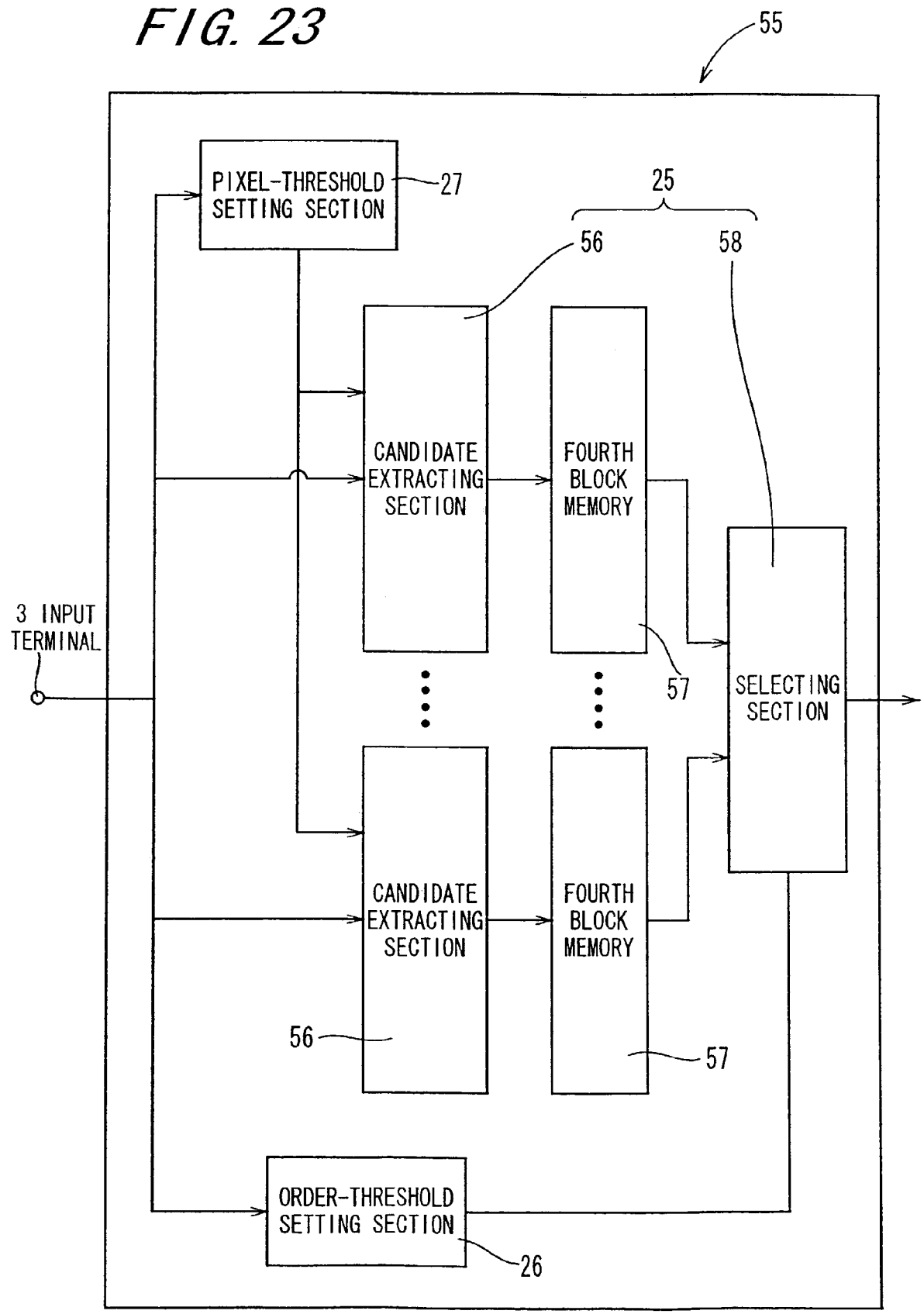
FIG. 23 is a block diagram showing the arrangement of object-image extraction section in a third embodiment of the invention.
Figure 24A:
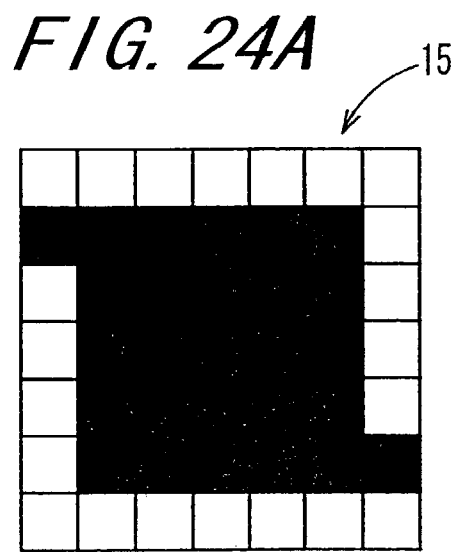
FIGS. 24A to 24D show examples of the object image section in the first local pixel block, shown in FIG. 9A, FIG. 24A showing an object image section when the pixel threshold is set to 100, FIG. 24B showing an object image section when the pixel threshold is set to 150, FIG. 24C showing an object image section when the pixel threshold is set to 200, and FIG. 24D showing an object image section when the pixel threshold is set to 250.
Figure 24B:
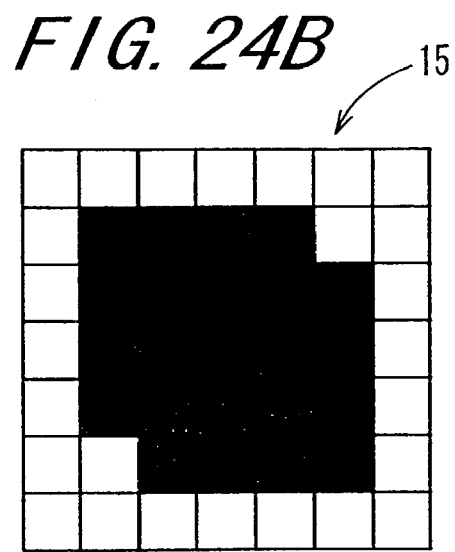
Figure 24C:
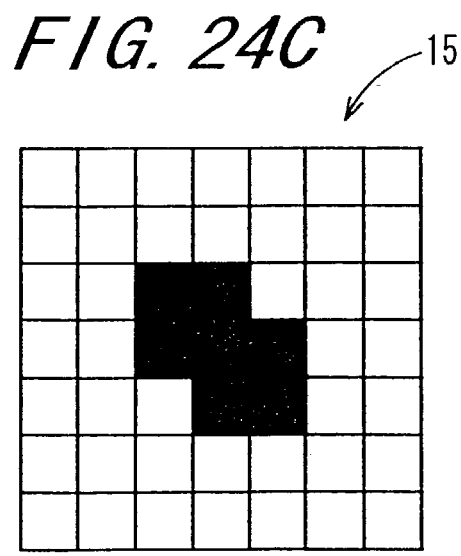
Figure 24D:
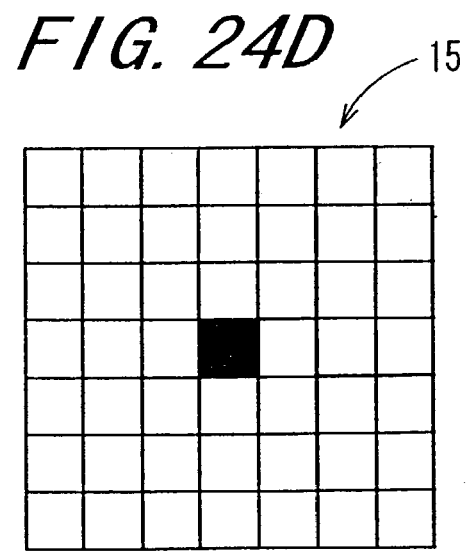

FIG. 23 is a block diagram showing the arrangement of object-image extraction section 55 in a third embodiment of the invention. FIGS. 24A to 24D show examples of an object image section in the first local pixel block 15, FIG. 24A showing an object image section when the pixel threshold is set to 100, FIG. 24B showing an object image section when the pixel threshold is set to 150, FIG. 24C showing an object image section when the pixel threshold is set to 200, and FIG. 24D showing an object image section when the pixel threshold is set to 250. The object-image extraction section 55 served as object-image extraction means of this embodiment extracts candidates for the object image section by using a plurality of pixel thresholds contained in the object-image extracting thresholds and selects one of them as the object image section.

The arrangement of the embodiment is the same as that of the area separating section 2 except for the arrangement of part of the object-image extraction section 6 in the first embodiment of the invention. Accordingly, a description of the same arrangement will be omitted and the same components are given the same reference numerals.

The object-image extraction section 55 of this embodiment includes the threshold setting section 24, the extracting section 25, and a fourth block memory 57. The object-image extraction section 55 compares an object-image extracting threshold set by the threshold setting section 24 with the value of each pixel in the first local pixel block 15 to divide them into two image sections, and extracts either one of the image sections as an object image section. The object-image extraction section 55 processes each first local pixel block 15 to set the first target pixel 14 in a prescribed order, thereby processing the entire input image. The threshold setting section 24 includes the order-threshold setting section 26 and the pixel-threshold setting section 27, setting a plurality of object-image extracting thresholds on the basis of the first local pixel block 15.

The order-threshold setting section 26 sets an order threshold in accordance with information on the pixel values in either an ascending order or descending order on the basis of the value of each pixel in the first local pixel block 15. In the embodiment, the order threshold is set previously. The pixel-threshold setting section 27 sets four pixel values as pixel threshold values, for the values of the pixels in the first local pixel block 15, the pixel values dividing the mean value and the maximum pixel value into five equal parts. For example, when the mean pixel value is 100 and the maximum pixel value is 200, the four pixel values that divide the mean pixel value and the maximum pixel value into five equal parts amount to 120, 140, 160, and 180. There is no need to set the order threshold repeatedly for each first local pixel block 15, but a preset fixed value may be used.

The extracting section 25 includes a candidate extracting section 56 and a selecting section 58. There is provided a plurality of the candidate extracting sections 56, comparing the value of each pixel in the first local pixel block 15 with the pixel threshold for each pixel threshold, to divide them into two image sections, or obtain a binary image, and extracting either one of the image sections as a candidate for an object image section. In the embodiment, the candidate extracting section 56 extracts a set of pixels having a pixel value larger than the pixel threshold as a candidate for the object image section. The candidate extracting section 56 provides information on the candidate for the object image section to the fourth block memory 57. The information on the candidate for the object image section pertains to whether or not each pixel in the first local pixel block 15 is contained in the candidate for the object image section.

The candidate extracting section 56 compares the value of each pixel in the first local pixel block 15 with the pixel threshold, wherein when the pixel value is higher than the pixel threshold, the candidate extracting section 56 determines that each pixel is contained in the candidate for the object image section, and applies a signal indicating 1 to the fourth block memory 57. When the pixel value is lower than the pixel threshold, the candidate extracting section 56 determines that each pixel is not contained in the candidate for the object image section, and applies a signal indicating 0 to the fourth block memory 57.

There is provided a plurality of the fourth block memories 57, which stores information on each candidate for the object-image section provided by each candidate extracting section 56 and provides the stored information to the selecting section 58. For example, when the signal from the candidate extracting section 56 is a binary signal 0,1, the fourth block memory 57 stores a value of the binary signal for each pixel.

The selecting section 58 selects a candidate for the object image section whose number of pixels is closest to a predetermined number of pixels from the candidates for the object image section extracted by the candidate extracting section 56 as an object image section. In the embodiment, the word "closest" includes "the same," and the predetermined number of pixels is an order threshold. The selecting section 58 selects a candidate for the object image section whose number of pixels is closest to the order threshold set by the order-threshold setting section 26 as an object image section, on the basis of the information on each candidate for the object image section provided from a plurality of fourth block memories 57. The selecting section 58 applies an object image signal indicating the selection result to the second block memory 7. For example, when the information from the fourth block memories 57 is indicated by a binary signal, the selecting section 58 selects a candidate for the object image section in which the binary signal is 1 and whose number of pixels is closest to the order threshold as the object image section.

For example, when a plurality of pixel thresholds is set to 100, 150, 200, and 250, candidates for the object image section, which are extracted on the basis of the pixel thresholds, are shown in FIGS. 24A to 24D, respectively. For the first local pixel block 15 shown in FIG. 9A, an object image section extracted, with the object-image extracting threshold being set to 100, is expressed in black shown in FIG. 24A. The candidate for the object image section shown in FIG. 24A is a set of a plurality of pixels having a concentration of 100 or more. An object image section extracted with the pixel threshold being set to 150 is expressed in black shown in FIG. 24B. The candidate for the object image section shown in FIG. 24B is a set of a plurality of pixels having a concentration of 150 or more.

An object image section extracted with a pixel threshold of 200 is expressed in black shown in FIG. 24C. The candidate for the object image section shown in FIG. 24C is a set of a plurality of pixels having a concentration of 200 or more. An object image section extracted with a pixel threshold of 250 is expressed in black shown in FIG. 24D. The candidate for the object image section shown in FIG. 24D is a set of a plurality of pixels having a concentration of 250 or more. When the order threshold is set to 7, the number of pixels contained in the candidate for the object image section shown in FIG. 24C is 7, which is the same as the order threshold; therefore, the candidate for the object image section is selected as the object image section by the selecting section 58.

Figure 25:
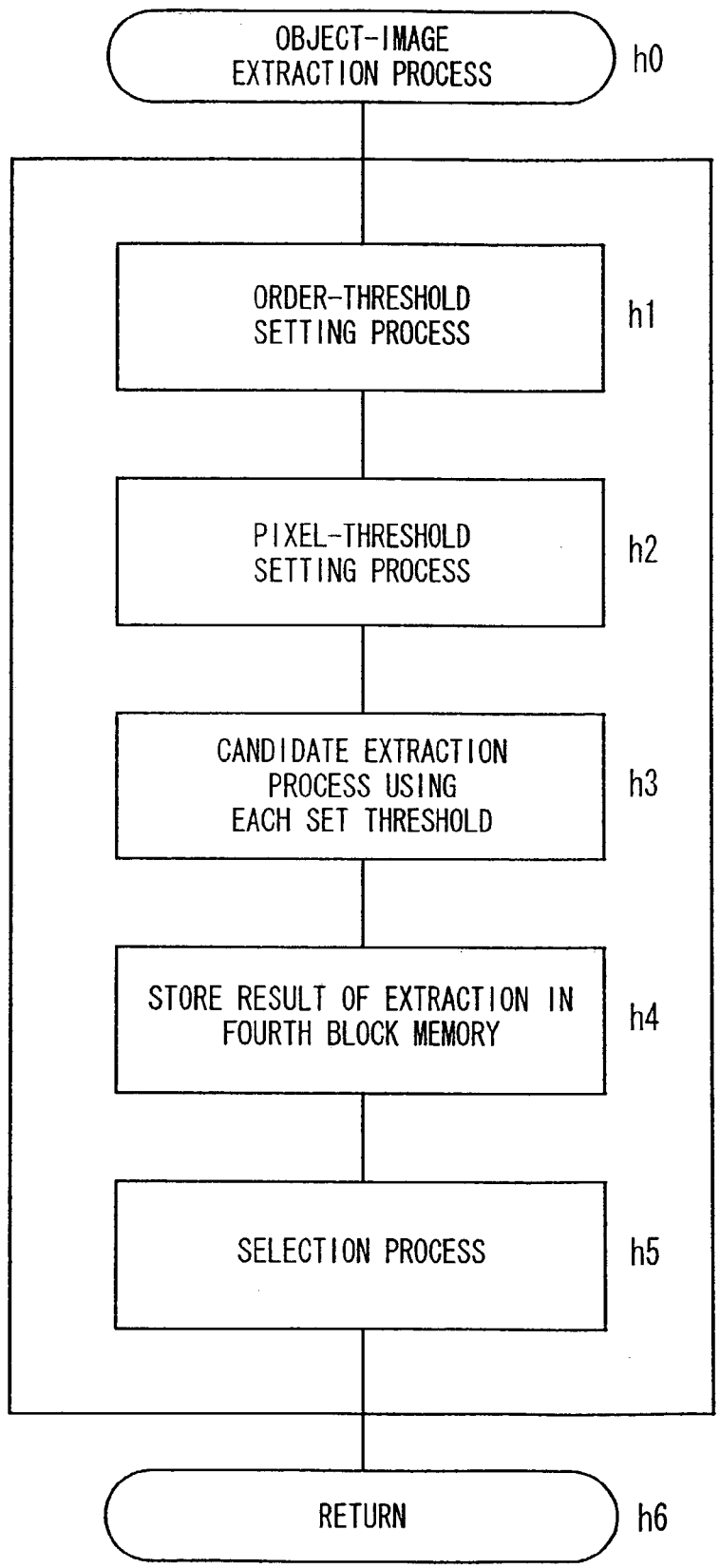
FIG. 25 is a flowchart showing the procedure of an object-image extraction process in the third embodiment of the invention.

FIG. 25 is a flowchart showing the procedure of an object-image extraction process in the third embodiment of the invention. The object-image extraction process in the embodiment includes a threshold setting process for setting a plurality of object-image extracting thresholds on the basis of the first local pixel block 15 and a extraction process for extracting the object image section. The extraction process includes a candidate extraction process and a selection process. The threshold setting process includes an order-threshold setting process and a pixel-threshold setting process.

In the candidate extraction process, a comparison is made between the value of each pixel in the first local pixel block 15 and the pixel threshold for each pixel threshold contained in the object-image extracting threshold, thus dividing them into two image sections, or obtaining a binary image, and extracting either one of the image sections as a candidate for the object image section. In the selection process, among the candidates for the object image section which are extracted in the candidate extraction process, a candidate for the object image section whose number of pixels is closest to the predetermined number of pixels is selected as the object image section.

In the embodiment, the processes except for the object-image extraction process of step s3 shown in FIG. 3 are the same as those of the first embodiment of the invention. Accordingly, a description thereof will be omitted here.

In step h0, the object-image extraction process is started, and the process proceeds to the order-threshold setting process of step h1. In the order-threshold setting process of step h1, an order threshold for the first local pixel block 15 is set by the order-threshold setting section 26 on the basis of the red signal R, the green signal G, and the blue signal B from the input terminal 3, and the process proceeds to the pixel-threshold setting process of step h2.

In the pixel-threshold setting process of step h2, a plurality of pixel thresholds is set on the basis of the first local pixel block 15, and the process proceeds to the candidate extraction process of step h3.

In the candidate extraction process of step h3, a comparison is made between the value of each pixel in the first local pixel block 15 and the pixel threshold to extract a candidate for the object image section for each pixel threshold, and the process proceeds to step h4.

In step h4, information of the signals which indicate the result of extraction by the candidate extracting section 56 is stored in the fourth block memory 57, and the process proceeds to the selection process of step h5.

In the selection process of step h5, a candidate for the object image section whose number of pixels contained in the candidate for the object image sections is closest to the order threshold is selected as an object image section, and the process proceeds to step h6 wherein all the procedures of the object-image extraction process are finished, and the process returns to step s4 shown in FIG. 3.

According to the embodiment, a plurality of candidates for the object image section is prepared on the basis of a plurality of pixel thresholds and a desired object image section is selected therefrom, and thus, a desired object image section can be extracted easily and accurately.

Figure 26:
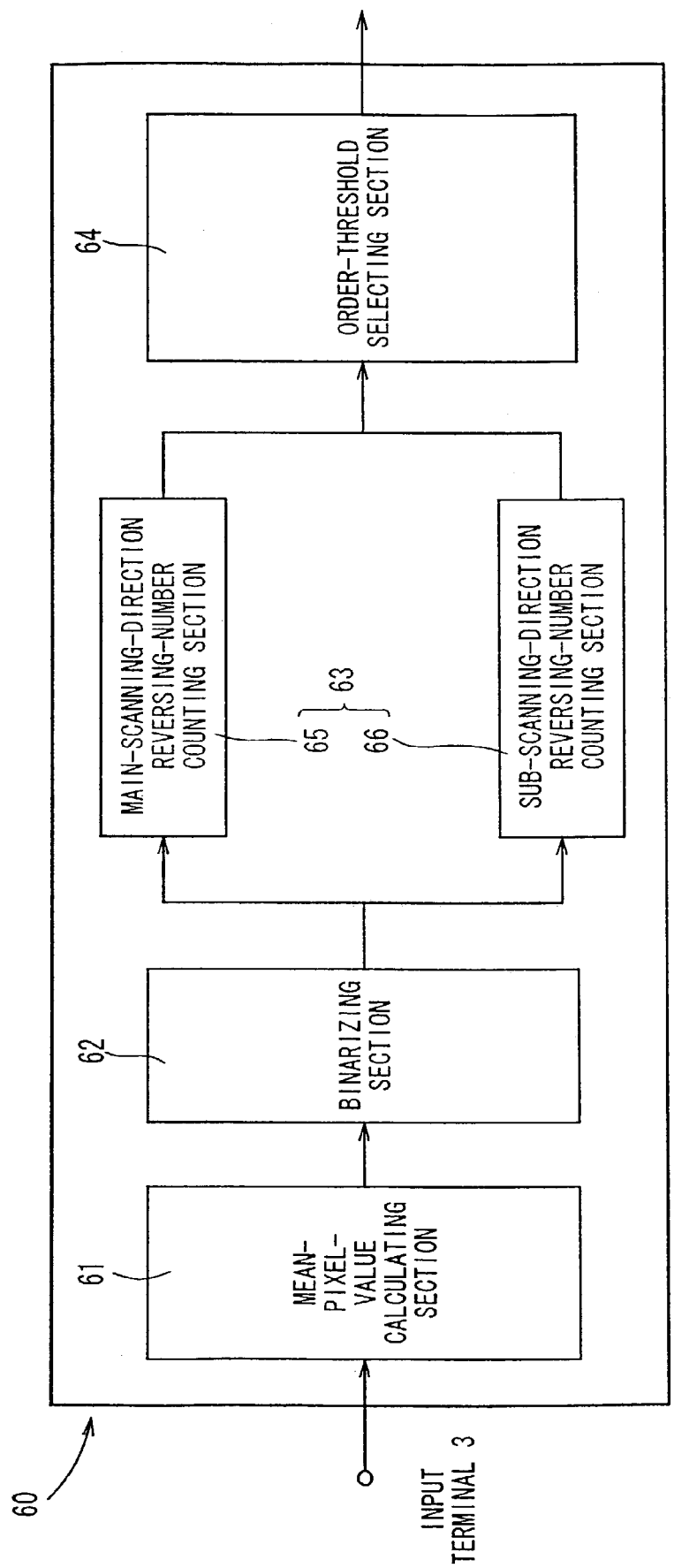
FIG. 26 is a block diagram showing the arrangement of an order-threshold setting section in a fourth embodiment of the invention.

FIG. 26 is a block diagram showing the arrangement of an order-threshold setting section 60 in a fourth embodiment of the invention. In the first embodiment of the invention, the cumulative-pixel-value histogram for the first local pixel block 15 is calculated and a pixel threshold is set by the threshold setting section 24 on the basis of the order threshold by the cumulative-pixel-value histogram. In this embodiment, on the other hand, a pixel threshold is selected by selecting an order threshold on the basis of a characteristic amount that represents the characteristic of the first local pixel block 15.

The arrangement of the embodiment is the same as that of the area separating section 2 except for the arrangement of part of the order-threshold setting section 26 in the first embodiment of the invention. Accordingly, a description of the same arrangement will be omitted and the same components are given the same reference numerals.

The order-threshold setting section 60 included in the threshold setting section 24 of the embodiment includes a mean-pixel-value calculating section 61, a binarizing section 62, a block-characteristic-amount calculating section 63, and an order-threshold selecting section 64. The mean-pixel-value calculating section 61 calculates the mean value of the pixels in the first local pixel block 15. The mean-pixel-value calculating section 61 calculates the mean value of the pixels in the first local pixel block 15 on the basis of the red signal R, the green signal G, and the blue signal B from the input terminal 3. The mean-pixel-value calculating section 61 provides information on the pixel value and the mean value of pixels in the first local pixel block 15 to the binarizing section 62. In the embodiment, the pixel value represents the concentration.

The binarizing section 62 binarizes the value of the each pixel in the first local pixel block 15 on the basis of the mean value of the pixel values calculated by the mean-pixel-value calculating section 61. The block-characteristic-amount calculating section 63 calculates the characteristic amount in the block which represents the characteristic of the first local pixel block 15. The order-threshold selecting section 64 serving as a threshold setting section selects an order threshold contained in the object-image extracting threshold on the basis of the in-block characteristic amount.

The binarizing section 62 binarizes the value of the each pixel in the first local pixel block 15 on the basis of the mean value for the first local pixel block 15. When the pixel value is higher than the mean value, wherein when the result of binarizing process for the pixel is expressed by 1 and the pixel value is lower than the mean value, the binarizing section 62 expresses the result of binarizing process for the pixel by 0. The binarizing section 62 provides information on the result of the binarizing process for each pixel to a main-scanning-direction reversing-number counting section 65 and a sub scanning-direction reversing-number counting section 66 included in the block-characteristic-amount calculating section 63.

The block-characteristic-amount calculating section 63 includes the main-scanning-direction reversing-number counting section 65 and the sub scanning-direction reversing-number counting section 66.

The main-scanning-direction reversing-number counting section 65 counts the number of changes of the values of the binary pixels from 1 to 0 and from 0 to 1, for all the main scanning directions of the first local pixel block 15. For example, for the first local pixel block 15 containing 3×3 pixels, the main-scanning-direction reversing-number counting section 65 counts the number of changes of the values of the binary pixels from 1 to 0 and from 0 to 1 for three pixel columns in which three continuous pixels are arranged in the main scanning direction. The main-scanning-direction reversing-number counting section 65 provides information on the count result to the order-threshold selecting section 64.

The sub-scanning-direction reversing-number counting section 66 counts the number of changes of the values of the binary pixels from 1 to 0 and from 0 to 1, for all the sub scanning directions of the first local pixel block 15. For example, for the first local pixel block 15 containing 3×3 pixels, the sub-scanning-direction reversing-number counting section 66 counts the number of changes of the values of the binary pixels from 1 to 0 and from 0 to 1 for three pixel columns in which three continuous pixels are arranged in the sub scanning direction. The sub-scanning-direction reversing-number counting section 66 provides information on the count result to the order-threshold selecting section 64.

The order-threshold selecting section 64 selects an order threshold on the basis of the count results by the main-scanning-direction reversing-number counting section 65 and the sub-scanning-direction reversing-number counting section 66. The order-threshold selecting section 64 compares, for example, a predetermined value with the two count results to determine the order threshold. For example, when the count result is higher than the predetermined value, a high value is selected for the order threshold. When the count result is lower than the predetermined value, a low value is selected for the order threshold. The predetermined value is a most preferable value obtained previously by measurement with a lot of image samples. A pixel threshold is selected by the pixel-threshold setting section 27 on the basis of the order threshold selected by the order-threshold selecting section 64. In the embodiment, the pixel threshold is selected using the order threshold selected by the order-threshold selecting section 64 and the cumulative-pixel-value histogram.

Figure 27:
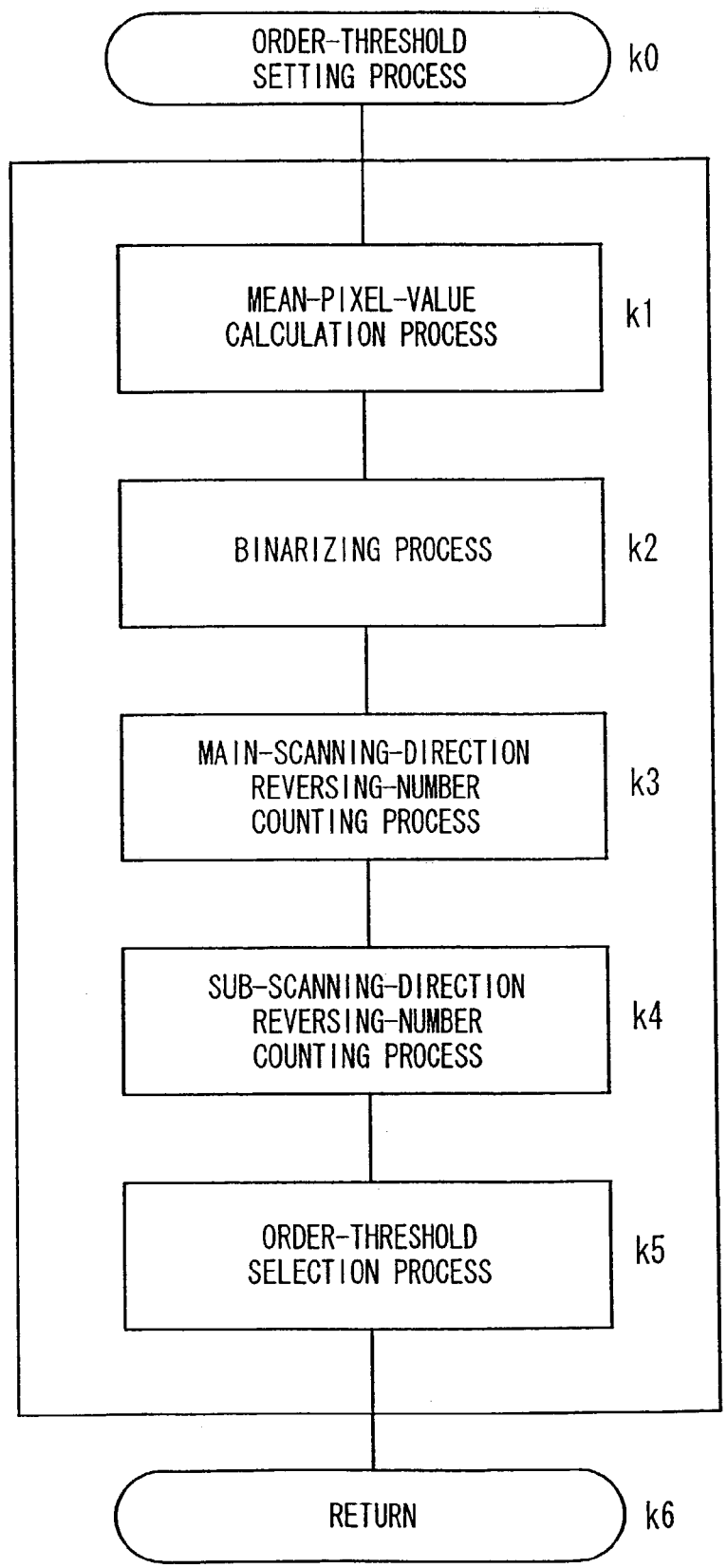
FIG. 27 is a flowchart showing the procedure of an order-threshold setting process in the fourth embodiment of the invention.

FIG. 27 is a flowchart showing the procedure of an order-threshold setting process in the fourth embodiment of the invention. The order-threshold setting process included in a threshold setting process includes a mean-pixel-value calculation process, a binarizing process, a block-characteristic-amount calculation process of calculating the characteristic amount in the block which represents the characteristic of the first local pixel block 15, and an order-threshold selection process of selecting an order threshold contained in the object-image extracting threshold on the basis of the in-block characteristic amount calculated in the block-characteristic-amount calculation process. The block-characteristic-amount calculation process includes a main-scanning-direction reversing-number counting process and a sub-scanning-direction reversing-number counting process. In the embodiment, a pixel threshold contained in the object-image extracting threshold is selected on the basis of the order threshold set in the order-threshold setting process, and more specifically, the pixel threshold is selected in the object-image extraction process of the first embodiment using the order threshold selected in the order-threshold selection process.

In the embodiment, the processes except for the order-threshold setting process of step b1 shown in FIG. 13 are the same as those of the first embodiment of the invention. Accordingly, a description thereof will be omitted here.

In step k0, the order-threshold setting process is started, and the process proceeds to the mean-pixel-value calculation process of step k1.

In the mean-pixel-value calculation process of step k1, the mean value of the pixels in the first local pixel block 15 is calculated by the mean-pixel-value calculating section 61, and the process proceeds to the binarizing process of step k2.

In the binarizing process of step k2, the values of the pixels in the first local pixel block 15 are binarized by the binarizing section 62 on the basis of the mean value calculated by the mean-pixel-value calculating section 61, and the process proceeds to the main-scanning-direction reversing-number counting process of step k3.

In the main-scanning-direction reversing-number counting process of step k3, the number of changes of each binarized pixel from 1 to 0 and from 0 to 1 is counted for all main scanning directions by the main-scanning-direction reversing-number counting section 65 on the basis of the result of the binarizing process by the binarizing section 62, and the process proceeds to the sub-scanning-direction reversing-number counting process of step k4.

In the sub-scanning-direction reversing-number counting process of step k4, the number of changes of each binarized pixel from 1 to 0 and from 0 to 1 is counted for all sub scanning directions by the sub-scanning-direction reversing-number counting section 66 on the basis of the result of the binarizing process by the binarizing section 62, and the process proceeds to the order-threshold selection process of step k5.

In the order-threshold selection process of step k5, the order threshold is set on the basis of the count result by the main-scanning-direction reversing-number counting section 65 and the sub-scanning-direction reversing-number counting section 66, and the process proceeds to step k6 wherein all the procedures of the order-threshold setting process are finished, and the process returns to step b2 as shown in FIG. 13.

According to the embodiment, the order threshold contained in the object-image extracting threshold for extracting the object image section is selected in consideration of the characteristic in the first local pixel block 15, and then the pixel threshold selected on the basis of the order threshold and the value of the each pixel are compared, so that a desired object image section can be extracted in accordance with the characteristic of each first local pixel block 15. The order-threshold setting section 60 of this embodiment may be applied to the order-threshold setting section 26 of the first and the third embodiment.

Figure 28A:
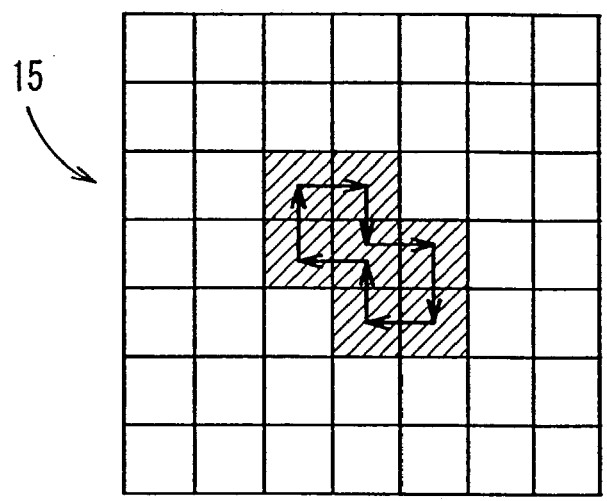
FIGS. 28A and 28B show examples of an object image section in the first local pixel block, FIG. 28A showing an object image section that is a dot section, and FIG. 28B showing an object image section that is a character section.
Figure 28B:
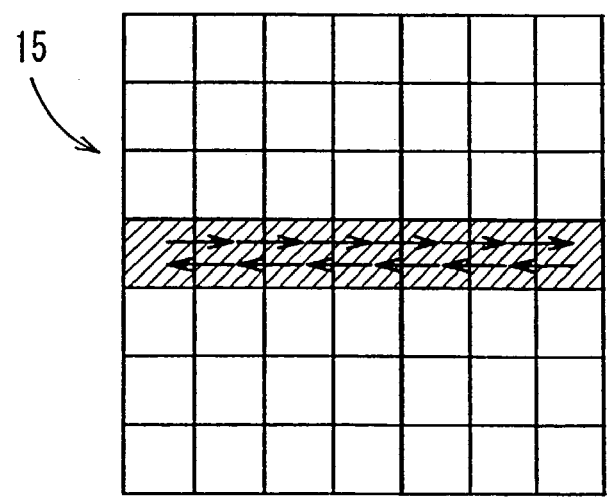

FIGS. 28A and 28B show examples of the object image section in the first local pixel block 15, FIG. 28A showing an object image section that is a dot section, and FIG. 28B showing an object image section that is a character section. The first-characteristic-amount calculation section served as the first-characteristic-amount calculation means according to a fifth embodiment of the invention is a circularity calculation section 70 served as a circularity calculation means for calculating the circularity of the object image section. With the first-characteristic-amount calculation section 8 of the first embodiment of the invention, the continuous number of pixels contained in the object image section is calculated as a first characteristic amount on the basis of the result of extraction by the object-image extraction section 6. In this embodiment, on the other hand, the circularity of the object image section is calculated as the first characteristic amount.

The arrangement of the embodiment is the same as that of the area separating section 2 except that the first-characteristic-amount calculation section 8 in the first embodiment of the invention is replaced with the circularity calculation section 70 for calculating the circularity of the object image section. Accordingly, a description of the same arrangement will be omitted and the same components are given the same reference numerals.

The circularity calculation section 70 calculates circularity R indicating the degree of whether or not the shape of the object image section that is a set of pixels is close to a circle as a first characteristic amount by using the perimeter L of the object image section and the number of pixels, A, contained in the object image section. In the embodiment, the perimeter L denotes a track distance for the pixels constituting the outer edge of the object image section. The number of pixels, A, represents the total area of the object image section when the area of each square pixel is set to 1. The perimeter L is a track distance of the center of gravity of each pixel constituting the outer edge of the object image section, with the starting point at the center of gravity of one pixel. For two adjacent pixels, the track distance from the center of gravity of one pixel to the center of gravity of the other is set to 1.

The circularity R is expressed by a value obtained by integrating a value that is obtained by dividing the number of pixels in the object image section by a value that is obtained by squaring the perimeter L with a given coefficient, for example, $4\pi$, as follows:

$$R = 4\pi A/L^2$$

For the object image section corresponding to a dot section shown in FIG. 28A, since the perimeter L is 8 and the number of pixels is 7, the circularity is approximately 1 by the above equation. For the object image section corresponding to a character section shown in FIG. 28B, since the perimeter L is 12 and the number of pixels is 7, the circularity is about 0.6 by the above equation. The circularity of a set of dot-like pixels as in the dot section is higher than the circularity of a set of linear pixels as in the character section.

Using the circularity calculated as describe above as a first characteristic amount, the edge-class determination section 9 determines the edge pixel in the first local pixel block 15 as a dot edge pixel when the circularity is higher than a preset value, and determines the edge pixel in the first local pixel block 15 as a character edge pixel when the circularity is lower than the preset value. The preset value for comparison with the circularity is calculated in advance using a lot of image samples.

Figure 29:
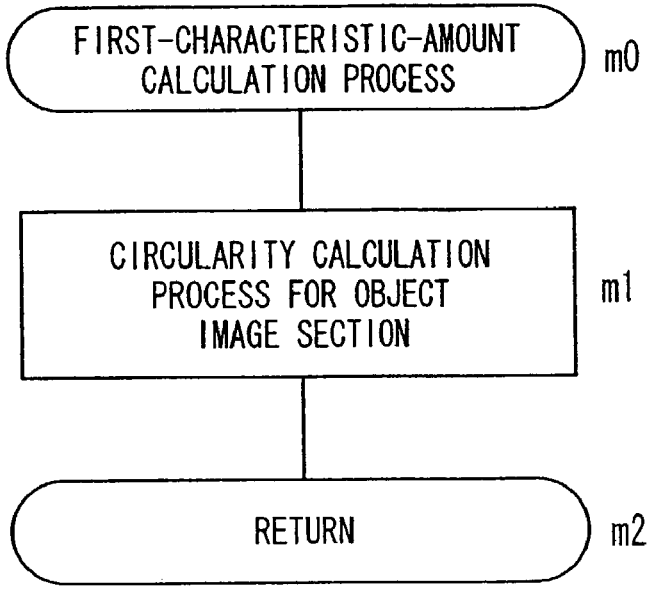
FIG. 29 is a flowchart showing the procedure of a first-characteristic-amount calculation process in a fifth embodiment of the invention.

FIG. 29 is a flowchart showing the procedure of a first-characteristic-amount calculation process according to the fifth embodiment of the invention. The first-characteristic-amount calculation process according to the fifth embodiment of the invention is a circularity calculation process of calculating the circularity of the object image section extracted by the object-image extraction process of step s3 shown in FIG. 3. In the embodiment, the processes except for the first-characteristic-amount calculation process of step s5 shown in FIG. 3 are the same as those of the first embodiment of the invention. Accordingly, a description thereof will be omitted here.

In step m0, the circularity calculation process that is the first-characteristic-amount calculation process is started, and the process proceeds to step m1.

In step m1, the circularity of the object image section in the first local pixel block 15 is calculated by the circularity calculation section 70, and the process proceeds to step m2 wherein all the procedures of the circularity calculation process are finished, and the process returns to the edge-class determination process of step s6 shown in FIG. 3.

According to the embodiment, the characteristics of the character section and the dot section can accurately be represented by obtaining the circularity of the object image section in the first local pixel block 15 as a characteristic amount, facilitating the discrimination between the character section and the dot section, thereby facilitating the edge-class determination for each edge pixel in the first local pixel block 15.

Figure 30:
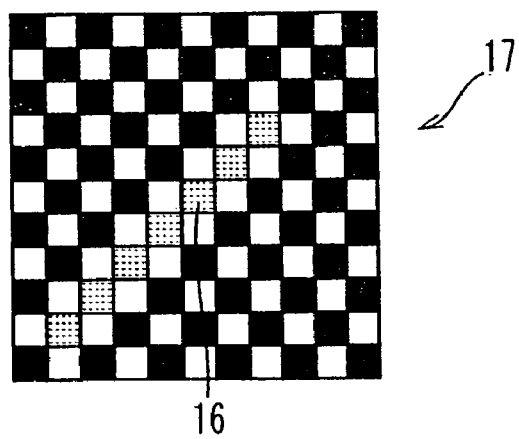
FIG. 30 is a diagram showing an example of a second local pixel block.

FIG. 30 is a diagram showing an example of a second local pixel block 17. The second-characteristic-amount calculation section 11 of the first embodiment of the invention calculates the run length of the edge pixels as a second characteristic amount. On the other hand, a second-characteristic-amount calculation section 80 of a sixth embodiment of the invention calculates the run length of non-edge pixels as a second characteristic amount, in addition to the run length of the edge pixels, thereby classifying a pixel that belongs to the character area.

The arrangement of the embodiment is the same as that of the area separating section 2 except for the second characteristic amount calculated by the second-characteristic-amount calculation section 11 of the first embodiment of the invention. Accordingly, a description of the same arrangement will be omitted and the same components are given the same reference numerals.

The second-characteristic-amount calculation section 80 of the embodiment calculates the run length of non-edge pixels in addition to the run length of the character edge pixels for each pixel in the first local pixel block 15 as a second characteristic amount on the basis of the result of determination by the edge-class determination section 9. The non-edge pixel includes a pixel in a photograph area that is a continuous gray level area, a pixel contained in the substrate, a pixel in a filled-in area having a fixed pixel value, and a pixel in the character section. The pixel in the character section is a pixel within an area surrounded by the character edge pixels.

The second local pixel block 17 shown in FIG. 30 is an image area corresponding to a dot area having a large number of lines of 175 or more, showing an image area containing an edge pixel that is erroneously classified as a character edge pixel by the edge-class determination section 9. The run length of the character edge pixels in the second local pixel block 17 shown in FIG. 30 is 7 at 45-degree angle, which is higher than the aforesaid threshold 6, thus having a possibility that the second target pixel 16 is erroneously determined as a pixel that belongs to the character area.

In order to extract the character area more accurately, the run length of the non-edge pixels is calculated as a second characteristic amount in consideration of the characteristic within the character section, in other words, the characteristic that the run length of the non-edge pixels is large. The run length of the non-edge pixels is the maximum number of the continuous non-edge pixels arranged in various directions such as in the main scanning direction, in the sub scanning direction, and at 45-degree angle. The run length of the non-edge pixels (pixels shown by a vertical line) amounts to 11 for the second local pixel block 17 shown in FIG. 16A, and the run length of the non-edge pixels amounts to 0 for the second local pixel block 17 shown in FIG. 30.

When the run length of the non-edge pixels calculated as described above is higher than a preset threshold by making a comparison between them, for example, 9, it is determined by the image-class determination section 12 that the second local pixel block 17 is a character area, in other words, the second target pixel 16 that is an edge pixel belongs to a character area. When the run length of the non-edge pixels is lower than the threshold, it is determined that the second local pixel block 17 is not a character area, in other words, the second target pixel 16 that is an edge pixel does not belong to a character area. In this manner, using the run length of the non-edge pixels as the second characteristic amount, in addition to the run length of the edge pixels, prevents erroneous determination for the image area, thereby allowing a more accurate area separation of pixels.

Figure 31:
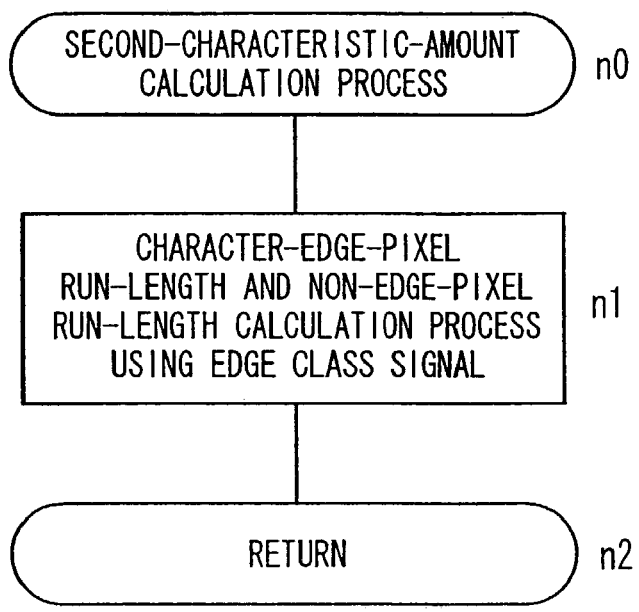
FIG. 31 is a flowchart showing the procedure of a second-characteristic-amount calculation process in a sixth embodiment of the invention.

FIG. 31 is a flowchart showing the procedure of a second-characteristic-amount calculation process in the sixth embodiment of the invention. In the second-characteristic-amount calculation process of the embodiment, the run length of the non-edge pixels is calculated as the second characteristic amount, in addition to the run length of the edge pixels. In the embodiment, the processes except for the second-characteristic-amount calculation process of step s8 shown in FIG. 3 are the same as those of the first embodiment of the invention. Accordingly, a description thereof will be omitted here.

In step n0, the second-characteristic-amount calculation process is started, and the process proceeds to step n1. In step n1, the run lengths of the character edge pixels and the non-edge pixels in the second local pixel block 17 are calculated as the second characteristic on the basis of the edge class signal from the third block memory 10, that is, the determination by the edge-class determination section 9, and the process proceeds to step n2 wherein all the procedures of the second-characteristic-amount calculation process are finished, and the process returns to step s9 shown in FIG. 3.

According to the embodiment, the use of not only the run length of the edge pixels but also the run length of the non-edge pixels improves the accuracy of the determination for the second target pixel 16.

Figure 32:
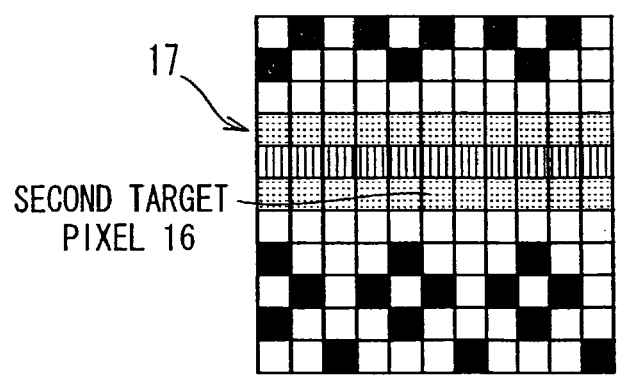
FIG. 32 is a diagram showing another example of the second local pixel block.

FIG. 32 is a diagram showing another example of the second local pixel block 17. The second-characteristic-amount calculation section 11 of the first embodiment of the invention calculates the run length of the edge pixels as the second characteristic amount; on the other hand, a second-characteristic-amount calculation section 90 of a seventh embodiment of the invention calculates a second characteristic amount on the basis of the number of edge pixels of each edge class, thereby classifying a pixel that belongs to the character area.

The arrangement of the embodiment is the same as that of the area separating section 2 except for the second characteristic amount calculated by the second-characteristic-amount calculation section 11 of the first embodiment of the invention. Accordingly, a description of the same arrangement will be omitted and the same components are given the same reference numerals.

The second-characteristic-amount calculation section 90 of the embodiment calculates the number of edge pixels determined as character edge pixels and the number of edge pixels which is determined as dot edge pixels by the edge-class determination section 9 as the second characteristic amount.

The second local pixel block 17 shown in FIG. 32 is an image area corresponding to an on-dot character area. In the second local pixel block 17 shown in FIG. 32, the run length of the character edge pixels is 11, and the run length of the non-edge pixels is 11. For the second local pixel block 17 shown in FIG. 32, the run length of the character edge pixels is higher than the threshold 6 of the aforesaid character edge pixels and the run length of the non-edge pixels is higher than the threshold 9 of the non-edge pixels; therefore, the second target pixel 16 in the second local pixel block 17 of FIG. 32 is erroneously determined as a pixel that belongs to the character area.

This poses no problem when the pixel that belongs to the on-dot character area may be classified as a pixel that belongs to the character area; however, this causes erroneous determination when the pixel that belongs to the character area and the pixel that belongs to the on-dot character area must be discriminated from each other.

For the second local pixel block 17 corresponding to the on-dot character area shown in FIG. 32, the number of character edge pixels expressed in gray is 22 and the number of dot edge pixels expressed in black is also 22. On the other hand, for the second local pixel block 17 that belongs to the character area shown in FIG. 16A, the number of character edge pixels is 27 and the number of dot edge pixels is 0. Thus, the character area has an extremely larger number of character edge pixels than that of dot edge pixels. All the second local pixel blocks 17 shown in FIGS. 16B, 16C, 16D, and 32 have no characteristic of the character area. The use of the number of character edge pixels and the number of dot edge pixels as the second characteristic amount allows the characteristic of the character area to be represented accurately.

Figure 33:
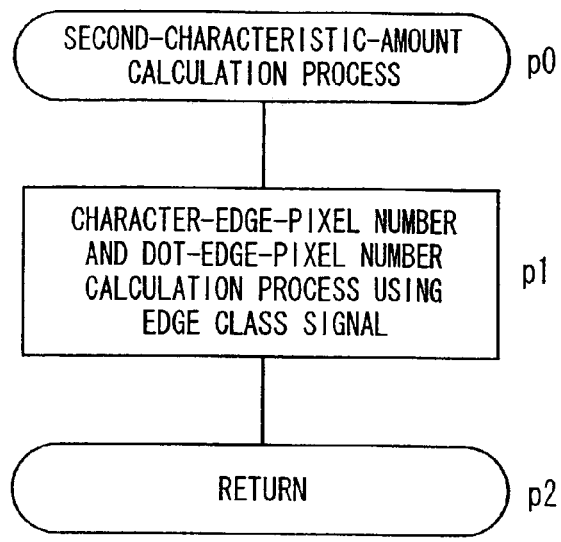
FIG. 33 is a flowchart showing the procedure of a second-characteristic-amount calculation process in a seventh embodiment of the invention.

FIG. 33 is a flowchart showing the procedure of a second-characteristic-amount calculation process in the seventh embodiment of the invention. In the second-characteristic-amount calculation process of the embodiment, the number of character edge pixels and the number of dot edge pixels in the second local pixel block 17 are calculated as the second characteristic amount on the basis of the number of the edge pixels of each edge class. In the embodiment, the processes except for the second-characteristic-amount calculation process of step s8 shown in FIG. 3 are the same as those of the first embodiment of the invention. Accordingly, a description thereof will be omitted here.

In step p0, the second-characteristic-amount calculation process is started, and the process proceeds to step p1. In step p1, the number of character edge pixels and the number of dot edge pixels in the second local pixel block 17 are calculated as the second characteristic amount on the basis of the edge class signal from the third block memory 10, that is, the determination by the edge-class determination section 9, and all the procedures of the second-characteristic-amount calculation process are finished, and the process returns to step s9 shown in FIG. 3.

According to the embodiment, the characteristic of the second local pixel block 17, in other words, the respective characteristics of the plurality of image areas can accurately be represented using the second characteristic amount calculated on the basis of the number of character edge pixels and the number of dot edge pixels which are classified by the edge-class determination section 9. Accordingly, the accuracy of the determination for the second target pixel 16 can be improved, thus allowing accurate discrimination of a pixel that belongs to the character area.

Figure 34A:
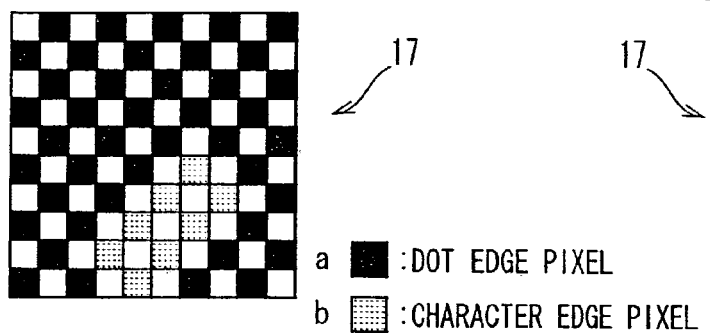
FIGS. 34A and 34B are diagrams showing other examples of the second local pixel block, FIG. 34A showing a dot area expressed by a large number of lines, and FIG. 34B showing a character area.
Figure 34B:
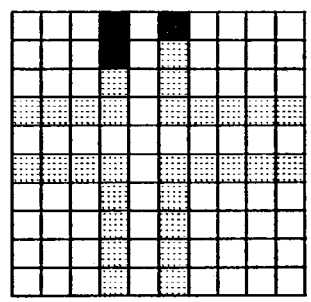

FIGS. 34A and 34B show other examples of the second local pixel block 17, FIG. 34A showing a dot area expressed by a large number of lines, and FIG. 34B showing a character area. The second-characteristic-amount calculation section 11 of the first embodiment of the invention calculates the run length of the edge pixels as a second characteristic amount. On the other hand, a second-characteristic-amount calculation section 100 of an eighth embodiment of the invention calculates the second characteristic amount on the basis of the number of edge pixels of each edge class, thereby classifying pixels that belongs to the dot area.

The arrangement of the embodiment is the same as that of the area separating section 2 except for the second characteristic amount calculated by the second-characteristic-amount calculation section 11 in the first embodiment of the invention. Accordingly, a description of the same arrangement will be omitted and the same components are given the same reference numerals.

The second-characteristic-amount calculation section 100 calculates the sum total of the edge pixels in the second local pixel block 17 irrespective of whether the pixel is the character edge pixel or the dot edge pixel, on the basis of the edge class signal from the third block memory 10.

In the dot area expressed by a large number of lines of 175 or more, shown in FIG. 34A, since the number of dot edge pixels expressed in black is 42 and the number of character edge pixels expressed in gray is 8, the sum total of the edge pixels amounts to 50. On the other hand, in the character area shown in FIG. 34B, the number of dot edge pixels is 3 and the number of character edge pixels expressed in gray is 29; thus, the sum total of the edge pixels amounts to 32. Accordingly, the sum total of the edge pixels in the dot area expressed by the large number of lines is larger than the sum total of the edge pixels in the character area. The use of the sum total of the edge pixels in the second local pixel block 17 as the second characteristic amount allows the characteristic of the dot area to be expressed accurately.

Figure 35:
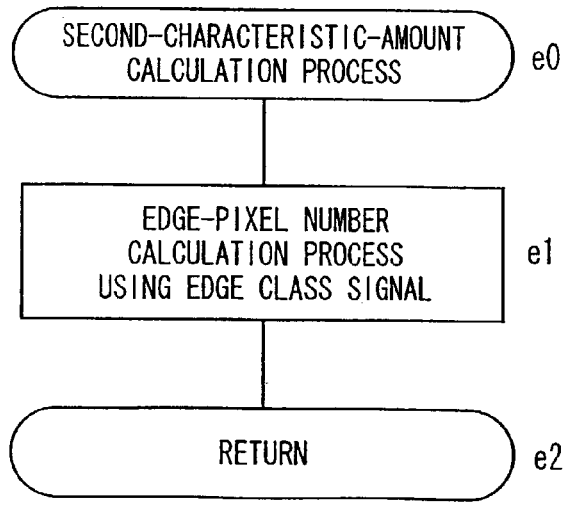
FIG. 35 is a flowchart showing the procedure of a second-characteristic-amount calculation process in an eighth embodiment of the invention.

FIG. 35 is a flowchart showing the procedure of a second-characteristic-amount calculation process in the eighth embodiment of the invention. In the second-characteristic-amount calculation process of the embodiment, the sum total of the edge pixels in the second local pixel block 17 is calculated as a second characteristic amount on the basis of the number of edge pixels of each edge class. In the embodiment, the processes except for the second-characteristic-amount calculation process of step s8 shown in FIG. 3 are the same as those of the first embodiment of the invention. Accordingly, a description thereof will be omitted here.

In step e0, the second-characteristic-amount calculation process is started, and the process proceeds to step e1. In step e1, the sum total of the edge pixels in the second local pixel block 17 is calculated on the basis of the edge class signal from the third block memory 10, in other words, the determination by the edge-class determination section 9, and the process proceeds to step e2 wherein all the procedures of the second-characteristic-amount calculation process are finished, and the process returns to step s9 shown in FIG. 3.

According to the embodiment, the use of the sum total of the edge pixels in the second local pixel block 17 as the second characteristic amount increase the accuracy of determination for the second target pixel 16, thereby allowing accurate discrimination of a pixel that belongs to the dot area.

Figure 36:
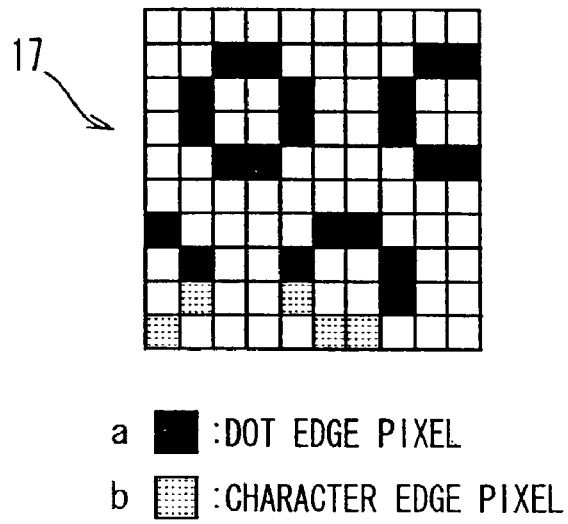
FIG. 36 is a diagram showing another example of the second local pixel block.

FIGS. 36 shows another example of the second local pixel block 17. A second-characteristic-amount calculation section 110 of a ninth embodiment of the invention calculates the second characteristic amount on the basis of the number of edge pixels of each edge class to classify a pixel that belong to the dot area.

The arrangement of the embodiment is the same as that of the area separating section 2 except for the arrangement of the second characteristic amount calculated by the second-characteristic-amount calculation section 11 of the first embodiment of the invention. Accordingly, a description of the same arrangement will be omitted and the same components are given the same reference numerals.

The second-characteristic-amount calculation section 110 calculates the weighted sum of the number of dot edge pixels and the number of character edge pixels for the number of edge pixels of each edge class on the basis of the result of determination by the edge-class determination section 9. The weighted sum of the number of dot edge pixels and the number of character edge pixels is the sum when the number of dot edge pixels and the number of character edge pixels are weighted, which is given by integrating the number of character edge pixels using a prescribed constant and also integrating the number of dot edge pixels using a prescribed constant and in turn obtaining the sum of the integral values of the edge pixels.

Assuming that the number of dot edge pixels is 1 and the number of character edge pixels is 1, when the weight of the character edge pixels is set to 1 and the weight of the dot edge pixels is changed from 1 to 2, the weighted sum of the dot edge pixels and the character edge pixels is changed from 2 to 3.

The second local pixel block 17 shown in FIG. 36 is an image area corresponding to a dot area expressed by a middle number of lines of about 120 to 150. The sum total of the edge pixels expressed in black and gray in the second local pixel block 17 of FIG. 36 amounts to 26. The sum total of the edge pixels expressed in black and gray in the second local pixel block 17 of FIG. 34B, which corresponds to the character area, amounts to 32. Thus, the second local pixel block 17 corresponding to the character area has more edge pixels than the second local pixel block 17 corresponding to the dot area, thus having the possibility that pixels in the dot area expressed by a middle number of lines cannot be classified accurately.

For the second local pixel block 17 shown in FIG. 36, when the weight for the dot edge pixels is set to 2 and the weight for the character edge pixels is set to 1, the weighted sum amounts to 47 because the number of the dot edge pixels amounts to 21 and the number of the character edge pixels amounts to 5. On the other hand, for the second local pixel block 17 shown in FIG. 34B, when the weight for the dot edge pixels is set to 2 and the weight for the character edge pixels is set to 1, the weighted sum amounts to 35 because the number of the dot edge pixels amounts to 3 and the number of the character edge pixels amounts to 29. When the value of the weight for the dot edge pixels is set higher than that for the character edge pixels, the weighted sum of the edge pixels in the dot area having a middle number of lines becomes larger than the weighted sum of the edge pixels in the character area, so that the use of the weighted sum as the second characteristic amount allows accurate representation of the characteristic of the dot area.

Figure 37:
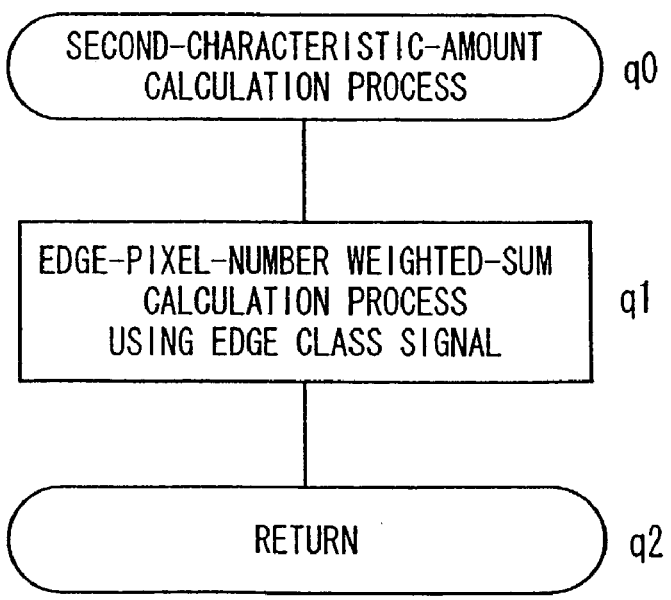
FIG. 37 is a flowchart showing the procedure of a second-characteristic-amount calculation process in a ninth embodiment of the invention.

FIG. 37 is a flowchart showing the procedure of a second-characteristic-amount calculation process in a ninth embodiment of the invention. In the second-characteristic-amount calculation process of the embodiment, the weighted sum of the number of the dot edge pixels and the number of the character edge pixels in the second local pixel block 17 is calculated as the second characteristic amount on the basis of the number of the edge pixels of each edge class. In the embodiment, the processes except for the second-characteristic-amount calculation process of step s8 shown in FIG. 3 are the same as those of the first embodiment of the invention. Accordingly, a description thereof will be omitted here.

In step q0, the second-characteristic-amount calculation process is started, and the process proceeds to step q1. In step q1, the weighted sum of the number of the dot edge pixels and the number of the character edge pixels in the second local pixel block 17 is calculated as the second characteristic amount on the basis of the result of determination by the edge-class determination section 9, and the process proceeds to step q2 wherein all the procedures of the second-characteristic-amount calculation process are finished, and the process returns to step s9 shown in FIG. 3.

According to the embodiment, the use of the weighted sum of the edge pixels of each edge class as the second characteristic amount increase the accuracy of determination for the second target pixel 16, thereby allowing accurate discrimination of a pixel that belongs to the dot area.

Figure 38:
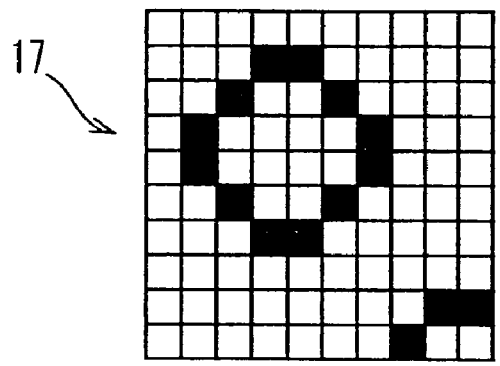
FIG. 38 is a diagram showing another example of the second local pixel block.

FIG. 38 shows another example of the second local pixel block 17. A second-characteristic-amount calculation section 120 in a tenth embodiment of the invention calculates a second characteristic amount on the basis of the number of edge pixels of each edge class, thereby classifying a pixel that belongs to the dot area.

The arrangement of the embodiment is the same as that of the area separating section 2 except for the arrangement of the second characteristic amount calculated by the second-characteristic-amount calculation section 11 of the first embodiment of the invention. Accordingly, a description of the same arrangement will be omitted and the same components are given the same reference numerals.

The second-characteristic-amount calculation section 120 of the embodiment calculates the ratio of the number of the dot edge pixels to the sum total of the edge pixels in the second local pixel block 17 as a second characteristic amount on the basis of the number of edge pixels of each edge class.

The second local pixel block 17 shown in FIG. 38 is an image area corresponding to a dot area expressed by a small number of lines of about 65 to 100. The sum total of the edge pixels in the second local pixel block 17 of FIG. 38 amounts to 15. When the weight for the dot edge pixels is set to 2 and the weight for the character edge pixels is set to 1, the weighted sum amounts to 30 because the number of the dot edge pixels expressed in black amounts to 15 and the number of the character edge pixel amounts to 0.

On the other hand, the sum total of the edge pixels in the second local pixel block 17 of FIG. 34B, which corresponds to the character area, amounts to 32. When the weight for the dot edge pixels is set to 2 and the weight for the character edge pixels is set to 1, the weighted sum amounts to 35, as described above. Accordingly, both the sum total and the weighted sum of the edge pixels in the dot area expressed by the small number of lines are smaller than that in the character area. Thus, there is the possibility that pixels in the dot area expressed by the small number of lines cannot be classified accurately.

For the second local pixel block 17 shown in FIG. 38, the ratio of the number of dot edge pixels to the sum total of the edge pixels is 100% because the sum total of the edge pixels is 15 and the number of the dot edge pixels is 15. On the other hand, for the second local pixel block 17 shown in FIG. 34B, the ratio of the number of dot edge pixels to the sum total of the edge pixels is approximately 9% because the sum total of the edge pixels is 32 and the number of the dot edge pixels is 3.

The ratio of the number of the dot edge pixels in the dot area expressed by the small number of lines is larger than the ratio of the dot edge pixels in the character area. Accordingly, the characteristic of the dot area can accurately be represented by using the ratio of the edge pixels to the sum total of the edge pixels as a second characteristic amount.

Figure 39:
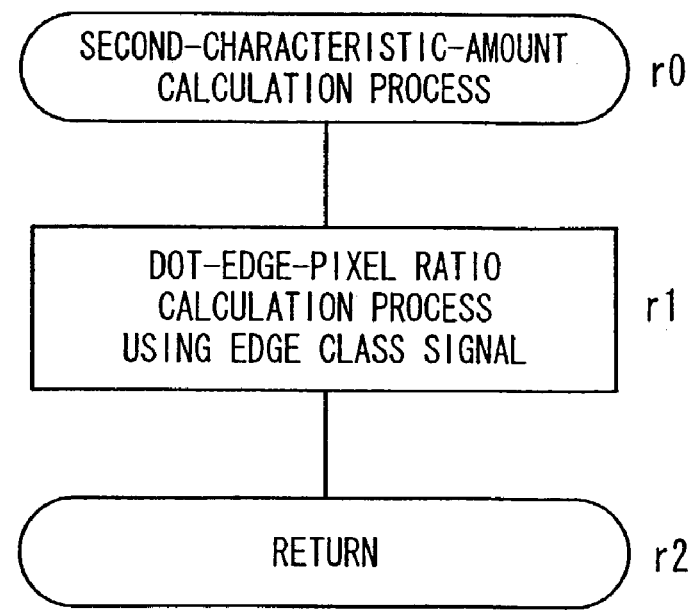
FIG. 39 is a flowchart showing the procedure of a second-characteristic-amount calculation process in a tenth embodiment of the invention.

FIG. 39 is a flowchart showing the procedure of a second-characteristic-amount calculation process in a tenth embodiment of the invention. In the second-characteristic-amount calculation process of the embodiment, the ratio of the number of the dot edge pixels to the sum total of the edge pixels is calculated as a second characteristic amount on the basis of the number of the edge pixels of each edge class. In the embodiment, the processes except for the second-characteristic-amount calculation process of step s8 shown in FIG. 3 are the same as those of the first embodiment of the invention. Accordingly, a description thereof will be omitted here.

In step r0, the second-characteristic-amount calculation process is started, and the process proceeds to step r1. In step r1, the ratio of the number of the dot edge pixels to the sum total of the edge pixels in the second local pixel block 17 is calculated as the second characteristic amount on the basis of the result of determination by the edge-class determination section 9, and the process proceeds to step r2 wherein all the procedures of the second-characteristic-amount calculation process are finished, and the process returns to step s9 shown in FIG. 3.

According to the embodiment, the ratio of the number of the dot edge pixels to the sum total of the edge pixels is used as the second characteristic amount for the second local pixel block 17, so that the accuracy of determination for the second target pixel 16 is increased, thereby allowing accurate discrimination of pixels in the dot area.

Figure 40A:
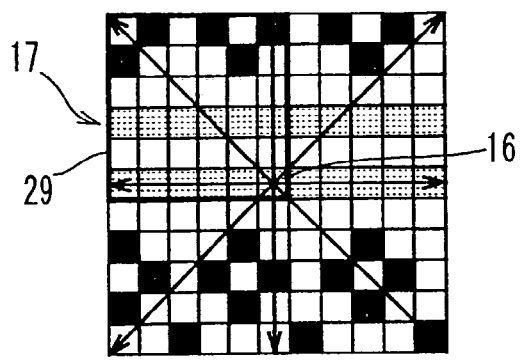
FIGS. 40A to 40C are diagrams showing other examples of the second local pixel block, FIG. 40A showing an on-dot character area, FIG. 40B showing a dot area expressed by a middle number of lines, and FIG. 40C showing a dot photograph area expressed by a large number of lines.
Figure 40B:
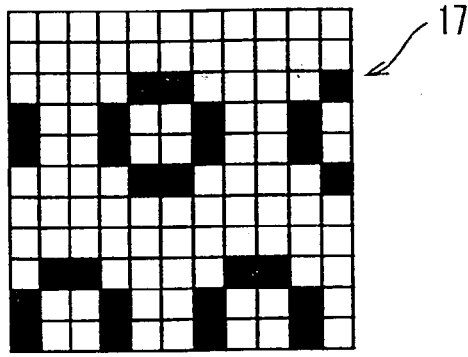
Figure 40C:
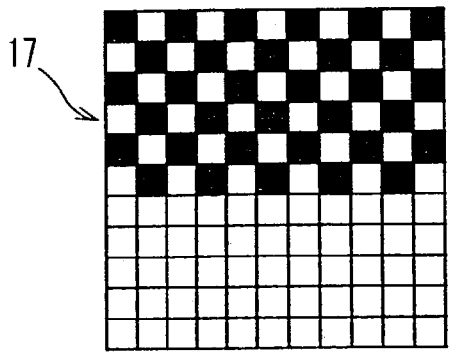

FIGS. 40A to 40C show other examples of the second local pixel block 17, FIG. 40A showing an on-dot character area, FIG. 40B showing a dot area expressed by a middle number of lines, and FIG. 40C showing a dot photograph area expressed by a large number of lines. A second-characteristic-amount calculation section 130 according to an eleventh embodiment of the invention calculates the run length of the edge pixels and the number of the local edge pixels as the second characteristic amount for the second local pixel block 17 on the basis of the number of edge pixels of each edge class, thereby classifying a pixel that belongs to the on-dot character area.

The arrangement of the embodiment is the same as that of the area separating section 2 except for the arrangement of the second characteristic amount calculated by the second-characteristic-amount calculation section 11 of the first embodiment of the invention. Accordingly, a description of the same arrangement will be omitted and the same components are given the same reference numerals.

The run length of the edge pixels irrespective of their edge class is the continuous number of the edge pixels in the second local pixel block 17, which is calculated for the main scanning direction, the sub scanning direction, and 45-degree angle position. For the number of local edge pixels, the maximum number of the counted edge pixels is used for a plurality of local masks 29 contained in the second local pixel block 17. The local masks 29 are arranged so that the second target pixel 16 forms the opposite angle to four angles of the second local pixel block 17. For example, each of the local masks 29 of the second local pixel block 17 containing 11×11 pixels, shown in FIG. 40A, is an image area divided into four with the center at the second target pixel 16 and containing 6×6 pixels.

The maximum value of the run length of the edge pixels is 11 and the number of the local edge pixels is 17 for the on-dot character area shown in FIG. 40A. The second-characteristic-amount calculation section 130 calculates the maximum value of the run length of the edge pixels, 11, and the maximum value of the number of the local edge pixels as the second characteristic amount.

The maximum run length of the edge pixels is 2 and the number of the local edge pixels is 8 in the dot area expressed by a middle number of lines of about 120 to 150 shown in FIG. 40B. On the other hand, the maximum run length of the edge pixels is 6 and the number of the local edge pixels is 18 in the dot photograph area expressed by a large number of lines of 175 or more shown in FIG. 40C.

For the second local pixel block 17 of FIGS. 40B and 40C, both the run length of the edge pixels and the number of the local edge pixels are not larger than those of the second local pixel block 17 shown in FIG. 40A. For example, when the threshold for comparison with the run length of the edge pixels is set to 9, and the threshold for comparison with the number of the local edge pixels is set to 12, it is only the second local pixel block 17 of FIG. 40A where the run length of the edge pixels and the number of the local edge pixels are larger than the thresholds.

The use of the run length of the edge pixels and the number of the local edge pixels as the second characteristic amount for the second local pixel block 17 allows accurate representation of the characteristic of the on-dot character area.

Figure 41:
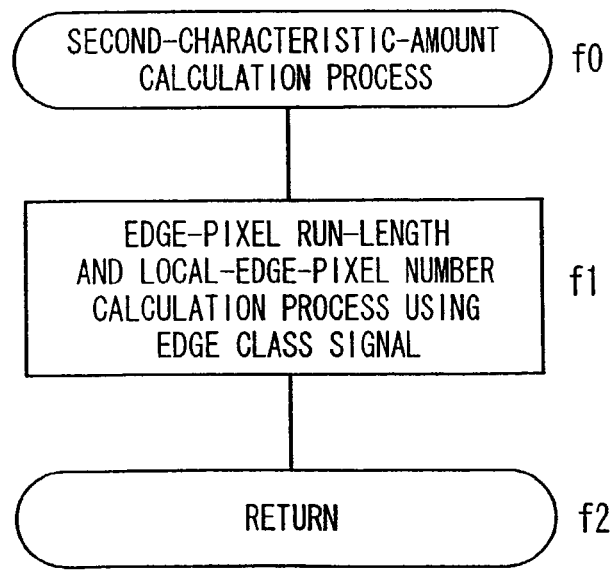
FIG. 41 is a flowchart showing the procedure of a second-characteristic-amount calculation process in an eleventh embodiment of the invention.

FIG. 41 is a flowchart showing the procedure of a second-characteristic-amount calculation process in the eleventh embodiment of the invention. In the second-characteristic-amount calculation process of the embodiment, the run length of the edge pixels and the number of the local edge pixels for the second local pixel block 17 are calculated as the second characteristic amount on the basis of the number of the edge pixels of each edge class. In the embodiment, the processes except for the second-characteristic-amount calculation process of step s8 shown in FIG. 3 are the same as those of the first embodiment of the invention. Accordingly, a description thereof will be omitted here.

In step f0, the second-characteristic-amount calculation process is started, and the process proceeds to step f1. In step f1, the run length of the edge pixels in the second local pixel block 17 and the number of the local edge pixels in the local masks 29 are calculated on the basis of the result of determination by the edge-class determination section 9, and the process proceeds to step f2 wherein all the procedures of the second-characteristic-amount calculation process are finished, and the process returns to step s9 of FIG. 3.

The use of the run length of the edge pixels in the second local pixel block 17 and the number of the local edge pixels in the local masks 29 as the second characteristic amount increases the accuracy of the determination process for the second target pixel 16, thereby allowing the pixels in the on-dot character area to be classified accurately.

Figure 42:
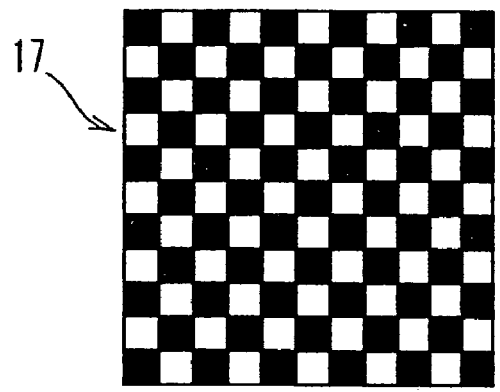
FIG. 42 is a diagram showing another example of the second local pixel block.

FIG. 42 shows another example of the second local pixel block 17. A second-characteristic-amount calculation section 140 of a twelfth embodiment of the invention calculates the run length of the edge pixels, the number of the local edge pixels, and the number of character edge pixels contained in the run of the edge pixels as the second characteristic amount for the second local pixel block 17, on the basis of the number of the edge pixels of each edge class, thereby classifying a pixel that belongs to the on-dot character area.

The run of the edge pixels is a row of pixels in which a plurality of continuous edge pixels are arranged in any of the main scanning direction, the sub scanning direction, and at 45-degree angle position in the second local pixel block 17. For the number of character edge pixels contained in the run of the edge pixels, the number of character edge pixels contained in the run having the maximum run length of the edge pixels is used for the second local pixel block 17.

The arrangement of the embodiment is the same as that of the area separating section 2 except for the arrangement of the second characteristic amount calculated by the second-characteristic-amount calculation section 11 of the first embodiment of the invention. Accordingly, a description of the same arrangement will be omitted and the same components are given the same reference numerals.

The second local pixel block 17 shown in FIG. 42 is an image area corresponding to a dot area expressed by a large number of lines of about 175 to 200. For the second local pixel block 17 of FIG. 42, the run length of the edge pixels is 11 and the number of the local edge pixels is 18. Thus, the run length of the edge pixels is larger than the above-described threshold 9 and the number of the local edge pixels is larger than the above-described threshold 12 for the second local pixel block 17 of FIG. 42. Therefore, there is the possibility that the second target pixel 16 is erroneously determined as a pixel that belongs to the on-dot character area.

In order to classify the pixel in the on-dot character area more accurately, the number of the character edge pixels contained in the run of the edge pixels is used as the second characteristic amount, in addition to the run length of the edge pixels and the number of the local edge pixels, for the second local pixel block 17.

For the second local pixel block 17 corresponding to the on-dot character area shown in FIG. 40A, the number of character edge pixels contained in the run of the edge pixels is 11. On the other hand, for the second local pixel block 17 corresponding to the dot area shown in FIG. 42, the number of the character edge pixels contained in the run of the edge pixels is 0.

For example, in the determination process by the image-class determination means 12, adding a new condition that when the number of character edge pixels contained in the run of the edge pixels is larger than the threshold 5, the second target pixel 16 in the second local pixel block 17 is a pixel that belongs to the on-dot character area prevents erroneous determination for the second target pixel 16.

For the second local pixel block 17, the use of the number of the character edge pixels contained in the run of the edge pixels as the second characteristic amount in addition to the run length of the edge pixels and the number of the local edge pixels allows the characteristic of the on-dot character area to be represented more accurately.

Figure 43:
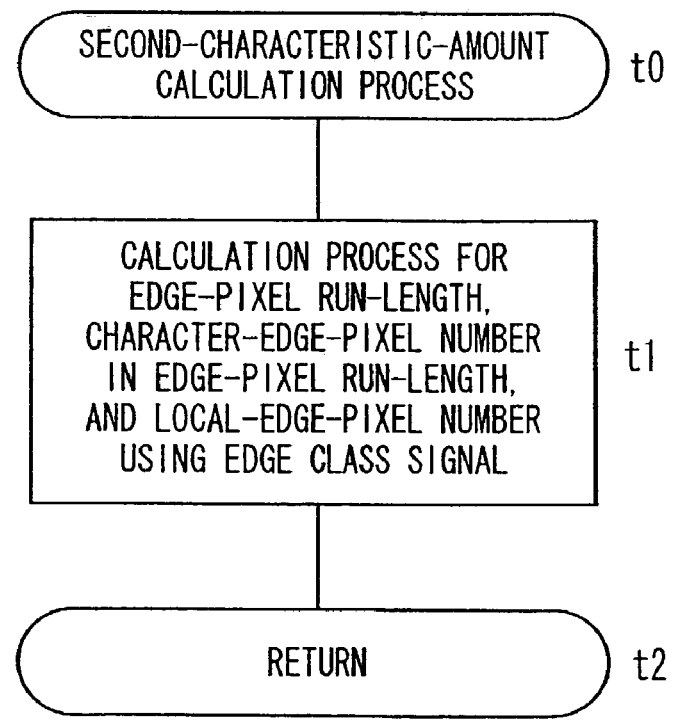
FIG. 43 is a flowchart showing the procedure of a second-characteristic-amount calculation process in a twelfth embodiment of the invention.

FIG. 43 is a flowchart showing the procedure of a second-characteristic-amount calculation process in a twelfth embodiment of the invention. In the second-characteristic-amount calculation process of the embodiment, the number of the character edge pixels contained in the run of the edge pixels is calculated as the second characteristic amount, in addition to the run length of the edge pixels and the number of the local edge pixels, on the basis of the number of the edge pixels of each pixel class. In the embodiment, the processes except for the second-characteristic-amount calculation process of step s8 shown in FIG. 3 are the same as those of the first embodiment of the invention. Accordingly, a description thereof will be omitted here.

In step t0, the second-characteristic-amount calculation process is started, and the process proceeds to step t1. In step t1, the number of the character edge pixels contained in the run of the edge pixels is calculated as the second characteristic amount, in addition to the run length of the edge pixels and the number of the local edge pixels in the second local pixel block 17, on the basis of the result of determination by the edge-class determination section 9, and the process proceeds to step t2 wherein all the procedures of the second-characteristic-amount calculation process are finished, and the process returns to step s9 shown in FIG. 3.

According to the embodiment, the use of the number of the character edge pixels contained in the run of the edge pixels as the second characteristic amount, in addition to the run length of the edge pixels and the number of the local edge pixels for the second local pixel block 17 increases the accuracy of the determination for the second target pixel 16, thereby allowing the pixels in the on-dot character area to be classified more accurately.

Figure 44:
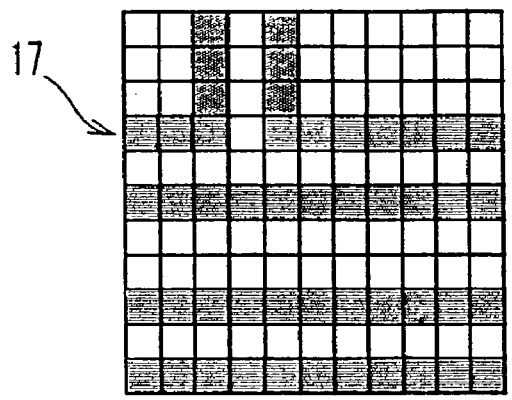
FIG. 44 is a diagram showing another example of the second local pixel block.

FIG. 44 shows another example of the second local pixel block 17. A second-characteristic-amount calculation section 150 according to a thirteenth embodiment of the invention classifies a pixel that belongs to the on-dot character area by calculating the run length of the edge pixels, the number of the local edge pixels, and the number of the local dot edge pixels as the second characteristic amount for the second local pixel block 17, on the basis of the number of the edge pixels of each edge class. The maximum number of the counted dot edge pixels is used as the number of the local dot edge pixels, for a plurality of the local masks 29 contained in the second local pixel block 17.

The arrangement of the embodiment is the same as that of the area separating section 2 except for the arrangement of the second characteristic amount calculated by the second-characteristic-amount calculation section 11 of the first embodiment of the invention. Accordingly, a description of the same arrangement will be omitted and the same components are given the same reference numerals.

The second local pixel block 17 shown in FIG. 44 is an image area corresponding to a character area. The run length of the edge pixels is 11 and the number of the local edge pixels is 17 for the second local pixel block 17 of FIG. 44. Thus, for the second local pixel block 17 of FIG. 44, the run length of the edge pixels is larger than the above-described threshold 9 and the number of the local edge pixels is larger than the above-described threshold 12. Therefore, there is the possibility that the second target pixel 16 is erroneously determined as a pixel that belongs to the on-dot character area.

In order to classify a pixel in the on-dot character area more accurately, the number of the local dot edge pixels is used as the second characteristic amount for the second local pixel block 17, in addition to the run length of the edge pixels and the number of the local edge pixels.

For the second local pixel block 17 of FIG. 44, the number of the local dot edge pixels is 0, while for the second local pixel block 17 of FIG. 40A, the number of the local dot edge pixels is 8. In the determination process by the image-class determination section 12, erroneous determination for the second target pixel 16 can be prevented by adding a new condition that, for example, when the number of local dot edge pixels is larger than the threshold 5, the second target pixel 16 belongs to the on-dot character area.

The use of the number of the local dot edge pixels as the second characteristic amount for the second local pixel block 17, in addition to the run length of the edge pixels and the number of the local edge pixels, allows the characteristic of the on-dot character area to be presented more accurately.

Figure 45:
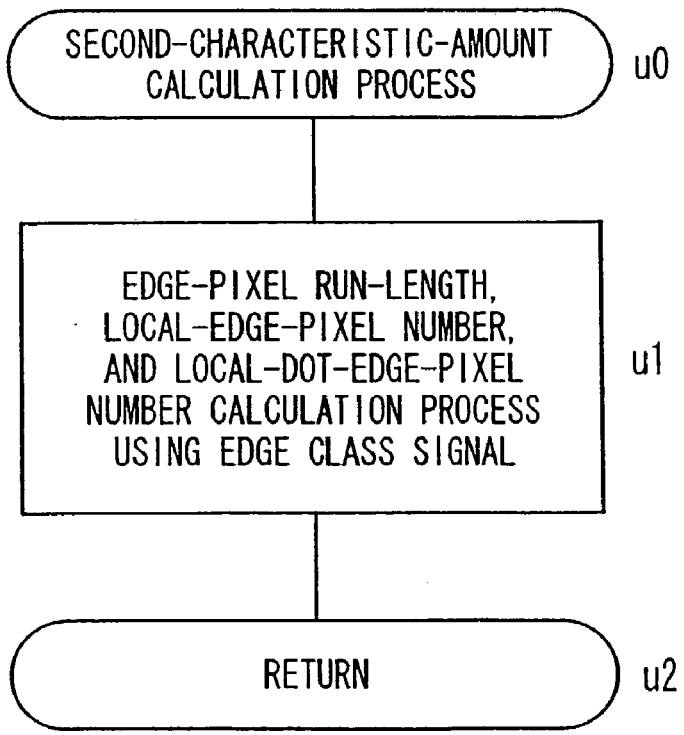
FIG. 45 is a flowchart showing the procedure of a second-characteristic-amount calculation process in a thirteenth embodiment of the invention.

FIG. 45 is a flowchart showing the procedure of a second-characteristic-amount calculation process in the thirteenth embodiment of the invention. In the second-characteristic-amount calculation process of the embodiment, the run length of the edge pixels, the number of the local edge pixels, and the number of the local dot edge pixels are calculated as the second characteristic amount for the second local pixel block 17 on the basis of the number of the edge pixels of each edge class. In the embodiment, the processes except for the second-characteristic-amount calculation process of step s8 shown in FIG. 3 are the same as those of the first embodiment of the invention. Accordingly, a description thereof will be omitted here.

In step u0, the second-characteristic-amount calculation process is started, and the process proceeds to step u1. In step u1, the run length of the edge pixels, the number of the local edge pixels, and the number of the local dot edge pixels for the second local pixel block 17 are calculated as the second characteristic amount on the basis of the result of determination by the edge-class determination means 9, and the process proceeds to step u2 wherein all the procedures of the second-characteristic-amount calculation process are finished, and the process returns to step s9 shown in FIG. 3.

According to the embodiment, the use of the run length of the edge pixels, the number of the local edge pixels, and the number of the local dot edge pixels for the second local pixel block 17 as the second characteristic amount increases the accuracy of the determination for the second target pixel 16, thereby allowing a pixel that belongs to the on-dot character area to be classified more accurately.

Figure 46:
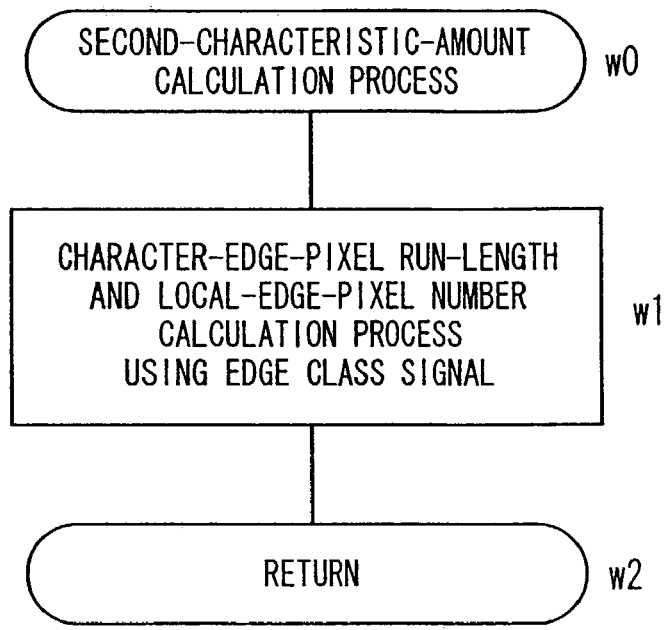
FIG. 46 is a flowchart showing the procedure of a second-characteristic-amount calculation process in a fourteenth embodiment of the invention.

FIG. 46 is a flowchart showing the procedure of a second-characteristic-amount calculation process in a fourteenth embodiment of the invention. A second-characteristic-amount calculation section 160 of the fourteenth embodiment of the invention calculates the run length of the character edge pixels and the number of the local edge pixels for the second local pixel block 17 as the second characteristic amount, thereby classifying a pixel that belongs to the on-dot character area.

The arrangement of the embodiment is the same as that of the area separating section 2 except for the arrangement of the second characteristic amount calculated by the second-characteristic-amount calculation section 11 of the first embodiment of the invention. Accordingly, a description of the same arrangement will be omitted and the same components are given the same reference numerals.

For the second local pixel block 17 corresponding to the dot area expressed by a large number of lines, shown in FIG. 42, the run length of the edge pixels is 11 and the number of the local edge pixels is 18. Thus, for the second local pixel block 17 of FIG. 42, the run length of the edge pixels is larger than the above-described threshold 9 and the number of the local edge pixels is larger than the above-described threshold 12. Therefore, there is the possibility that the second target pixel 16 is erroneously determined as a pixel that belongs to the on-dot character area.

In order to classify a pixel belongs to the on-dot character area more accurately, the run length of the character edge pixels is used as the second characteristic amount for the second local pixel block 17, in addition to the number of the local edge pixels.

For the second local pixel block 17 corresponding to the on-dot character area of FIG. 40A, the run length of the character edge pixels is 11, while for the second local pixel block 17 of FIG. 42, the run length of the character edge pixels is 0. In the determination process by the image-class determination section 12, erroneous determination for the second target pixel 16 can be prevented by adding a new condition that, for example, when the run length of the character edge pixels is larger than the threshold 9, the second target pixel 16 belongs to the on-dot character area.

The use of the run length of the character edge pixels and the number of the local edge pixels as the second characteristic amount for the second local pixel block 17 allows the characteristics of the on-dot character area to be represented more accurately.

In the second-characteristic-amount calculation process of the embodiment, the run length of the character edge pixels and the number of the local edge pixels are calculated as the second characteristic amount for the second local pixel block 17 on the basis of the number of edge pixels of each edge class. In the embodiment, the processes except for the second-characteristic-amount calculation process of step s8 shown in FIG. 3 are the same as those of the first embodiment of the invention. Accordingly, a description thereof will be omitted here.

In step w0, the second-characteristic-amount calculation process is started, and the process proceeds to step w1. In step w1, the run length of the character edge pixels and the number of the local edge pixels for the second local pixel block 17 are calculated as the second characteristic amount on the basis of the result of determination by the edge-class determination section 9, and the process proceeds to step w2 wherein all the procedures of the second-characteristic-amount calculation process are finished, and the process returns to step s9 shown in FIG. 3.

According to the embodiment, the use of the run length of the character edge pixels and the number of the local edge pixels for the second local pixel block 17 as the second characteristic amount increases the accuracy of the determination for the second target pixel 16, thereby allowing a pixel that belongs to the on-dot character area to be classified more accurately.

Figure 47:
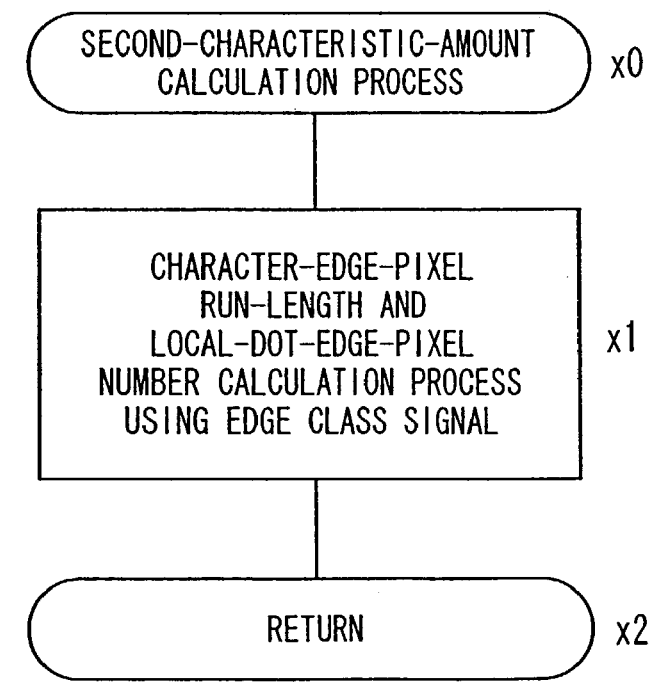
FIG. 47 is a flowchart showing the procedure of a second-characteristic-amount calculation process in a fifteenth embodiment of the invention.

FIG. 47 is a flowchart showing the procedure of a second-characteristic-amount calculation process in a fifteenth embodiment of the invention. A second-characteristic-amount calculation section 170 of the fifteenth embodiment of the invention calculates the run length of the character edge pixels and the number of the local dot edge pixels for the second local pixel block 17 as the second characteristic amount on the basis of the number of the edge pixels of each edge class, thereby classifying a pixel that belongs to the on-dot character area.

The arrangement of the embodiment is the same as that of the area separating section 2 except for the arrangement of the second characteristic amount calculated by the second-characteristic-amount calculation section 11 of the first embodiment of the invention. Accordingly, a description of the same arrangement will be omitted and the same components are given the same reference numerals.

The second local pixel block 17 shown in FIG. 44 is an image area corresponding to the character area, as described above. For the second local pixel block 17 shown in FIG. 44, the run length of the character edge pixels is 11 and the number of the local edge pixels is 17.

Thus, the run length of the character edge pixels is larger than the above-described threshold 9 and the number of the local edge pixels is larger than the above-described threshold 12 for the second local pixel block 17 of FIG. 44. Therefore, there is the possibility that the second target pixel 16 is erroneously determined as a pixel that belongs to the on-dot character area.

In order to classify a pixel belongs to the on-dot character area more accurately, the run length of the character edge pixels and the number of the local dot edge pixels are used as the second characteristic amount for the second local pixel block 17.

For the second local pixel block 17 corresponding to the on-dot character area of FIG. 40A, the number of the local dot edge pixels is 8, while for the second local pixel block 17 corresponding to the character area, shown in FIG. 44, the number of the local dot edge pixels is 0. In the determination process by the image-class determination section 12, erroneous determination for the second target pixel 16 can be prevented by adding a new condition that, for example, when the number of the local dot edge pixels is larger than the threshold 5, the second target pixel 16 belongs to the on-dot character area.

The use of the run length of the character edge pixels and the number of the local dot edge pixels as the second characteristic amount for the second local pixel block 17 allows the characteristic of the on-dot character area to be represented more accurately.

In the second-characteristic-amount calculation process of the embodiment, the run length of the character edge pixels and the number of the local dot edge pixels are calculated as the second characteristic amount for the second local pixel block 17 on the basis of the number of the edge pixels of each edge class. In the embodiment, the processes except for the second-characteristic-amount calculation process of step s8 shown in FIG. 3 are the same as those of the first embodiment of the invention. Accordingly, a description thereof will be omitted here.

In step x0, the second-characteristic-amount calculation process is started, and the process proceeds to step x1. In step x1, the run length of the character edge pixels and the number of the local dot edge pixels for the second local pixel block 17 are calculated as the second characteristic amount on the basis of the result of determination by the edge-class determination section 9, and the process proceeds to step x2 wherein all the procedures of the second-characteristic-amount calculation process are finished, and the process returns to step s9 shown in FIG. 3.

According to the embodiment, the use of the run length of the character edge pixels and the number of the local dot edge pixels for the second local pixel block 17 as the second characteristic amount increases the accuracy of the determination for the second target pixel 16, thereby allowing a pixel that belongs to the on-dot character area to be classified more accurately.

Figure 48:
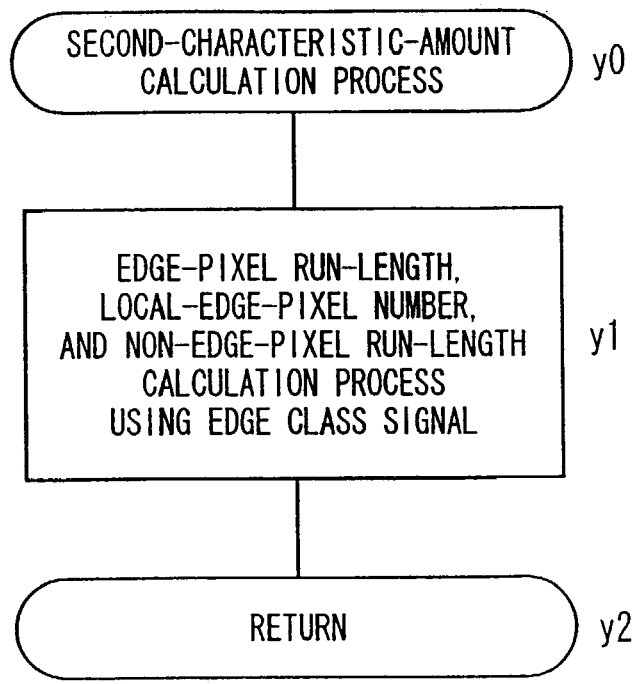
FIG. 48 is a flowchart showing the procedure of a second-characteristic-amount calculation process in a sixteenth embodiment of the invention.

FIG. 48 is a flowchart showing the procedure of a second-characteristic-amount calculation process in a sixteenth embodiment of the invention. A second-characteristic-amount calculation section 180 of the sixteenth embodiment of the invention calculates the run length of the edge pixels, the number of the local edge pixels, and the run length of the non-edge pixels for the second local pixel block 17 as the second characteristic amount on the basis of the number of the edge pixels of each edge class, thereby classifying a pixel that belongs to the on-dot character area.

The arrangement of the embodiment is the same as that of the area separating section 2 except for the arrangement of the second characteristic amount calculated by the second-characteristic-amount calculation section 11 of the first embodiment of the invention. Accordingly, a description of the same arrangement will be omitted and the same components are given the same reference numerals.

The second local pixel block 17 shown in FIG. 42 is an image area corresponding to the dot area expressed by a large number of lines of about 175 to 200. For the second local pixel block 17 shown in FIG. 42, the run length of the edge pixels is 11 and the number of the local edge pixels is 18 and the number of the local dot edge pixels is 18.

Thus, for the second local pixel block 17 of FIG. 42, the run length of the edge pixels is larger than the above-described threshold 9, the number of the local edge pixels is larger than the above-described threshold 12, and the number of the local dot edge pixels is larger than the above-described threshold 5. Therefore, there is the possibility that the second target pixel 16 is erroneously determined as a pixel that belongs to the on-dot character area.

In order to classify a pixel belongs to the on-dot character area more accurately, the run length of the edge pixels, the number of the local edge pixels, and the run length of the non-edge pixels are used as the second characteristic amount for the second local pixel block 17 on the basis of the characteristic within the character section, that is, the characteristic that the run length of the non-edge pixels is large because of the on-dot character area.

For the second local pixel block 17 corresponding to the on-dot character area of FIG. 40A, the run length of the non-edge pixels is 11, while for the second local pixel block 17 corresponding to the dot area of FIG. 42, the run length of the non-edge pixels is 0 in both the main scanning direction and the sub scanning direction. In the determination process by the image-class determination section 12, erroneous determination for the second target pixel 16 can be prevented by adding a new condition that, for example, when the run length of the non-edge pixels is larger than the threshold 9, the second target pixel 16 belongs to the on-dot character area.

The use of the run length of the edge pixels, the number of the local edge pixels, and the run length of the non-edge pixels as the second characteristic amount for the second local pixel block 17 allows the characteristic of the on-dot character area to be represented more accurately.

In the second-characteristic-amount calculation process of the embodiment, the run length of the edge pixels, the number of the local edge pixels, and the run length of the non-edge pixels are calculated as the second characteristic amount for the second local pixel block 17 on the basis of the number of the edge pixels of each edge class. In the embodiment, the processes except for the second-characteristic-amount calculation process of step s8 shown in FIG. 3 are the same as those of the first embodiment of the invention. Accordingly, a description thereof will be omitted here.

In step y0, the second-characteristic-amount calculation process is started, and the process proceeds to step y1. In step y1, the run length of the edge pixels, the number of the local edge pixels, and the number of the non-edge pixels for the second local pixel block 17 are calculated as the second characteristic amount on the basis of the result of determination by the edge-class determination section 9, and the process proceeds to step y2 wherein all the procedures of the second-characteristic-amount calculation process are finished, and the process returns to step s9 shown in FIG. 3.

According to the embodiment, the use of the run length of the edge pixels, the number of the local edge pixels, and the run length of the non-edge pixels for the second local pixel block 17 as the second characteristic amount increases the accuracy of the determination for the second target pixel 16, thereby allowing a pixel that belongs to the on-dot character area to be classified accurately.

Figure 49:
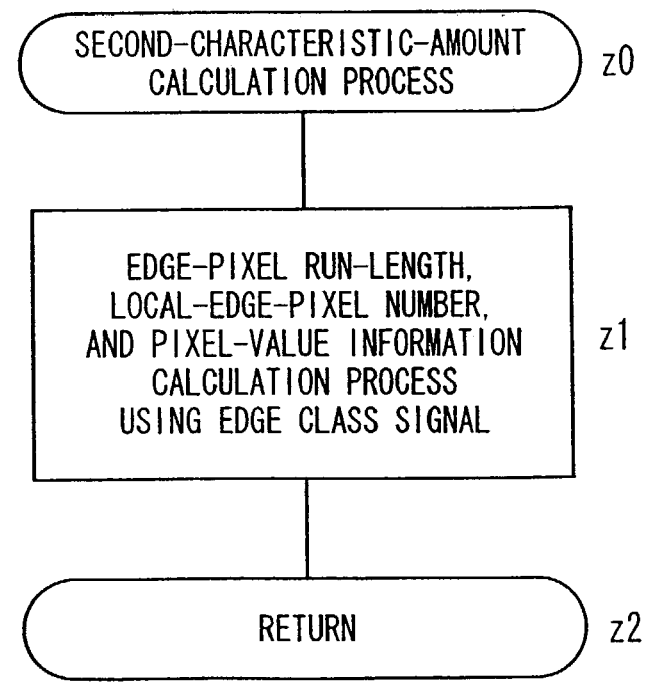
FIG. 49 is a flowchart showing the procedure of a second-characteristic-amount calculation process in a seventeenth embodiment of the invention.

FIG. 49 is a flowchart showing the procedure of a second-characteristic-amount calculation process in a seventeenth embodiment of the invention. A second-characteristic-amount calculation section 190 of the seventeenth embodiment of the invention calculates the run length of the edge pixels, the number of the local edge pixels, and information on the pixel value for the second local pixel block 17 as the second characteristic amount on the basis of the number of the edge pixels of each edge class, thereby classifying a pixel that belongs to the on-dot character area.

The arrangement of the embodiment is the same as that of the area separating section 2 except for the arrangement of the second characteristic amount calculated by the second-characteristic-amount calculation section 11 of the first embodiment of the invention. Accordingly, a description of the same arrangement will be omitted and the same components are given the same reference numerals.

For a dot photograph area expressed by a small number of lines and containing a plurality of pixels having a middle pixel value or concentration, when only the run length of the edge pixels and the number of the local edge pixels are used as the second characteristic amount for the second local pixel block 17, there is the possibility that the edge pixel in the dot photograph area is erroneously determined as an edge pixel contained in the on-dot character area.

In order to classify a pixel contained in the on-dot character area more accurately, the run length of the edge pixels, the number of the local edge pixels, and information on the pixel value are used for the second local pixel block 17. The information on the pixel value includes information on the concentration for a high concentration of character section containing a plurality of character edge pixels of high concentration. The object of the determination by the image-class determination section 12 is narrowed to the high concentration of character section. Of the edge pixels of each edge class, the high-concentration character section on a low-concentration dot section is used frequently as a characteristic amount. The use of the information on the pixel value for the high-concentration character section prevents erroneous determination for the dot photograph area, thereby allowing the characteristic of the on-dot character area to be represented accurately.

For the second local pixel block 17, adding a new condition that, for example, only when the mean concentration is lower than a given value and the concentration of the second target pixel 16, in other words, the concentration of the character edge pixel is higher than a given value, the second target pixel 16 belongs to the on-dot character area increases the accuracy of the actual determination by the image-class determination section 12, thereby allowing a pixel in the on-dot character area to be classified accurately.

In the second-characteristic-amount calculation process of the embodiment, the run length of the edge pixels, the number of the local edge pixels, and the information on the pixel value are calculated as the second characteristic amount for the second local pixel block 17 on the basis of the number of the edge pixels of each edge class. In the embodiment, the processes except for the second-characteristic-amount calculation process of step s8 shown in FIG. 3 are the same as those of the first embodiment of the invention. Accordingly, a description thereof will be omitted here.

In step z0, the second-characteristic-amount calculation process is started, and the process proceeds to step z1. In step z1, the run length of the edge pixels, the number of the local edge pixels, and the information on the pixel value for the second local pixel block 17 are calculated as the second characteristic amount on the basis of the result of determination by the edge-class determination section 9, and the process proceeds to step z2 wherein all the procedures of the second-characteristic-amount calculation process are finished, and the process returns to step s9 shown in FIG. 3.

According to the embodiment, the use of the run length of the edge pixels, the number of the local edge pixels, and the information on the pixel value for the second local pixel block 17 as the second characteristic amount increases the accuracy of the determination for the second target pixel 16, thereby allowing a pixel that belongs to the on-dot character area to be classified accurately.

A program according to an eighteenth embodiment of the invention includes the procedure for a computer to execute an image processing method capable of classifying which of the plurality of image areas, such as the character area, the dot area, and the on-dot character area, each pixel of the input image belongs to using the information on the edge pixel and the characteristic amount for the image area.

The computer is allowed to perform the image processing method on the basis of the program. Thus, image processing is automatically performed by the computer to accurately classify which of the character area, the dot area, and the on-dot character area each pixel of the input image belongs to.

The computer program for performing the image processing method is recorded in a recording medium according to a nineteenth embodiment of the invention. The program recorded in the recording medium can be read by the computer. The image forming apparatus 1 and the image processing apparatus 31 capable of using the image processing method of the invention include a reading apparatus for the recording medium, which reads the program recorded in the recording medium and executes it.

In the image processing method, the program is recorded in the computer-readable recording medium in package so that the procedures can be performed. For example, when the image forming apparatus 1 and the image processing apparatus 31 employ a method different from the image processing method of the invention, they can be upgraded by reading the image processing method of the invention with the reading apparatus. Accordingly, the user can use the image processing method of the invention without the need to purchase the image forming apparatus 1 and the image processing apparatus 31 additionally.

The image forming apparatus 1 and the image processing apparatus 31 capable of using the image processing method of the invention may be connected to a computer including a recording-medium reading apparatus for the program recorded in the recording medium over a network and a communication line. With such an arrangement, the program recorded in the recording medium is read by the recording-medium reading apparatus included in the computer reads, and the program is then transferred to the image forming apparatus 1 and the image processing apparatus 31 over the network and the communication line. The transferred program is executed by the image forming apparatus 1 and the image processing apparatus 31, thereby allowing classification as to which of the character area, the dot area, and the on-dot character area each pixel of the input image belongs to.

The recording medium may be a memory included in a microcomputer, such as a read only memory (abbreviated as an ROM), or a tape such as a magnetic tape and a cassette tape. Other examples of the recording medium are a flexible disk and a hard disk for a magnetic disk, while for an optical disk they may be a compact disk—read only memory (abbreviated as a CD-ROM), a magneto optical (abbreviated as an MO), a minidisk (abbreviated as an MD), and a digital versatile disk (abbreviated as a DVD).

Other examples of the recording medium are an IC card and an optical card such as a memory card. Still other examples are a mask read only memory (abbreviated as a mask ROM), an erasable programmable read only memory (abbreviated as an EPROM), an electrically erasable programmable read only memory (abbreviated as an EEPROM), and a flash ROM, which are semiconductor memories, and a medium that loads the program fixedly.

According to the embodiment, a computer program for performing the image processing method is recorded in a recording medium that can be read by a computer. The computer reads the program from the recording medium and executes it, thereby allowing accurate classification as to which of the character area, the dot area, and the on-dot character area each pixel of the input image belongs to.

The area separating section 2 according to the first embodiment of the invention may be constructed to classify a pixel that belongs to the character area, the dot area, and the on-dot character area, also being allowed to employ a combination of the first to the seventeenth embodiment within the scope of the invention. For example, with the combination of the sixth embodiment for classifying a pixel contained in the character area, the eighth embodiment for classifying a pixel contained in the dot area, and the eleventh embodiment for classifying a pixel contained in the on-dot character area, pixels contained in the character area, the dot area, and the on-dot character area can be classified accurately with the single image processing apparatus 31. The image processing apparatus 31 of the invention may use the image processing method of the invention for at least one image area of the character area, the dot area, and the on-dot character area, while for remaining image areas such as a photograph area, the image processing apparatus 31 may use a known image processing method such as disclosed in the preliminary draft for the seminar (Jun. 4, 1990) at the Institute of Image Electronics Engineers of Japan.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus comprising:

edge determination means for determining whether or not each pixel of an input image is an edge pixel;

object-image extraction means for extracting an object image section having pixels of a predetermined pixel value or more from the input image;

first-characteristic-amount calculation means for calculating a first characteristic amount that represents a characteristic of the object image section contained in a first local pixel block containing a prescribed first target pixel on the basis of the result of extraction by the object-image extraction means;

edge-class determination means for determining which of a plurality of edge classes the first target pixel belongs to, on the basis of the result of determination by the edge determination means and the first characteristic amount calculated by the first-characteristic-amount calculation means;

second-characteristic-amount calculation means for calculating a second characteristic amount that represents a characteristic of an image of a second local pixel block containing a prescribed second target pixel on the basis of the result of classification by the edge-class determination means; and image-class determination means for determining which of a plurality of image classes the second target pixel belongs to, on the basis of the second characteristic amount calculated by the second-characteristic-amount calculation means.

2. The image processing apparatus of claim 1, wherein the edge determination means includes a second-derivative operation section for performing a second derivative operation for each pixel and a zero-cross determination section for determining a zero-crossing pixel as an edge pixel on the basis of the result of the second derivative operation by the second-derivative operation section.

3. The image processing apparatus of claim 1, wherein the edge determination means includes a smoothing section for performing smoothing filter processing for each pixel, a difference-value calculating section for obtaining the difference between the result of smoothing by the smoothing section and each pixel value, and a zero-cross determination section for determining a zero-crossing pixel as an edge pixel on the basis of the difference value calculated by the difference-value calculating section.

4. The image processing apparatus of claim 1, wherein the object-image extraction means includes a threshold setting section for setting an object-image extracting threshold, and an extracting section for comparing the value of each pixel in the first local pixel block containing the prescribed first target pixel with the object-image extracting threshold to divide them into two image sections and extracting either one of the image sections as an object image section.

5. The image processing apparatus of claim 4, wherein the threshold setting section includes a block-characteristicamount calculating section for calculating an in-block characteristic amount that represents the characteristic of the first local pixel block, and a threshold setting section for setting the object-image extracting threshold on the basis of the in-block characteristic amount calculated by the block-characteristic-amount calculating section.

6. The image processing apparatus of claim 4, wherein the threshold setting section of the object-image extraction means sets a plurality of object-image extracting thresholds on the basis of the first local pixel block, and
wherein the extracting section of the object-image extraction means includes a candidate extracting section for comparing the value of each pixel in the first local pixel block with the object-image extracting threshold to divide them into two image sections and extracting either one of the image sections as an candidate for the object image section, and a selecting section for selecting an object image section in which the number of pixels is closest to a predetermined number of pixels from the candidates for the object image section extracted by the candidate extracting section.

7. The image processing apparatus of claim 1, wherein the object-image extraction means includes a histogram calculating section for calculating a cumulative-pixel-value histogram for the pixels in the first local pixel block, a threshold setting section for setting an object-image extracting threshold on the basis of the cumulative-pixel-value histogram calculated by the histogram calculating section, and an extracting section for comparing the value of each pixel in the first local pixel block with the object-image extracting threshold to divide them into two image sections and extracting either one of the image sections as the object image section.

8. The image processing apparatus of claim 1, wherein the first-characteristic-amount calculation means is run-length calculation means for calculating a run length of the object image section extracted by the object-image extraction means.

9. The image processing apparatus of claim 1, wherein the first-characteristic-amount calculation means is circularity calculation means for calculating the circularity of the object image section extracted by the object-image extraction means.

10. The image processing apparatus of claim 1, wherein the second-characteristic-amount calculation means calculates a run length of the edge pixels as a second characteristic amount.

11. The image processing apparatus of claim 10, wherein the second-characteristic-amount calculation means calculates a run length of non-edge pixels in addition to the run length of the edge pixels as a second characteristic amount.

12. The image processing apparatus of claim 1, wherein the second-characteristic-amount calculation means calculates the second characteristic amount on the basis of the number of the edge pixels of each edge class.

13. An image forming apparatus comprising:
an image processing apparatus including:
edge determination means for determining whether or not each pixel of an input image is an edge pixel;
object-image extraction means for extracting an object image section having pixels of a predetermined pixel value or more from the input image;
first-characteristic-amount calculation means for calculating a first characteristic amount that represents a characteristic of the object image section contained in a first local pixel block containing a prescribed first target pixel on the basis of the result of extraction by the object-image extraction means;
edge-class determination means for determining which of a plurality of edge classes the first target pixel belongs to, on the basis of the result of determination by the edge determination means and the first characteristic amount calculated by the first-characteristic-amount calculation means;
second-characteristic-amount calculation means for calculating a second characteristic amount that represents a characteristic of an image of a second local pixel block containing a prescribed second target pixel on the basis of the result of classification by the edge-class determination means; and
image-class determination means for determining which of a plurality of image classes the second target pixel belongs to, on the basis of the second characteristic amount calculated by the second-characteristic-amount calculation means.

14. An image processing method comprising:
an edge determination process for determining whether or not each pixel of an input image is an edge pixel;
an object-image extraction process for extracting an object image section composed of pixels having a predetermined pixel values or more from the input image;
a first-characteristic-amount calculation process for calculating a first characteristic amount that represents a characteristic of an object image section contained in a first local pixel block containing a predetermined first target pixel on the basis of the result of extraction by the object-image extraction process;
an edge-class determination process for determining which of a plurality of edge classes the first target pixel belongs to, on the basis of the result of determination by the edge determination process and the first characteristic amount calculated in the first-characteristic-amount calculation process;
a second-characteristic-amount calculation process for calculating a second characteristic amount that represents a characteristic of an image in the second local pixel block containing a predetermined second target pixel on the basis of the result of classification by the edge-class determination process; and
an image-class determination process for determining which of the plurality of image classes the second target pixel belongs to, on the basis of the second characteristic amount calculated in the second-characteristic-amount calculation process.

15. The image processing method of claim 14, wherein the edge determination process includes a second derivative operation process for performing a second derivative operation for each pixel and a zero-cross determination process for determining a zero-crossing pixel as an edge pixel on the basis of the result of the second derivative operation in the second derivative operation process.

16. The image processing method of claim 14, wherein the edge determination process includes a smoothing process for performing smoothing filter processing for each pixel, a difference-value calculation process for obtaining the difference between the result of smoothing in the smoothing process and each pixel value, and a zero-cross determination process for determining a zero-crossing pixel as an edge pixel.

17. The image processing method of claim 14, wherein the object-image extraction process includes a threshold setting process for setting an object-image extracting threshold and an extraction process for comparing the value of each pixel in the first local pixel block that contains a predetermined first target pixel with the object-image extracting threshold to divide them into two image sections and extracting either one of the image sections as an object image section.

18. The image processing method of claim 17, wherein the threshold setting process includes a block-characteristic-amount calculation process for calculating an in-block characteristic amount that represents the characteristic of the first local pixel block and an order-threshold setting process for setting an object-image extracting threshold on the basis of the in-block characteristic amount calculated in the block-characteristic-amount calculation process.

19. The image processing method of claim 17, wherein in the threshold setting process of the object-image extraction process, a plurality of object-image extracting thresholds is set on the basis of the first local pixel block, and
wherein the extraction process in the object-image extraction process includes a candidate extraction process for comparing the value of each pixel in the first local pixel block with the object-image extracting threshold for each object-image extraction threshold, dividing them into two image sections, and thereby extracting either one of the image sections as a candidate for the object image section, and a selection process for selecting an object image section having a pixel value closest to a prescribed pixel value from the candidates for the object image section which are extracted in the candidate extraction process.

20. The image processing method of claim 14, wherein the object-image extraction process includes a histogram calculation process of calculating the cumulative-pixel-value histogram for the pixels in the first local pixel block; a threshold setting process for setting an object-image extracting threshold on the basis of the cumulative-pixel-value histogram calculated in the histogram calculation process; and an extraction process for comparing the value of each pixel in the first local pixel block with the object-image extracting threshold to divide them into two image sections and extracting either one of the image sections as an object image section.

21. The image processing method of claim 14, wherein the first-characteristic-amount calculation process is a run-length calculation process for calculating a run length of the object image section extracted in the object-image extraction process.

22. The image processing method of claim 14, wherein the first-characteristic-amount calculation process is a circularity calculation process for calculating the circularity of the object image section extracted in the object-image extraction section.

23. The image processing method of claim 14, wherein in the second-characteristic-amount calculation process, a run length of the edge pixels is calculated as a second characteristic amount.

24. The image processing method of claim 23, wherein in the second-characteristic-amount calculation process, in addition to the run length of the edge pixels, a run length of non-edge pixels is calculated as a second characteristic amount.

25. The image processing method of claim 14, wherein in the second-characteristic-amount calculation process, the second characteristic amount is calculated on the basis of the number of the edge pixels of each edge class.

26. A computer-readable recording medium which records a program for causing a computer to execute image processing method comprising:
an edge determination process for determining whether or not each pixel of an input image is an edge pixel;
an object-image extraction process for extracting an object image section composed of pixels having a predetermined pixel values or more from the input image;
a first-characteristic-amount calculation process for calculating a first characteristic amount that represents a characteristic of an object image section contained in a first local pixel block containing a predetermined first target pixel on the basis of the result of extraction by the object-image extraction process;
an edge-class determination process for determining which of a plurality of edge classes the first target pixel belongs to, on the basis of the result of determination by the edge determination process and the first characteristic amount calculated in the first-characteristic-amount calculation process;
a second-characteristic-amount calculation process for calculating a second characteristic amount that represents a characteristic of an image in the second local pixel block containing a predetermined second target pixel on the basis of the result of classification by the edge-class determination process; and
an image-class determination process for determining which of a plurality of image classes the second target pixel belongs to, on the basis of the second characteristic amount calculated in the second-characteristic-amount calculation process.

* * * * *